(12) United States Patent
Dyrvig et al.

(10) Patent No.: US 12,550,918 B2
(45) Date of Patent: Feb. 17, 2026

(54) NEUTRAL INSTANT BEVERAGE WHEY PROTEIN POWDER

(71) Applicant: Arla Foods Amba, Viby J (DK)

(72) Inventors: Mads Dyrvig, Viby J (DK); Sandra Maria Sørensen, Viby J (DK); Benito Greco, Viby J (DK)

(73) Assignee: Arla Foods Amba, Viby J (DK)

( * ) Notice: Subject to any disclaimer, the term of this patent is extended or adjusted under 35 U.S.C. 154(b) by 438 days.

(21) Appl. No.: 18/013,608

(22) PCT Filed: Jul. 2, 2021

(86) PCT No.: PCT/EP2021/068357
§ 371 (c)(1),
(2) Date: Dec. 29, 2022

(87) PCT Pub. No.: WO2022/003166
PCT Pub. Date: Jan. 6, 2022

(65) Prior Publication Data
US 2023/0248026 A1    Aug. 10, 2023

(30) Foreign Application Priority Data

Jul. 3, 2020 (EP) .................................... 20184068

(51) Int. Cl.
A23L 2/39    (2006.01)
A23C 21/00   (2006.01)
A23L 2/66    (2006.01)

(52) U.S. Cl.
CPC ............. *A23L 2/39* (2013.01); *A23C 21/00* (2013.01); *A23L 2/66* (2013.01)

(58) Field of Classification Search
CPC .............. A23L 2/39; A23L 2/66; A23C 21/00
See application file for complete search history.

(56) References Cited

U.S. PATENT DOCUMENTS

| | | | |
|---|---|---|---|
| 3,983,251 A | † | 9/1976 | Singh |
| 2008/0050498 A1 | | 2/2008 | Sherwood et al. |
| 2008/0311265 A1 | | 12/2008 | MacDonald et al. |
| 2018/0186528 A1* | | 7/2018 | Tonn ........................ G01F 11/16 |

FOREIGN PATENT DOCUMENTS

| | | |
|---|---|---|
| EP | 0425450 A2 | 5/1991 |
| JP | H03151005 A | 6/1991 |
| JP | 2009529332 A | 8/2009 |
| JP | 2011103842 A | 6/2011 |
| JP | 2014509525 A | 4/2014 |
| WO | 2014027022 A1 | 2/2014 |
| WO | 2015095542 A1 | 6/2015 |
| WO | 2019245397 A1 | 12/2019 |
| WO | 2020002454 A1 | 1/2020 |
| WO | WO2020002454 † | 1/2020 |
| WO | 2020104192 A1 | 5/2020 |

OTHER PUBLICATIONS

Anonymous: "GNPD—Banana & Belgian Cocoa Flavored Smoothie Mix with Whey Protein Isolate," Nov. 1, 2017, Retrieved from the Internet: URL:https:jwww.gnpd.comjsinatrajrecordpag e/5215293/ from search/pR41Pi3yJf/?page=1 [retrieved on Sep. 5, 2018].
Magrabar, "Datasheet Magrabar MD-20-S-FG," Feb. 2019.
Magrabar, "Datasheet Magrabar MD4925," Oct. 2020.
Cambridge Commodities, Clear whey protein, internet May 18, 2020: https://www.cambridgecommodities.com/ingredients/ingredient-view,clear-whey-protein_3191.htm.
Innova New products database—Product ID 6215551—Muscletech Iso Whey Clear Ultra-Pure Protein Isolate dietary Supplement With Orange Dreamsicle Flavor, Feb. 2020.
Innova New products database—Product ID 6682395—Myprotein Clear Whey Isolate Drink Mix With Wild Cherry Flavor, Jun. 2020.
Fitness Informant, "Muscle Tech Iso Whey Clear Flavors Review: I can't believe I'm drinking protein," Nov. 25, 2019, video review available at youtube at: https://www.youtube.com/watch?reload=9 &app=desktop&v=WOiLRvM2iPU.
Cambridge Commodities, Silicone antifoam, internet May 18, 2020: https://www.cambridgecommodities.com/ingredients/ingredient-view,silicone-antifoam_2952.htm.
Muscle Nectar, "Foaming in Whey Protein", available at www.musclenectar.com/blogs/blog/is-foaming-in-whey-protein-shake-causing-you-a-concern Oct. 25, 2019).†
Pietragalla J. et al. "Chapter 16: Water soluble carbohydrate content", Physiological Breeding II: A Field Guide to Wheat Phenotyping, pp. 83-86 (2012).†
White S. S. et al. "Influence of heating and acidification on the flavor of whey protein isolate", J. Dairy Science 96, pp. 1366-1379 (2013).†
Wright B. J. et al. "The Impact of Agglomeration and Storage on Flavor and Flavor Stability of Whey Protein Concentrate 80% and Whey Protein Isolate", Journal of Food Science 74 (1), pp. S17-S29 (2009).†

\* cited by examiner
† cited by third party

*Primary Examiner* — Jenna A Watts
(74) *Attorney, Agent, or Firm* — Lisa Mueller; Tristan A. Fuierer; Casimir Jones SC

(57) ABSTRACT

The present invention pertains to a new instant beverage powder comprising whey proteins and having a neutral pH, which powder is suitable for preparing transparent beverages. The invention furthermore relates to a method for producing an instant beverage powder, a transparent beverage product produced from the instant beverage powder and a method for preparing the transparent beverage, use of the instant beverage powder and a kit comprising the instant beverage powder product.

23 Claims, 14 Drawing Sheets

Foam breakdown

NEUTRAL INSTANT BEVERAGE WHEY PROTEIN POWDER

CROSS REFERENCE TO RELATED APPLICATIONS

This application is a national stage application of PCT/EP2021/068357 filed Jul. 2, 2021, which claims priority to European Application No. 20184068.3 filed Jul. 3, 2020, each of which are hereby incorporated by reference in their entirety.

FIELD OF THE INVENTION

The present invention pertains to an instant beverage powder suitable for preparing a transparent beverage, a method for producing an instant beverage powder, a transparent beverage product produced from the instant beverage powder and a method for preparing the transparent beverage, use of the instant beverage powder and a kit comprising the instant beverage powder product.

BACKGROUND

Instant beverage powders developed as a nutritional supplement for sports nutrition are particularly likely to contain whey proteins, which are incorporated for their unique nutritional benefits for athletes. Some medical and therapeutic nutritional beverages also include whey proteins because of their abundant supply of essential amino acids for protein synthesis, digestibility and health benefits.

The instant beverage powder is consumed as a shake, i.e. the instant beverage powder is dissolved in a liquid. Typically, the consumer prepares the shake shortly before its intake, by adding water or milk to the powder and then the consumer shakes the powder to a homogeneous beverage. This results in an unpleasant foam on top of the beverage. It is therefore common practice for commercial pH neutral instant beverage powders that they are lecithinated. The whey protein powder is thus coated with for example soy- or sunflower-lecithin in order to reduce the formation of foam and to increase the wettability of the powder. However, lecithination of a whey protein isolate has a number of drawbacks as the obtained beverage becomes unclear and the shake has an unpleasant fatty mouthfeeling. The pH neutral powders are also often dissolved in milk, which results in a beverage resembling a milkshake.

Another group of commercial instant whey protein powders is the acidic whey protein powders. These powders have the drawback that they have an astringent mouthfeeling and also suffer from an unpleasant foam formation upon preparation of the beverage.

SUMMARY OF THE INVENTION

The present inventors have observed that visual appearance and organoleptic characteristics such as mouthfeeling play a significant role in the selection of instant beverage powders by consumers.

Some of the challenges in incorporating a high amount of whey proteins in instant beverage powders is that they get an unpleasant mouthfeeling because of a high degree of astringency and they are perceived as being less watery. Another problem is that the beverage is turbid and/or has an unpleasant foam.

An object of the present invention is therefore to provide an instant beverage powder having a high amount of whey proteins, which powder is suitable for the preparation of a transparent beverage having a neutral pH and which has improved organoleptic and/or visual properties.

The present inventors have now discovered that such an instant beverage powder can be provided by combining a whey protein isolate with an antifoaming agent. The instant beverage powder when dissolved in water has a neutral pH, an appealing appearance, the beverages are thus transparent and the foam disappears within 60 seconds from their preparation. The mouthfeeling is pleasant as they have a low astringency and an attractive watery feeling.

Thus, an aspect of the invention pertains to an instant beverage powder suitable for preparing a transparent beverage when dissolved in water,
which powder comprises:
a total amount of protein of 60 to 97% w/w relative to the weight of the powder, preferably 65 to 96% w/w, more preferably 70-95% w/w, even more preferably 80-95% w/w relative to the weight of the powder, wherein at least 85% w/w of the protein is whey protein, preferably at least 87% w/w of the protein is whey protein, more preferably at least 90% w/w of the protein is whey protein, even more preferably at least 95% w/w of the protein is whey protein,
an antifoaming agent in an amount in the range of 0.01 to 5.0% w/w relative to the weight of the powder, preferably in the range of 0.015 to 3.0% w/w, more preferably in the range of 0.02 to 2.0% w/w,
at most 0.4% w/w lecithin relative to the weight of the powder,
wherein said powder has a pH in the range of pH 5.0 to 9.0, preferably 5.5 to 8.5, more preferably 6.0-8.0, even more preferably 6.5 to 7.5 at room temperature, when 7.5 gram of the instant beverage powder is dissolved in 100 milliliter water.

Another aspect of the invention pertains to a method for producing an instant beverage powder composition according to the present invention, wherein the method comprises the following steps:
a) providing
one or more protein sources,
an antifoaming agent, and
optionally, at least one additional ingredient,
b) mixing the one or more protein sources, the antifoaming agent, and an optional ingredient in amounts sufficient to obtain an instant beverage powder comprising:
a total amount of protein of 60 to 97% w/w relative to the weight of the instant beverage powder, preferably 65 to 96% w/w, more preferably 70-95% w/w, even more preferably 80-95% w/w relative to the weight of the instant beverage powder, wherein at least 85% w/w of the protein is whey protein, preferably at least 87% w/w of the protein is whey protein, more preferably at least 90% w/w of the protein is whey protein, even more preferably at least 95% w/w of the protein is whey protein,
the antifoaming agent in an amount in the range of 0.01 to 5.0% w/w relative to the weight of the instant beverage powder, preferably in the range of 0.015 to 3.0% w/w, more preferably in the range of 0.02 to 2.0% w/w,
at most 0.4% w/w lecithin relative to the weight of the instant beverage powder, and
optionally, packaging the instant beverage powder.

Yet an aspect of the invention pertains to a transparent beverage product comprising:
  a transparent liquid and
    the instant beverage powder according to the present invention, having a pH in the range of pH of 5.0 to 9.0, preferably 5.5 to 8.5, more preferably 6.0-8.0, even more preferably 6.5 to 7.5 at room temperature, and a turbidity of at most 350 NTU, preferably a turbidity of at most 200 NTU, even more preferably a turbidity of at most 100 NTU.

A further aspect of the invention pertains a method for preparing a transparent beverage product according to the invention, said method comprising
  i. combining a powder according to the invention with a transparent liquid,
  ii. Optionally adding at least one further ingredient, and
  iii. Mixing the powder and liquid obtained to form a transparent beverage.

Still another aspect of the invention pertains to a kit comprising the powder according to the present invention, said kit comprising
  i. a tool for measuring said powder, and
  ii. a container having a lid for opening and closing the container,
  wherein said container is for mixing said powder with a liquid to form a beverage product, and said container is adapted for drinking the beverage product directly from the container.

A further aspect of the invention pertains to using the powder according to the invention for producing a transparent pH neutral beverage.

DETAILED DESCRIPTION

Definitions

Figure 1:
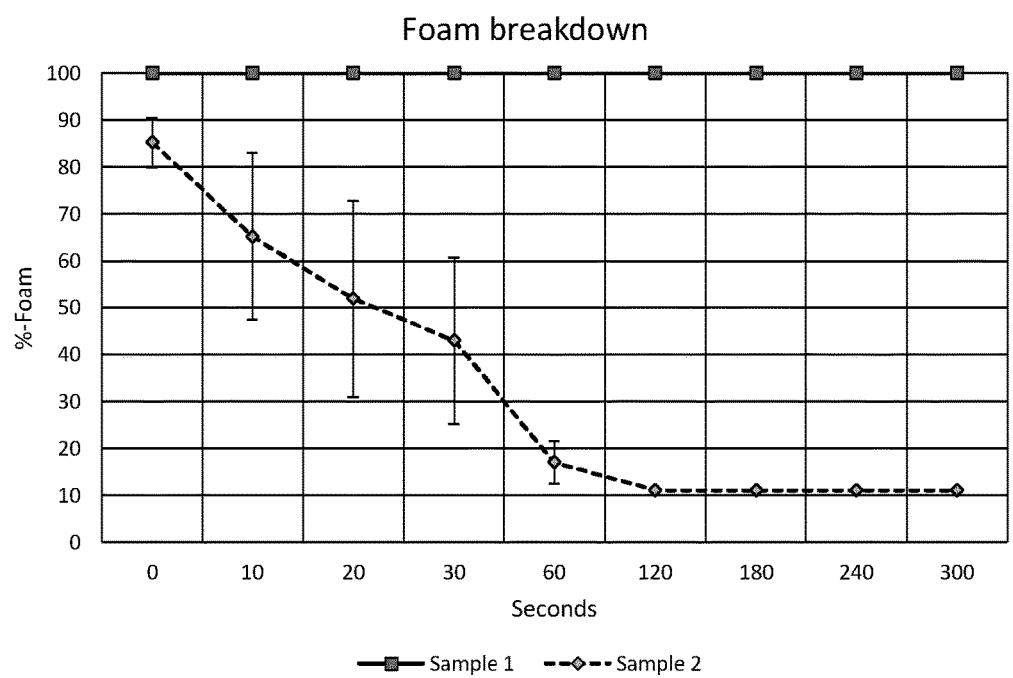
FIG. 1 illustrates the foam breakdown in percentage of a pH neutral whey protein isolate with (sample 2) and without an antifoaming agent (sample 1).

In the context of the present invention the term "instant beverage powder" or "instant beverage powder product" means a powder which can be converted to a liquid beverage by addition of a liquid, such as water.

In the context of the present invention the term "powder" refers to "instant beverage powder" unless another reference is specifically mentioned.

In the context of the present invention the term "beverage" and the terms "beverage preparation" and "preparation" used as a substantive relate to any water-based liquid which can be ingested as a drink, e.g. by pouring, sipping or tube-feeding.

In the context of the present invention the term "shake" is the beverage that is obtained by shaking the instant beverage powder with a liquid.

In the context of the present invention the term "anti-foaming agent" is an agent that reduces and/or removes the foam that occurs when mixing and shaking an instant beverage powder with a liquid.

In the context of the present invention the term "whey" pertains to the liquid phase that is left after the casein of milk has been precipitated and removed. Casein precipitation may e.g. be accomplished by acidification of milk and/or by use of rennet enzyme. Several types of whey exist, such as "sweet whey", which is the whey product produced by rennet-based precipitation of casein, and "acid whey" or "sour whey", which is the whey product produced by acid-based precipitation of casein. Acid-based precipitation of casein may e.g. be accomplished by addition of food acids or by means of bacterial cultures.

The term "milk serum" pertains to the liquid which remains when casein and milk fat globules have been removed from milk, e.g. by microfiltration or large pore ultrafiltration. Milk serum may also be referred to as "ideal whey".

The term "milk serum protein" or "serum protein" pertains to the protein, which is present in the milk serum.

In the context of the present invention, the term "whey protein" pertains to protein that is found in whey or in milk serum. Whey protein may be a subset of the protein species found in whey or milk serum, and even a single whey protein species or it may be the complete set of protein species found in whey or/and in milk serum.

The whey proteins used in the present invention are preferably whey proteins derived from mammalian milk, such as e.g. milk from human, cow, sheep, goat, buffalo, camel, llama, horse and/or deer. In some preferred embodiments of the invention, the whey proteins are bovine whey proteins.

In the context of the present invention, the main whey proteins of a standard whey protein concentrate from sweet whey are beta-lactoglobulin (BLG), alpha-lactalbumin (ALA), caseinomacropeptide (CMP), bovine serum albumin, immunoglobulin, osteopontin, lactoferrin, and lactoperoxidase.

In the context of the present invention, the term casein pertains to casein protein found in milk and encompasses both native micellar casein as found in raw milk, the individual casein species, and caseinates.

In the context of the present invention, the terms "whey protein concentrate" (WPC) and "serum protein concentrate" (SPC) pertain to dry or aqueous compositions which contain a total amount of protein of 20-89% w/w relative to total solids.

SPC typically contains no CMP or only traces of CMP.

The terms "whey protein isolate" (WPI) and "serum protein isolate" (SPI) pertain to dry or aqueous compositions which contain a total amount of protein of 90-100% w/w relative to total solids.

SPI typically contains no CMP or only traces of CMP.

In the context of the present invention, the terms "liquid" and "solution" encompass both compositions that are free of particulate matter and compositions that contain a combination of liquid and solid and/or semi-solid particles, such as e.g. protein crystals or other protein particles.

A "liquid" or a "solution" may therefore be a suspension or even a slurry. However, a "liquid" and "solution" are preferably pumpable.

In the context of the present invention, the term "dry" or "dried" means that the composition or product in question comprises at most 10% w/w water, preferably at most 6% w/w, more preferably at most 4% w/w and even more preferably even less.

In the context of the present invention, the term "physical microbial reduction" pertains to physical interaction with a composition, which results in reduction of the total amount of viable microorganisms of the composition. The term does not encompass addition of chemicals that result in killing of microorganisms. The term furthermore does not encompass the heat exposure to which the atomized droplets of liquid are exposed during spray-drying but include possible preheating prior to spray-drying.

In the context of the present invention, the pH of a powder refers to the pH of 10 g of the powder mixed into 90 g of demineralised water and is measured according to Example 1.10.

In the context of the present invention, the weight percentage (% w/w) of a component of a certain composition, product, or material means the weight percentage of that component relative to the weight of the specific composition, product, or material unless another reference (e.g total solids or total protein) is specifically mentioned.

In the context of the present invention, the term "weight ratio" between component X and component Y means the value obtained by the calculation mx/my wherein mx is the amount (weight) of components X and my is the amount (weight) of components Y.

In the context of the present invention the term "energy content" means the total content of energy contained in a food product. The energy content can be measured in kilojoule (kJ) or kilo calories (kcal) and is referred to as calories per amount of food product, e.g. kcal per 100 gram of the food product. One example is a beverage having an energy content of 350 kcal/100 gram of the beverage.

The total energy content of a food product includes the energy contribution from all the macronutrients present in the food product, e.g. energy from protein, lipid and carbohydrate. The distribution of energy from the macronutrients in the food product can be calculated based on the amount of the macronutrients in the food product and the contribution of the macronutrient to the total energy content of the food product. The energy distribution can be stated as energy percent (E %) of the total energy content of the food product. For example for a beverage comprising 20 E % protein, 50 E % carbohydrate and 30 E % lipid, this means that 20% of the total energy comes from protein, 50% of the total energy comes from carbohydrate and 30% of the total energy comes from fat (lipid).

In the context of the present invention the term "nutritionally complete nutritional supplement" is understood as a food product comprising protein, lipid and carbohydrate and further comprising vitamins, minerals and trace elements, where the beverage has a nutrient profile matching a complete and healthy diet.

In the context of the present invention the term "nutritionally incomplete supplement" means food products comprising one or more macro nutrients and optionally further comprising vitamins, minerals and trace elements. A nutritionally incomplete beverage may comprise protein as the only nutrient or may for example comprise protein and a carbohydrate.

The term "nutrient" means a substance used by an organism to survive, grow and reproduce. Nutrients can be either macronutrients or micronutrients. Macronutrients are nutrients that provide energy when consumed e.g. protein, lipid and carbohydrate. Micronutrients are nutrients like vitamins, minerals and trace elements.

In the context of the present invention the term "protein fraction" relates to proteins of the composition in question e.g. the proteins of a powder or a beverage preparation.

In the context of the present invention the term "protein source" relates to the source or sources providing the protein of the instant beverage powder or the transparent beverage e.g. a composition comprising proteins, such as a whey protein isolate.

In the context of the present invention the term "astringency" relates to a mouthfeeling. Astringency feels like a contraction of cheek muscles and results in increased saliva production. Thus, astringency is not a taste as such, but a physical mouth feeling and time-dependent feeling in the mouth.

In the context of the present invention the term "watery" relates to a water-like mouthfeel which is hydrating, low viscous and non-astringent.

Thus, watery mouthfeel is not a taste as such, but a physical mouth feeling and time-dependent feeling in the mouth.

In the context of the present invention the term "minerals" as used herein, unless otherwise specified, refers to any one of major minerals, trace or minor minerals, other minerals, and combinations thereof. Major minerals include calcium, phosphorus, potassium, sulfur, sodium, chlorine, magnesium. Trace or minor minerals include iron, cobalt, copper, zinc, molybdenum, iodine, selenium, manganese and other minerals include chromium, fluorine, boron, lithium, and strontium.

In the context of the present invention the terms "lipid", "fat", and "oil" as used herein unless otherwise specified, are used interchangeably to refer to lipid materials derived or processed from plants or animals. These terms also include synthetic lipid materials so long as such synthetic materials are suitable for human consumption.

In the context of the present invention the term "transparent" encompasses a beverage preparation having a visibly clear appearance and which allows light to pass and through which distinct images appear. A transparent beverage has a turbidity of at most 350 NTU.

In the context of the present invention the terms "opaque" encompasses a beverage preparation having a visibly unclear appearance and it has a turbidity of more than 350 NTU.

The terms "consists essentially of" and "consisting essentially of" mean that the claim or feature in question encompasses the specified materials or steps and those that do not materially affect the basic and novel characteristic(s) of the claimed invention.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to". The terms "comprising" and "containing" are used interchangeably.

In the context of the present invention, the phrase "Y and/or X" means "Y" or "X" or "Y and X". Along the same line of logic, the phrase "$n_1, n_2, \ldots, n_{i-1}$, and/or $n_i$"means" $n_1$" or "$n_2$" or ... or "$n_{i-1}$" or "$n_i$" or any combination of the components: $n_1, n_2, \ldots n_{i-1}$, and $n_i$.

An aspect of the invention pertains to an instant beverage powder suitable for preparing a transparent beverage when dissolved in water,
which powder comprises:
a total amount of protein of 60 to 97% w/w relative to the weight of the powder, preferably 65 to 96% w/w, more preferably 70-95% w/w, even more preferably 80-95% w/w relative to the weight of the powder, wherein at least 85% w/w of the protein is whey protein, preferably at least 87% w/w of the protein is whey protein, more preferably at least 90% w/w of the protein is whey protein, even more preferably at least 95% w/w of the protein is whey protein,
an antifoaming agent in an amount in the range of 0.01 to 5.0% w/w relative to the weight of the powder, preferably in the range of 0.015 to 3.0% w/w, more preferably in the range of 0.02 to 2.0% w/w,
at most 0.4% w/w lecithin relative to the weight of the powder,
wherein said powder has a pH in the range of pH 5.0 to 9.0, preferably 5.5 to 8.5, more preferably 6.0-8.0, even more preferably 6.5 to 7.5 at room temperature, when 7.5 gram of the instant beverage powder is dissolved in 100 milliliter water.

Instant beverage powders having a neutral pH and comprising a high amount of protein of 60 to 97% w/w and an antifoaming agent are very beneficial for a number of reasons. The inventors have thus found that surprisingly the beverages produced using the instant beverage powder have a pleasant mouthfeeling with a lower astringency, and a more watery feeling compared to traditionally lecithinated whey protein beverages or to acidic whey protein beverages. Another surprising advantage of the present invention is that it has a more appealing visual appearance as the dissolved instant beverage powder is transparent and the foam of the beverage is broken down very shortly after its preparation.

The inventors have also found that not only the turbidity, but also the foam stability is surprisingly affected by the pH value. Instant beverage powders having lower pH values of for example pH 5.14 still have an unwanted stable foam 300 seconds after its preparation. The inventors have also found that the turbidity increases with decreasing pH values, and decreases with increasing pH values. It was thus found that products which are both clear end have a fast foam breakdown are obtained when pH of the samples is above pH 6 and when the samples comprise an antifoaming agent.

Therefore, in even more preferred embodiments of the invention the instant beverage powder has a pH in the range of pH 6.0 to 9.0. This is also demonstrated in examples 10 and 13.

In other embodiments of the invention the instant beverage powder has a pH in the range of pH 6.0 to 8.5.

The inventors have found that lecithin have an impact on the transparency of the dissolved instant beverage powder. It is therefore advantageous that the content of lecithin is low.

In an embodiment of the present invention the instant beverage powder comprises at most 0.3% w/w lecithin relative to the weight of the powder, preferably at most 0.2% w/w lecithin relative to the weight of the powder, more preferably at most 0.1% w/w lecithin relative to the weight of the powder, even more preferably at most 0.05% w/w lecithin relative to the weight of the powder.

In preferred embodiments of the present invention, the instant beverage powder comprises at most 0.15% w/w lecithin relative to the weight of the powder, more preferably at most 0.075% w/w lecithin relative to the weight of the powder.

In other preferred embodiments of the present invention the instant beverage powder comprises 0-0.20% w/w lecithin relative to the weight of the powder, more preferably 0-0.175% w/w lecithin relative to the weight of the powder, more preferably 0-0.15% w/w lecithin relative to the weight of the powder, even more preferably 0-0.10% w/w lecithin relative to the weight of the powder.

In a preferred embodiment of the present invention the instant beverage powder does not contain lecithin or it contains substantially no lecithin.

In preferred embodiments of the present invention the instant beverage powder comprises a total amount of protein of 60 to 97% w/w relative to the weight of the powder, wherein 85-100% w/w of the protein is whey protein.

In preferred embodiments of the present invention the instant beverage powder comprises a total amount of protein of 65 to 96% w/w, wherein 87-100% of the protein is whey protein.

In more preferred embodiments of the present invention the instant beverage powder comprises a total amount of protein of 70-95% w/w, wherein 90-100% of the protein is whey protein.

In even more preferred embodiments of the present invention the instant beverage powder comprises a total amount of protein of 80-95% w/w, wherein 95-100% of the protein is whey protein.

In an embodiment of the present invention the instant beverage powder comprises a total amount of protein of 60-95% w/w, wherein 85-99% of the protein is whey protein.

In some preferred embodiments of the invention, the instant beverage powder comprises an antifoaming agent in an amount in the range of 0.01 to 2.0% w/w relative to the weight of the powder, preferably in the range of 0.015 to 2.5% w/w, more preferably in the range of 0.02 to 1.5% w/w.

In some preferred embodiment of the invention the instant beverage powder comprises an antifoaming agent, wherein the antifoaming agent comprises silicon dioxide ($SiO_2$).

The inventors have found that in some embodiments of the present invention it is advantageous that the antifoaming agent comprises a combination of silicon dioxide ($SiO_2$) and polydimethylsiloxane ($CH_3[Si(CH_3)_2O]_nSi(CH_3)_3$ n=4-20) and/or a combination of silicon dioxide ($SiO_2$) and an oil, preferably a vegetable oil, more preferably canola oil and/or soybean oil. The inventors found that using these antifoaming agents in combination with a pH neutral whey protein isolate surprisingly results in a more transparent beverage and a faster foam breakdown.

Therefore, in some preferred embodiments of the invention the antifoaming agent comprises or even consists of silicon dioxide ($SiO_2$) and polydimethylsiloxane ($CH_3[Si(CH_3)_2O]_nSi(CH_3)_3$ n=4-20) and/or a combination of silicon dioxide ($SiO_2$) and an oil, preferably a vegetable oil, more preferably canola oil and/or soybean oil.

In some preferred embodiments of the invention the antifoaming agent of the instant beverage powder is provided by an antifoaming composition comprising the antifoaming agent and a solid carrier, and optionally one or more emulsifiers.

In preferred embodiments of the invention, when the antifoaming agent is provided by an antifoaming composition, the antifoaming composition comprises:
the antifoaming agent in an amount of 1.0-20% w/w relative to the weight of the antifoaming composition, even more preferably in an amount of 2.0-6.0% w/w relative to the weight of the antifoaming composition,
the carrier in an amount of 70-95% w/w relative to the weight of the antifoaming composition, even more preferably in an amount of 75-90% w/w relative to the weight of the antifoaming composition,
optionally, the emulsifier in an amount of 0.5-10% w/w relative to the weight of the antifoaming composition, even more preferably in an amount of 1.0-5.0% w/w relative to the weight of the antifoaming composition.

In some other embodiments of the invention the instant beverage powder of the invention comprises
the antifoaming agent in an amount 1.0-20% w/w relative to the weight of the antifoaming composition, preferably in an amount of 1.0-15% w/w relative to the weight of the antifoaming composition, more preferably in an amount of 1.0-10% w/w relative to the weight of the antifoaming composition, even more preferably in an amount of 2.0-6.0% w/w relative to the weight of the antifoaming composition
the carrier in an amount of 70-95% w/w relative to the weight of the antifoaming composition, more preferably in an amount of 72-92% w/w relative to the weight of the antifoaming composition, more preferably in an amount of 73-91% w/w relative to the weight of the antifoaming composition, even more preferably in an amount of 75-90% relative to the weight of the antifoaming composition,
optionally the emulsifier in an amount of 0.5-10% w/w relative to the weight of the antifoaming composition, more preferably in an amount of 0.75-7.0% w/w relative to the weight of the antifoaming composition, even more preferably in an amount of 1.0-5.0% w/w relative to the weight of the antifoaming composition.

In other preferred embodiments of the invention, when the antifoaming agent is provided by an antifoaming composition, the antifoaming composition comprises:
the antifoaming agent in an amount of 1-40% w/w relative to the weight of the antifoaming composition, even more preferably in an amount of 2-35% w/w relative to the weight of the antifoaming composition, even more preferably in an amount of 3-30% w/w relative to the weight of the antifoaming composition, even more preferably in an amount of 5-30% w/w relative to the weight of the antifoaming composition,
the carrier in an amount of 60-90% w/w relative to the weight of the antifoaming composition, even more preferably in an amount of 75-90% w/w relative to the weight of the antifoaming composition,
optionally, the emulsifier in an amount of 0-20% w/w relative to the weight of the antifoaming composition, even more preferably in an amount of 1.0-15.0% w/w relative to the weight of the antifoaming composition.

In some preferred embodiments of the invention the carrier of the antifoaming composition comprises sodium tripolyphosphate and/or maltodextrin.

In some preferred embodiments of the invention the carrier of the antifoaming composition comprises a water soluble carbohydrate such as maltodextrin and/or corn starch or sodium tripolyphosphate.

In a preferred embodiment of the invention the carrier of the antifoaming composition comprises maltodextrin.

In some preferred embodiments of the invention the antifoaming composition comprises a carrier in an amount of 60-90% w/w relative to the weight of the antifoaming composition, even more preferably in an amount of 75-90% w/w relative to the weight of the antifoaming composition.

In some preferred embodiments of the invention the antifoaming composition comprises an emulsifier.

In some preferred embodiments of the invention the antifoaming composition comprises an emulsifier, wherein the emulsifier of the antifoaming composition comprises one or more of glycerol monostearate, Polyoxyethylene 20 Sorbitan Monostearate and 9-octadecemoic acid.

In some other preferred embodiments of the invention the antifoaming composition comprises an emulsifier, wherein the emulsifier of the antifoaming composition comprises fatty acids and fatty acid esters.

In some other preferred embodiments of the invention the antifoaming composition comprises an emulsifier, wherein the emulsifier preferably comprises one or more of an oleic acid, a stearic acid, and/or a lactic acid.

In some other preferred embodiments of the invention the antifoaming composition comprises an emulsifier, which is a fatty acid ester which includes one or more of propane-1,2-diol esters of fatty acids, mono- and diglycerides of fatty acids, and/or polyglycerol esters of fatty acids.

In some preferred embodiments of the invention the antifoaming composition comprises an emulsifier as defined above.

In some preferred embodiments of the invention the antifoaming composition comprises an emulsifier in an amount of 0-20% w/w relative to the weight of the antifoaming composition, more preferably in an amount of 0.5-20.0% w/w relative to the weight of the antifoaming composition, more preferably in an amount of 0.5-15.0% w/w relative to the weight of the antifoaming composition, even more preferred an emulsifier in an amount of 0.5-7.5% w/w relative to the weight of the antifoaming composition, more preferred an emulsifier in an amount of 0.5-4.5% w/w relative to the weight of the antifoaming composition.

In some preferred embodiments of the invention the antifoaming agent comprises one or more of water-based anti-foaming agents, silicon-based anti-foaming agents, polyethylene-glycol and polypropylene glycol copolymers antifoaming agents, oils and/or fatty acid based anti-foaming agents.

The inventors have found that it in some embodiments of the present invention it is advantageous that the antifoaming agent comprises a silicon-based antifoaming agent, preferably silicon dioxide ($SiO_2$), synthetic amorphous silica ($SiO_2$) and/or a polysiloxane, as this surprisingly results in a more transparent beverage and a faster foam breakdown.

Therefore, in some preferred embodiments of the invention the antifoaming agent comprises or even consists of a silicon-based antifoaming agent, preferably silicon dioxide ($SiO_2$), synthetic amorphous silica and/or a polysiloxane, wherein the polysiloxane is a polydimethylsiloxane, $[Si(CH_3)_2O-]_{n=4-20}$.

The inventors have also found that it in some other embodiments of the present invention it is advantageous that the antifoaming agent comprises an oil, preferably canola oil and/or soybean oil.

Therefore, in some preferred embodiments of the invention the antifoaming agent comprises or even consists of a silicon-based antifoaming agent and/or an oil selected from the list comprising or even consisting of silicon dioxide ($SiO_2$), synthetic amorphous silica, polysiloxane, wherein the polysiloxane is a polydimethylsiloxane, $[Si(CH_3)_2O-]_{n=4-20}$, wherein the oil is preferably canola oil and/or soybean oil.

In some other preferred embodiments of the invention the present inventors have found that it is advantageous that the antifoaming agent comprises a fatty acid, preferably stearic acid.

In the context of the present invention the term "fatty acid" is either a free fatty acid or a salt thereof.

Therefore, in some preferred embodiments of the invention the antifoaming agent comprises or even consists of a silicon-based antifoaming agent and/or an oil selected from the list comprising or even consisting of silicon dioxide ($SiO_2$), synthetic amorphous silica, polysiloxane, wherein the polysiloxane is a polydimethylsiloxane, $[Si(CH_3)_2O-]_{n=4-20}$, an oil preferably canola oil, soybean oil and/or a fatty acid, preferably stearic acid.

In some other embodiments of the invention the antifoaming composition preferably comprises a silicon oxide, a polydimethylsiloxane $[Si(CH_3)_2O-]_{n=4-20}$), sodium tripolyphosphate and one or more emulsifiers.

In some other preferred embodiments of the invention the antifoaming composition comprises a silicon oxide, a polydimethylsiloxane, sodium tripolyphosphate and glycerol Monosterate, Polyoxyethylene 20 Sorbitan Monostearate and 9-octadecemoic acid.

The inventors have found that it is advantageous that the instant beverage powder have a neutral pH, as they have found that it has an impact on the transparency of the dissolved instant beverage powder.

In some preferred embodiments of the invention the protein of the instant beverage powder is provided by one or more protein sources having a pH in the range of pH 5.0 to 9.0, preferably 5.5 to 8.5, more preferably 6.0-8.0, even more preferably 6.5 to 7.5, most preferably the protein of the instant beverage powder is provided by one or more protein sources having a pH in the range for 6.0 to 9.0 at room temperature, when 7.5 gram of the whey protein is dissolved in 100 milliliter water.

In other embodiments of the invention the protein of the instant beverage powder is provided by one or more protein sources having a pH in the range of pH 6.0 to 8.5.

The pH can be regulated by the addition of acids or bases to the instant beverage powder by using for example powdered citric acid monohydrate (acid) or potassium carbonate (alkaline).

In some preferred embodiments of the invention the whey protein is provided by a whey protein source comprising one or more of a whey protein concentrate (WPC), a whey protein isolate (WPI), a serum protein concentrate (SPC), a serum protein isolate (SPI), sweet whey, cheese whey, and/or acid whey and/or hydrolysates thereof.

The present inventors have found that it is advantageous that the protein source of the instant beverage powder has a high whey protein content.

In some preferred embodiments of the invention the powder comprises whey protein, wherein the whey protein is preferably provided by whey protein isolate (WPI) or serum protein isolate (SPI).

In some preferred embodiments of the invention, the whey protein comprises one or more of beta-lactoglobulin, alpha-lactalbumin, caseinomacropeptide, or combinations thereof.

The inventors have also found that it is advantageous that the protein of the instant beverage powder is provided by one or more protein sources having a low amount of carbohydrates and/or fat, as the inventors have found that it has an impact on the transparency and organoleptic properties.

It is therefore preferred that the protein of the instant beverage powder is provided by one or more protein sources that comprise 0.02 to 5.0% w/w carbohydrate relative to the weight of the instant beverage powder, preferably 0.05 to 3.0% w/w carbohydrate relative to the weight of the instant beverage powder, even more preferably 0.05 to 2.0% w/w carbohydrate relative to the weight of the instant beverage powder, even more preferably 0.075 to 2.0% w/w carbohydrate relative to the weight of the instant beverage powder.

In some embodiments of the present invention the protein of the instant beverage powder is provided by one or more protein sources that comprise 0.001 to 4.0% w/w fat relative to the weight of the powder, preferably 0.01 to 2.0% w/w fat relative to the weight of the powder, more preferably 0.005 to 1.0% w/w fat relative to the weight of the powder, even more preferably 0.005 to 0.5% w/w fat relative to the weight of the powder, most preferably 0.001 to 0.05% w/w fat relative to the weight of the powder.

In some embodiments of the present invention, the protein of the instant beverage powder is provided by one or more protein sources that comprise at most 4.0% w/w fat relative to the weight of the powder, that comprises at most 3.0% w/w fat relative to the weight of the powder, preferably at most 2.0% w/w fat relative to the weight of the powder, more preferably at most 1.0% w/w fat relative to the weight of the powder, even more preferably at most 0.5% w/w fat relative to the weight of the powder, most preferably at most 0.05% w/w fat relative to the total weight of the powder.

In preferred embodiments of the invention the protein of the instant beverage powder has a degree of protein denaturation of at most 20%, more preferably at most 10% and most preferably at most 5%.

The visual appearance that the consumer experiences when the instant beverage powder is dissolved in water is of high importance for the consumer.

An advantage of the present invention is that the beverage produced by the instant beverage powder of the present invention has an appealing appearance already within 60 seconds after its preparation, which is typically the time after which the beverage is consumed. The beverage is thus transparent and the foam is broken down. The beverage product is therefore much more attractive to the consumer, than the traditional lecithinated whey protein beverage/shake, which also has a neutral pH, but which is turbid, have a higher viscosity and a less attractive taste.

In some preferred embodiments of the invention the instant beverage powder has a turbidity of at most 500 NTU after 300 seconds when 7.5 gram of the instant beverage powder is dissolved in 100 milliliter water having a temperature of 20-25 degrees C., preferably at most 400 NTU after 300 seconds, more preferably at most 380 NTU after 300 seconds, even more preferably at most 350 NTU after 300 seconds. In other preferred embodiments the powder has a turbidity of at most 300 NTU after 300 seconds when 7.5 gram of the instant beverage powder is dissolved in 100 milliliter water having a temperature of 25 degrees C., or more preferably the powder has a turbidity of at most 250 NTU after 300 seconds when 7.5 gram of the instant beverage powder is dissolved in 100 milliliter water having a temperature of 25 degrees C.

The inventors have also found that a steady state has occurred after 30 minutes i.e. 1800 seconds of the preparation of the beverage/shake. In some other preferred embodiments of the invention the instant beverage powder has a turbidity of at most 100 NTU after 1800 seconds when 7.5 gram of the instant beverage powder is dissolved in 100 milliliter water having a temperature of 25 degrees C., preferably at most 50 NTU after 1800 seconds, more preferably at most 25 NTU after 1800 seconds.

The inventors have also found that it is often advantageous that the protein source of the instant beverage powder and/or the instant beverage powder as such has a low amount minerals. The inventors have found that a low mineral content of the protein source(s) and/or of the powder can have a positive impact on the transparency of the beverage that is produced when the powder is dissolved in water.

In some preferred embodiments of the invention the powder of the invention has a mineral content of 1.0 to 5.0% w/w relative to the weight of the powder, preferably of 1.2 to 4.5% w/w, more preferably of 1.4 to 3.0% w/w.

In other preferred embodiments of the invention the sum of sodium, magnesium, phosphorous, chloride, potassium and calcium of the instant beverage powder is in the range of 1.0 to 3.0% w/w relative to the weight of the powder, preferably a sum of sodium, magnesium, phosphorous, chloride, potassium and calcium in the range of 1.2 to 2.9% w/w relative to the weight of the powder, more preferably a sum of sodium, magnesium, phosphorous, chloride, potassium and calcium of 1.4 to 2.8% w/w relative to the weight of the powder, even more preferably a sum of sodium, magnesium, phosphorous, chloride, potassium and calcium in the range of 1.5 to 2.75% w/w relative to the weight of the powder.

In some preferred embodiments of the present invention the sum of magnesium and calcium of the instant beverage powder is in the range of 0.01 to 0.60% w/w relative to the weight of the powder, preferably in the range of 0.02 to 0.50% w/w relative to the weight of the powder, more preferably in the range of 0.03 to 0.45% w/w relative to the weight of the powder In some preferred embodiments of the invention, the protein of the instant beverage powder is provided by one or more protein sources having a mineral content of 1.0 to 5.0% w/w relative to the weight of the protein source, preferably of 1.2 to 4.5% w/w relative to the weight of the protein, more preferably of 1.4 to 3.0% w/w relative to the weight of the protein source.

In some preferred embodiments of the invention, the protein of the instant beverage powder is provided by one or more protein sources having a sum of sodium, magnesium, phosphorous, chloride, potassium and calcium in the range of 1.0 to 3.0% w/w relative to the weight of the protein, preferably in the range of 1.2 to 2.9% w/w relative to the weight of the protein, more preferably of 1.4 to 2.8% w/w relative to the weight of the protein source, even more preferably in the range of 1.5 to 2.75% w/w relative to the weight of the protein.

In some other preferred embodiments of the invention the protein of the instant beverage powder is provided by one or more protein sources having a sum of magnesium and calcium in the range of 0.01 to 0.60% w/w relative to the weight of the protein, preferably of 0.02 to 0.50% w/w relative to the weight of the protein, more preferably of 0.03 to 0.45% w/w relative to the weight of the protein.

In an embodiment of the invention the instant beverage powder furthermore comprises at least one additional ingredient selected from the group consisting of vitamins, flavouring agent, colouring agent, minerals, sweeteners, antioxidants, food acids, fat, prebiotics, probiotics and non-whey protein.

The further ingredient ensures that the instant beverage powder contains the desired nutrients, i.e. nutrients specifically adapted to for example patients suffering from a from a kidney disease or it can be used as a nutritional supplement, e.g. by sportsmen or athletes.

In an embodiment of the present invention the powder furthermore comprises one or more sweeteners, such as carbohydrate sweeteners, polyols and/or high intensity sweeteners.

The choice of the sweetener may depend on the beverage to be produced, and the consumer of the product, e.g. it may be adjusted to a specific diagnosis of a patient. High-intensity sugar sweeteners (e.g. aspartame, acetsulfam-K or sucralose) may be used in beverage where no energy contribution from the sweetener is desired, whereas for beverages having a natural profile, natural sweeteners (e.g. steviol glycosides, sorbitol or sucrose) may be used.

In some preferred embodiments of the present invention the instant beverage powder comprises at least one high intensity sweetener, preferably one or more of aspartame, cyclamate, sucralose, acesulfame salt, neotame, saccharin, stevia extract, a steviol glycoside such as e.g. rebaudioside A, or a combination thereof.

In embodiments of the present invention the instant beverage powder comprises a total amount of high intensity sweeteners (HIS) in the range of 0.01-4.0% w/w relative to the total weight of the powder, preferably a total amount of high intensity sweeteners in the range of 0.05-3.0% w/w relative to the total weight of the powder, more preferably a total amount of high intensity sweeteners in the range of 0.08-2.0% w/w relative to the total weight of the powder.

In particular preferred embodiments of the present invention the instant beverage powder comprises a high intensity sweetener which is sucralose.

In particular preferred embodiments of the present invention the instant beverage powder comprises a high intensity sweetener which is sucralose in the range of 0.01-4.0% w/w relative to the total weight of the powder, preferably a total amount of high intensity sweeteners in the range of 0.05-3.0% w/w relative to the total weight of the powder, more preferably a total amount of high intensity sweeteners in the range of 0.08-2.0% w/w relative to the total weight of the powder.

The instant beverage powder of the present invention may comprise other macronutrients than proteins. In some embodiments of the invention, the instant beverage powder furthermore comprises carbohydrates. The total carbohydrate content of the instant beverage powder of the invention depends on the intended use of the instant beverage powder. For instant beverage powders used for sportsmen or athletes, carbohydrate in the form of sugars may be added in order to boost immediate energy for the sportsman.

In some preferred embodiments of the invention, the instant beverage powder furthermore comprises at least one source of carbohydrate. In one exemplary embodiment, the at least one source of carbohydrate is selected from the group consisting of: sucrose, maltodextrin, corn syrup solids, saccharose, maltose, sucromalt, maltitol powder, glycerine, glucose polymers, corn syrup, modified starches, resistant starches, rice derived carbohydrates, isomaltulose, white sugar, glucose, fructose, lactose, high fructose corn syrup, honey, sugar alcohols, fructooligosaccharides and combinations thereof.

In a preferred embodiment of the present invention the instant beverage powder furthermore comprises a source of carbohydrate which is maltodextrin and/or sucrose lactose.

In some embodiments of the present invention the instant beverage powder furthermore comprises a total amount of carbohydrates in the range of 0.005-20% w/w relative to the total weight of the powder, preferably a total amount of carbohydrates in the range of 0.02-15.0% w/w relative to the total weight of the powder, more preferably in the range of 0.05-10.0% w/w relative to the total weight of the powder, even more preferably in the range of 0.05-5.0% w/w relative to the total weight of the powder, in other embodiments it is even more preferable that the instant beverage powder furthermore comprises a total amount of carbohydrates in the range of 0.075-2.0% w/w relative to the total weight of the powder.

In an embodiment of the present invention the instant beverage powder comprises at most 5% w/w fiber relative to the total weight of the powder, preferably at most 3% w/w fiber relative to the total weight of the powder, more preferably at most 1% w/w fiber relative to the total weight of the powder, even more preferably at most 0.5% w/w fiber relative to the total weight of the powder.

In a preferred embodiment of the present invention, the instant beverage powder contains substantially no fiber.

Exemplary fibers are inulin, modified corn and wheat dextrins, fructo-oligosaccharide, polydextrose, Acacia gum, pectin, guar gum, locust bean gum, hemicelluloses, beta glucan, and the like as well as mixtures thereof.

The instant beverage powder of the present invention opens up to a new product category of instant beverage powders suitable for preparing transparent beverages having a neural pH. It thus enables customers to formulate flavoured water protein shakes, instead of the known milky shakes fatty ones like the lecithinated shakes having a neutral pH and instead of the acidic protein shakes having an astringent mouthfeeling.

In an embodiment of the present invention, the instant beverage powder furthermore comprises one or more natural and/or artificial flavouring agents.

In some embodiments of the present invention the instant beverage powder comprises a flavouring agent, selected from the group comprising or even consisting of vanilla, chocolate, cacao, coconut, strawberry, melon, raspberry, blueberry, blackberry, banana, pineapple, coffee, lemon, lime, orange, cola, tea.

In some embodiments of the present invention the instant beverage powder furthermore comprises a total amount of flavouring agent in the range of 0.1 to 3.0% w/w relative to the total weight of the powder, preferably a total amount of flavouring agent in the range of 0.4-3.0% w/w relative to the total weight of the powder.

The colour of the instant beverage powder is also of importance to the consumer. In some embodiments of the present invention the instant beverage powder furthermore comprises one or more natural and/or artificial colouring agents.

Examples of natural colours are Annatto (E160b), a reddish-orange dye made from the seed of the achiote, Caramel coloring (E150a-d), made from caramelized sugar, Car-mine (E120), a red dye derived from the cochineal insect, *Dactylopius coccus*, Elderberry juice (E163), Lycopene (E160d), Paprika (E160c), Turmeric (E100) and/or combinations thereof.

Examples of artificial colours are E104: Quinoline Yellow, E122: Carmoisine, E124: Ponceau 4R, E131: Patent Blue V, E142: Green S, FD&C Blue No. 1, Brilliant Blue FCF, E133 (blue shade), FD&C Blue No. 2—Indigotine, E132 (indigo shade), FD&C Green No. 3—Fast Green FCF, E143 (turquoise shade), FD&C Red No. 3—Erythrosine, E127 (pink shade, commonly used in glace cherries), FD&C Red No. 40—Allura Red AC, E129 (red shade), FD&C Yellow No. 5 Tartrazine, E102 (yellow shade), FD&C Yellow No. 6—Sunset Yellow FCF, E110 (orange shade) and/or combinations thereof.

The instant beverage powder of the present invention comprises protein and may in addition to the protein comprise fat depending on the intended use of the instant beverage powder.

As the instant beverage powder is typically used as a sport nutrition, the fat content of the instant beverage powder is low.

The inventors have also found that it is often advantageous that the protein source of the instant beverage powder and/or the instant beverage powder as such has a low fat content. The inventors have found that a low fat content of the one or more protein sources and/or of the instant beverage powder can have a positive impact on the transparency of the beverage that is produced when the powder is dissolved in water and on the organoleptic properties of the beverage.

In some embodiments of the present invention, the instant beverage powder furthermore comprises at most 4.0% w/w fat relative to the total weight of the powder, the instant beverage powder furthermore comprises at most 3.0% w/w fat relative to the total weight of the powder preferably at most 2.0 w/w fat relative to the total weight of the powder, more preferably at most 1.0% w/w fat relative to the total weight of the powder, even more preferably at most 0.5% w/w fat relative to the total weight of the powder, most preferably at most 0.05% w/w fat relative to the total weight of the powder.

In some embodiments of the present invention, the instant beverage powder furthermore comprises 0.001 to 4.0% w/w fat relative to the total weight of the powder, preferably 0.01 to 2.0 w/w fat relative to the total weight of the powder, more preferably 0.005 to 1.0% w/w fat relative to the total weight of the powder, even more preferably 0.005 to 0.5% w/w fat relative to the total weight of the powder, at most preferably 0.001 to 0.05% w/w fat relative to the total weight of the powder.

In a preferred embodiment of the present invention, the instant beverage powder contains substantially no fat.

In some preferred embodiments of the invention the instant beverage powder has a water content in an amount of at most 6% w/w, such as at most 5% w/w, preferably at most 4% w/w, more preferably at most 3% w/w, and even more preferably at most 2% w/w.

In some preferred embodiments of the invention the instant beverage powder has an energy content in the range of about 100-500 kcal/100 grams of powder, preferably the powder has an energy content in the range of about 200-400 kcal/100 grams of powder.

In some preferred embodiments of the present invention the instant beverage powder of the invention is for use as a food ingredient.

An aspect of the present invention pertains to a method of producing an instant beverage powder as defined herein, wherein the method comprises the following steps:
  a) providing:
    one or more protein sources,
    an antifoaming agent, and
    optionally, at least one additional ingredient,
  b) mixing the one or more protein sources, the antifoaming agent, and an optional ingredient in amounts sufficient to obtain an instant beverage powder comprising:
    a total amount of protein of 60 to 97% w/w relative to the weight of the powder, preferably 65 to 96% w/w, more preferably 70-95% w/w, even more preferably 80-95% w/w relative to the weight of the powder, wherein at least 85% w/w of the protein is whey protein, preferably at least 87% w/w of the protein is whey protein, more preferably at least 90% w/w of the protein is whey protein, even more preferably at least 95% w/w of the protein is whey protein,
    the antifoaming agent in an amount in the range of 0.01 to 5.0% w/w relative to the weight of the instant beverage powder, preferably in the range of 0.015 to 3.0% w/w, more preferably in the range of 0.02 to 2.0% w/w,
    at most 0.4% w/w lecithin relative to the weight of the instant beverage powder, preferably at most 0.2% w/w lecithin relative to the weight of the instant beverage powder, and
  c) optionally, packaging the instant beverage powder.

The one or more protein sources or antifoaming agents of step a) preferably have the same chemical composition as described in the context of the instant beverage powder. Embodiments and preferences mentioned in the context of the instant beverage powder therefore equally apply to the method of producing the instant beverage powder.

In a preferred embodiment of the present invention the one or more protein sources, the antifoaming agent and the optional further ingredients are selected to provide an instant beverage powder having a pH in the range of pH 5.0 to 9.0, preferably 5.5 to 8.5, more preferably 6.0-8.0, even more preferably 6.5 to 7.5 at room temperature, when 7.5 gram of the instant beverage powder is dissolved in 100 milliliter water.

In a preferred embodiment of the present invention the one or more protein sources, the antifoaming agent and the optional further ingredients are selected to provide an instant beverage powder having a pH in the range of pH 6.0 to 9.0 at room temperature, when 7.5 gram of the instant beverage powder is dissolved in 100 milliliter water.

In a preferred embodiment of the present invention the instant beverage powder comprises at most 0.2% w/w lecithin relative to the weight of the instant beverage powder.

In preferred embodiments of the present invention step b) comprises mixing the one or more protein sources, the antifoaming agent, and an optional ingredient in amounts sufficient to obtain an instant beverage powder comprising a total amount of protein of 60 to 97% w/w relative to the weight of the powder, wherein 85-100% w/w of the protein is whey protein, preferably a total amount of protein of 65 to 96% w/w, wherein 87-100% of the protein is whey protein, more preferably a total amount of protein of 70-95% w/w, wherein 90-100% of the protein is whey protein, even more preferably a total amount of protein of 80-95% w/w, wherein 95-100% of the protein is whey protein.

In some preferred embodiments of the invention the whey protein is provided by a whey protein source comprising one or more of a whey protein concentrate (WPC), a whey protein isolate (WPI), a serum protein concentrate (SPC), a serum protein isolate (SPI), sweet whey, cheese whey, and/or acid whey, and/or hydrolysates thereof.

The present inventors have found that it is advantageous that the one or more protein sources used for preparing the instant beverage powder have a high whey protein content.

In some preferred embodiments of the invention the powder comprises whey protein, wherein the whey protein is preferably provided by whey protein isolate or serum protein isolate.

The inventors have also found that it is advantageous that the protein source used for preparing the instant beverage powder has a low amount of carbohydrates and/or fat, as the inventors have found that it has an impact on transparency and/or the organoleptic properties.

It is therefore preferred that the protein of the instant beverage powder is provided by one or more protein sources that comprise 0.02 to 5.0% w/w carbohydrate relative to the weight of the instant beverage powder, preferably 0.05 to 3.0% w/w carbohydrate relative to the weight of the instant beverage powder, even more preferably 0.05 to 2.0% w/w carbohydrate relative to the weight of the instant beverage powder, even more preferably 0.075 to 2.0% w/w carbohydrate relative to the weight of the instant beverage powder.

It is also preferred that the protein of the instant beverage powder is provided by one or more protein sources that comprise 0.005 to 5.0% w/w fat relative to the weight of the powder, preferably 0.01 to 3.0% w/w fat relative to the weight of the powder, more preferably 0.01 to 2.0% w/w fat relative to the weight of the powder, even more preferably 0.005 to 1.0% w/w fat relative to the weight of the powder, even more preferably 0.05 to 0.5% w/w fat relative to the weight of the powder.

It is also preferred that the protein of the instant beverage powder is provided by one or more protein sources that comprise at most 5.0% w/w fat relative to the weight of the powder, preferably at most 3.0% w/w fat relative to the weight of the powder, more preferably at most 2.0% w/w fat relative to the weight of the powder, even more preferably at most 1.0% w/w fat relative to the weight of the powder, even more preferably at most 0.5% w/w fat relative to the weight of the powder.

In a preferred embodiment step a) comprises at least one additional ingredient.

In a preferred embodiment the at least one additional ingredient is selected from the group consisting of vitamins, flavouring agent, colouring agent, minerals, sweeteners, antioxidants, food acids, fat, prebiotics, probiotics and non-whey protein.

An aspect of the present invention pertains to a transparent beverage product comprising:
  a transparent liquid and
  the instant beverage powder of the invention as defined herein
having a pH in the range of 5.0 to 9.0, preferably 5.5 to 8.5, more preferably 6.0-8.0, even more preferably 6.5 to 7.5, most preferably 6.0 to 9.0, at room temperature, and a turbidity of at most 350 NTU, preferably a turbidity of at most 200 NTU, even more preferably a turbidity of at most 100 NTU.

The instant beverage powder of the transparent beverage preferably has the same chemical composition as described in the context of the instant beverage powder above. Embodiments and preferences mentioned in the context of the instant beverage powder therefore equally apply to the instant beverage powder of the beverage product.

In a preferred embodiment of the present invention the beverage comprises at most 30 grams of said instant beverage powder per 100 grams of said transparent liquid, preferably at most 20 grams of said instant beverage powder per 100 grams of said transparent liquid, most preferably at most 10 grams of said instant beverage powder per 100 grams of said transparent liquid.

In some embodiments of the present invention the beverage comprises 1.0 to 30 grams of said instant beverage powder per 100 gram of said transparent liquid, preferably 1.0 to 20 grams of said instant beverage powder per 100 grams of said transparent liquid, most preferably 1.0 to 10 grams of said instant beverage powder per 100 grams of said transparent liquid and in other preferred embodiments of the present invention the beverage comprises 2.0 to 9.0 grams of said instant beverage powder per 100 grams of said transparent liquid.

In other high protein embodiments of the present invention the beverage preferably comprises 6.0 to 30 grams of said instant beverage powder per 100 gram of said transparent liquid, more preferably 8.0 to 30 grams of said instant beverage powder per 100 grams of said transparent liquid, and in other embodiments preferably 5.0 to 25 grams of said instant beverage powder per 100 grams of said transparent liquid.

In some embodiments of the present invention the beverage product has a total protein content of at least 2.0% w/w relative to the weight of the beverage, preferably at least 3.0% w/w, more preferably at least 4.0% w/w, even more preferably of at least 5.0% w/w.

In some embodiments of the present invention the beverage product has a total protein content of 2.0-40% w/w relative to the weight of the beverage, preferably 3.0-30% w/w, more preferably 4.0-30% w/w, even more preferably 5.0-30% w/w.

In some other preferred embodiments of the present invention the beverage product has a total protein content of 2.0-30% w/w relative to the weight of the beverage, preferably 3.0-20% w/w relative to the weight of the beverage, more preferably 4.0-18% w/w relative to the weight of the beverage.

In other preferred embodiments of the present invention the beverage product has a total protein content of 8.0-30% w/w relative to the weight of the beverage and even more preferred 10-25% w/w.

In preferred embodiments of the invention the beverage product has a viscosity in the range of 3-100 centipoise (cP), measured at 22 degrees Celsius at a shear rate of 50/s, preferably a viscosity in the range 5-50 centipoise (cP), measured at 22 degrees Celsius at a shear rate of 50/s.

The liquid of said beverage product is transparent.

In some preferred embodiments of the invention said liquid of the beverage product is selected from one or more of a transparent liquid selected from the list of water, milk products, vegetable juice, beverages and combinations thereof.

In preferred embodiments of the invention said transparent liquid of the beverage product is water.

In other preferred embodiments of the invention the beverage product is a ready-to-drink beverage.

An aspect of the present invention pertains to a method for preparing a transparent beverage product as defined herein, said method comprising
  i. combining an instant beverage powder as defined herein with a transparent liquid,
  ii. optionally adding at least one additional ingredient, and
  iii. mixing the powder and liquid obtained to form a uniform beverage.

The instant beverage powder of the transparent beverage preferably has the same chemical composition as described in the context of the instant beverage powder above. Embodiments and preferences mentioned in the context of the instant beverage powder therefore equally apply to the instant beverage powder of the beverage product.

In a preferred embodiment of the present invention the method for preparing a transparent beverage product comprises combining at most 30 grams of said instant beverage powder per 100 grams of said transparent liquid, preferably at most 20 grams of said instant beverage powder per 100 grams of said transparent liquid, more preferably at most 18 grams of said instant beverage powder per 100 grams of said liquid, most preferably at most 10 grams of said instant beverage per 100 grams of said transparent liquid.

In some embodiments of the present invention the method comprises combining 1.0 to 30 grams of said instant beverage powder per 100 gram of said transparent liquid, preferably 1.0 to 20 grams of said instant beverage powder per 100 grams of said transparent liquid, most preferably 1.0 to 10 grams of said instant beverage powder per 100 grams of said transparent liquid and in other preferred embodiments of the present invention the beverage comprises 2.0 to 9.0 grams of said instant beverage powder per 100 grams of said transparent liquid.

In other high protein embodiments of the present invention the method preferably comprises combining 6.0 to 30 grams of said instant beverage powder per 100 gram of said transparent liquid, more preferably 8.0 to 30 grams of said instant beverage powder per 100 grams of said transparent liquid, and in other embodiments preferably 5.0 to 25 grams of said instant beverage powder per 100 grams of said transparent liquid In an embodiment of the present invention of the method for preparing a transparent beverage the transparent liquid is selected from the list consisting of water, milk products, vegetable juice, beverages and combinations thereof.

In a preferred embodiment of the present invention of the method for preparing a transparent beverage, the liquid is water.

The water is preferably cold water.

In preferred embodiments of the present invention step iii) comprises that the instant beverage powder and the liquid is being shaken for 5 to 15 seconds.

The optional additional ingredient of the method for preparing a transparent beverage is preferably transparent when dissolved in water.

An aspect of the present invention pertains to a kit comprising the instant beverage powder as defined herein, said kit comprising
  i. a tool for measuring said powder, and
  ii. a container having a lid for opening and closing the container,
  wherein said container is for mixing said powder with a liquid to form a beverage product, and said container is adapted for drinking the beverage product directly from the container.

For reasons of convenience the instant beverage powder may be sold in a kit comprising the instant powder of the invention, a tool for measuring said powder, and a container having a lid for opening and closing the container, wherein said container is for mixing said powder with a liquid to form a food product, and said container is adapted for drinking the food product directly from the container. Examples of useful containers are e.g. bottles, cartons, bricks, pouches and/or bags.

The consumer buying the kit will obtain all items for readily preparing a transparent beverage product according to the invention. The measuring tool ensures that the consumer weighs out the correct amount of instant powder for the amount of water in the container.

In one embodiment of the invention, the tool for measuring the instant powder is a spoon and the container is a drinking bottle. In one embodiment of the invention the container has an inside indication of how much liquid to fill in the container. In one embodiment of the invention the lid has an opening adapted for drinking the liquid food product directly from the container and for closing while mixing the liquid food product.

In an aspect of the present invention the instant beverage powder as defined herein is used for producing a transparent pH neutral beverage.

A preferred embodiment of the invention, pertains to an instant beverage powder obtainable by one or more methods described herein.

It should be noted that the embodiments and features described in the context of one of the aspects of the present invention also apply to the other aspects of the invention.

All patent and non-patent references cited in the present application are hereby incorporated by reference in their entirety.

The invention will now be described in further details in the following non-limiting examples.

In a preferred embodiment of the present invention the instant beverage powder suitable for preparing a transparent beverage when dissolved in water,
  which powder comprises:
    a total amount of protein of 60 to 97% w/w relative to the weight of the instant beverage powder, preferably 65 to 96% w/w, more preferably 70-95% w/w, even more preferably 80-95% w/w relative to the weight of the powder, wherein at least 85% w/w of the protein is whey protein, preferably at least 87% w/w of the protein is whey protein, more preferably at least 90% w/w of the protein is whey protein, even more preferably at least 95% w/w of the protein is whey protein,
    an antifoaming agent in an amount in the range of 0.01 to 5.0% w/w relative to the weight of the instant beverage powder, preferably in the range of 0.015 to 3.0% w/w, more preferably in the range of 0.02 to 2.0% w/w relative to the weight of the instant beverage powder,
    at most 0.2% w/w lecithin relative to the weight of the instant beverage powder, wherein said powder has a pH in the range of pH 6.0 to 9.0 at room temperature, when 7.5 gram of the instant beverage powder is dissolved in 100 milliliter water.

In a preferred embodiment of the present invention the instant beverage powder suitable for preparing a transparent beverage when dissolved in water,
  which powder comprises:
    a total amount of protein of 60 to 97% w/w relative to the weight of the instant beverage powder, preferably 65 to 96% w/w, more preferably 70-95% w/w, even more preferably 80-95% w/w relative to the weight of the powder, wherein at least 85% w/w of the protein is whey protein, preferably at least 87% w/w of the protein is whey protein, more preferably at least 90% w/w of the protein is whey protein, even more preferably at least 95% w/w of the protein is whey protein,
    an antifoaming agent in an amount in the range of 0.01 to 5.0% w/w relative to the weight of the instant beverage powder, preferably in the range of 0.015 to 3.0% w/w, more preferably in the range of 0.02 to 2.0% w/w relative to the weight of the instant beverage powder,
    at most 0.2% w/w lecithin relative to the weight of the instant beverage powder,
  wherein said powder has a pH in the range of pH 6.0 to 9.0 at room temperature, when 7.5 gram of the instant beverage powder is dissolved in 100 milliliter water, wherein the instant beverage powder has a turbidity of at most 100 NTU after 1800 seconds when 7.5 gram of the instant beverage powder is dissolved in 100 milliliter water having a temperature of 25 degrees C.

In a preferred embodiment of the present invention the instant beverage powder suitable for preparing a transparent beverage when dissolved in water,
which powder comprises:
a total amount of protein 70-95% w/w, even more preferably 80-95% w/w relative to the weight of the powder, wherein at least 90% w/w of the protein is whey protein, even more preferably at least 95% w/w of the protein is whey protein
an antifoaming agent in an amount in the range of 0.015 to 3.0% w/w, more preferably in the range of 0.02 to 2.0% w/w,
at most 0.4% w/w lecithin relative to the weight of the powder, preferably at most 0.2% w/w lecithin relative to the weight of the powder,
at most 1.0% w/w fat, even more preferably at most 0.5% w/w fat relative to the weight of the powder,
wherein said powder has a pH in the range of 6.0-8.0, even more preferably 6.5 to 7.5 at room temperature, when 7.5 gram of the instant beverage powder is dissolved in 100 milliliter water.

In a preferred embodiment of the present invention the instant beverage powder suitable for preparing a transparent beverage when dissolved in water,
which powder comprises:
a total amount of protein 70-95% w/w, even more preferably 80-95% w/w relative to the weight of the powder, wherein 90-100% w/w of the protein is whey protein, even more preferably 95-100% w/w of the protein is whey protein
an antifoaming agent in an amount in the range of 0.015 to 3.0% w/w, more preferably in the range of 0.02 to 2.0% w/w,
at most 0.4% w/w lecithin relative to the weight of the powder, preferably at most 0.2% w/w lecithin relative to the weight of the powder
wherein said powder has a pH in the range of 6.0-8.0, even more preferably 6.5 to 7.5 at room temperature, when 7.5 gram of the instant beverage powder is dissolved in 100 milliliter water.

In a preferred embodiment of the present invention the instant beverage powder suitable for preparing a transparent beverage when dissolved in water,
which powder comprises:
a total amount of protein of 70-95% w/w, even more preferably 80-95% w/w relative to the weight of the powder, wherein at least 90% w/w of the protein is whey protein, even more preferably at least 95% w/w of the protein is whey protein
an antifoaming agent in an amount in the range of 0.015 to 3.0% w/w, more preferably in the range of 0.02 to 2.0% w/w,
at most 0.4% w/w lecithin relative to the weight of the powder, preferably at most 0.2% w/w lecithin relative to the weight of the powder
0.005 to 10.0% w/w carbohydrate, even more preferably 0.05 to 5.0% w/w carbohydrate relative to the weight of the powder,
wherein said powder has a pH in the range of 6.0-8.0, even more preferably 6.5 to 7.5 at room temperature, when 7.5 gram of the instant beverage powder is dissolved in 100 milliliter water.

In a preferred embodiment of the present invention the instant beverage powder suitable for preparing a transparent beverage when dissolved in water,
which powder comprises:
a total amount of protein of 70-95% w/w, even more preferably 80-95% w/w relative to the weight of the powder, wherein at least 90% w/w of the protein is whey protein, even more preferably at least 95% w/w of the protein is whey protein
an antifoaming agent in an amount in the range of 0.015 to 3.0% w/w, more preferably in the range of 0.02 to 2.0% w/w,
at most 0.4% w/w lecithin relative to the weight of the powder, preferably at most 0.2% w/w lecithin relative to the weight of the powder,
a mineral content of 1.0 to 5.0% w/w relative to the weight of the powder, more preferably 1.2 to 4.5% w/w, even more preferably 1.4 to 3.0% w/w relative to the weight of the powder,
wherein said powder has a pH in the range of 6.0-8.0, even more preferably 6.5 to 7.5 at room temperature, when 7.5 gram of the instant beverage powder is dissolved in 100 milliliter water.

In a preferred embodiment of the present invention the instant beverage powder suitable for preparing a transparent beverage when dissolved in water,
which powder comprises:
a total amount of protein 70-95% w/w, even more preferably 80-95% w/w relative to the weight of the powder, wherein at least 90% w/w of the protein is whey protein, even more preferably at least 95% w/w of the protein is whey protein
an antifoaming agent in an amount in the range of 0.015 to 3.0% w/w, more preferably in the range of 0.02 to 2.0% w/w,
at most 0.4% w/w lecithin relative to the weight of the powder, preferably at most 0.2% w/w lecithin relative to the weight of the powder,
a sum of calcium and magnesium of 0.01 to 0.6% w/w relative to the weight of the powder, more preferably 0.02 to 0.5% w/w, even more preferably 0.03 to 0.45% w/w relative to the weight of the powder,
wherein said powder has a pH in the range of 6.0-8.0, even more preferably 6.5 to 7.5 at room temperature, when 7.5 gram of the instant beverage powder is dissolved in 100 milliliter water.

In a preferred embodiment of the present invention the instant beverage powder suitable for preparing a transparent beverage when dissolved in water,
which powder comprises:
a total amount of protein 70-95% w/w, even more preferably 80-95% w/w relative to the weight of the powder, wherein at least 90% w/w of the protein is whey protein, even more preferably at least 95% w/w of the protein is whey protein
an antifoaming agent in an amount in the range of 0.015 to 3.0% w/w, more preferably in the range of 0.02 to 2.0% w/w,
at most 0.4% w/w lecithin relative to the weight of the powder, preferably at most 0.2% w/w lecithin relative to the weight of the powder
at most 1.0% w/w fat, even more preferably at most 0.5% w/w fat relative to the weight of the powder,
at least one additional ingredient selected from the group consisting of vitamins, flavouring agent, colouring agent, minerals, sweeteners, antioxidants, food acids, fat, prebiotics, probiotics and non-whey protein wherein said powder has a pH in the range of 6.0-8.0, even more preferably 6.5 to 7.5 at room temperature, when 7.5 gram of the instant beverage powder is dissolved in 100 milliliter water.

In a preferred embodiment of the present invention the instant beverage powder suitable for preparing a transparent beverage when dissolved in water, which powder comprises:
  a total amount of protein of 60 to 97% w/w relative to the weight of the instant beverage powder, preferably 65 to 96% w/w, more preferably 70-95% w/w, even more preferably 80-95% w/w relative to the weight of the powder, wherein at least 85% w/w of the protein is whey protein, preferably at least 87% w/w of the protein is whey protein, more preferably at least 90% w/w of the protein is whey protein, even more preferably at least 95% w/w of the protein is whey protein,
  an antifoaming agent in an amount in the range of 0.01 to 5.0% w/w relative to the weight of the instant beverage powder, preferably in the range of 0.015 to 3.0% w/w, more preferably in the range of 0.02 to 2.0% w/w relative to the weight of the instant beverage powder, wherein the antifoaming agent comprises or even consists of silicon dioxide ($SiO_2$) and polydimethylsiloxane ($CH_3[Si(CH_3)_2O]_nSi(CH_3)_3$ n=4-20) and/or a combination of silicon dioxide ($SiO_2$) and an oil, preferably canola oil and/or soybean oil.
  at most 0.2% w/w lecithin relative to the weight of the instant beverage powder,
wherein said powder has a pH in the range of pH 6.0 to 9.0 at room temperature, when 7.5 gram of the instant beverage powder is dissolved in 100 milliliter water.

In a preferred embodiment of the present invention the instant beverage powder suitable for preparing a transparent beverage when dissolved in water, which powder comprises:
  a total amount of protein of 60 to 97% w/w relative to the weight of the instant beverage powder, wherein at least 85% w/w of the protein is whey protein,
  an antifoaming agent in an amount in the range of 0.01 to 5.0% w/w relative to the weight of the instant beverage powder, wherein the antifoaming agent is provided by an antifoaming composition comprising the antifoaming agent, a solid carrier, and one or more emulsifiers
  at most 0.2% w/w lecithin relative to the weight of the instant beverage powder,
wherein said powder has a pH in the range of pH 6.0 to 9.0 at room temperature, when 7.5 gram of the instant beverage powder is dissolved in 100 milliliter water.

The instant beverage powder has a turbidity of at most 100 NTU after 1800 seconds when 7.5 gram of the instant beverage powder is dissolved in 100 milliliter water having a temperature of 25 degrees C.

EXAMPLES

Example 1: Methods of Analysis

Example 1.1: Determination Total Protein

The total protein content (true protein) of a sample is determined by:
1) Determining the total nitrogen of the sample following ISO 8968-1/2|IDF 020-1/2—Milk—Determination of nitrogen content—Part 1/2: Determination of nitrogen content using the Kjeldahl method.
2) Determining the non-protein nitrogen of the sample following ISO 8968-4|IDF 020-4—Milk—Determination of nitrogen content—Part 4: Determination of non-protein-nitrogen content.
3) Calculating the total amount protein as $(m_{total\ nitrogen} - m_{non\text{-}protein\text{-}nitrogen})*6.38$.

Example 1.2: Determination of Turbidity

Turbidity is the cloudiness or haziness of a fluid caused by large number of particles that are generally invisible to the naked eye, similar to smoke in air.

Turbidity is measured in nephelometric turbidity units (NTU).

20 mL beverages/samples were added to NTU-glass and placed in the Turbiquant® 3000 IR Turbidimeter. The NTU-value was measured after stabilisation and repeated twice.

Example 1.4: Determination of Foam

Foam is the gas and liquid phase that is entrapped on top of the liquid. This is visible to the naked eye, and can be measured with a ruler, from the top of the liquid phase and to the lid of the protein shaker.

Samples were prepared by using 6.6% protein in the solution/shake, which was weighed in a beaker. The powder was transferred to 300 grams of water in a 400 ml protein shaker with a metal shaker ball providing 20 g protein per serving. The dimensions of the shaker was height 11.5 cm, bottom diameter 6 cm and top diameter 5.6 cm. The protein shaker had a top and bottom diameter of 8.6 cm and 6 cm, where it was 11.5 cm high. A black cardboard was prepared, with a timer and ruler attached, then space was made for the protein shaker. A smartphone was attached on a tripod in front of the setup.

The mixture was shaken for 15 sec, and placed on black cardboard with timer, ruler and product code on post-it beside. Then the recorder and timer was started immediately. The setup was recorded for 5 minutes. Photographs were extracted from the video, where it was paused at time 0, 10, 20, 30, 60, 120, 180, 240, and 300 seconds. The samples were stored at room temperature at 25° C. between each measurement.

The foam was measured from the top of the liquid in centimeters with 2 decimals. This value was then divided by the full height (4.5 cm) and multiplied with 100 to obtain the foam in percentage. This was done to be able to compare other shaker sizes.

Example 1.5: Determination of Transparency by Imaging

Photographs of beverage preparations were conducted by placing samples according to example 1.4. The shakes were photographed using a smartphone and the inventors evaluated whether the shaker ball could be clearly observed through the shaker.

Example 1.6. Determination of Viscosity

The viscosity of beverage preparations was measured using a Rheometer (Anton Paar, Physica MCR301).

3.8 mL sample was added to cup DG26.7. Samples were equilibrated to 22° C., then pre-sheared for 30 sec. at 50 $s^{-1}$, followed by a 30 sec. equilibrium time and shear rate sweeps between 1 s$^{-1}$ and 200 s$^{-1}$ and 1 s$^{-1}$ were performed.

The viscosity is presented in the unit centipoise (cP) at a shear rate of 100 s$^{-1}$ unless otherwise stated. The higher the measured cP values, the higher the viscosity.

Alternatively, the viscosity was estimated using a Viscoman by Gilson and reported at a shear rate of about 300 s$^{-1}$

Example 1.7: Sensory Evaluation

The mixed protein beverage preparations underwent a descriptive sensory evaluation. 1 volume sample was mixed with 1 volume water and compared to soy lecithinated whey protein isolate and acidic whey protein isolate to form an attribute list prior to the final tasting session:

| Category | Attributes: |
|---|---|
| Mouth feeling | Watery |
| Mouth feeling | Drying, astringency |
| Preferred | Preference |

Water was used to cleanse the mouth of participants between each sample.

15 ml test sample at ambient temperature (20-25° C.) was served in small cups.

Test samples were each served to 21 individuals one time in three different blocks in randomised order.

The attributes (see table above) were rated on a scale with low intensity and high intensity.

Example 1.8: Determination of Ash Content

The ash content of a food product is determined according to NMKL 173:2005 "Ash, gravimetric determination in foods".

Example 1.9: Determination of the Total Solids of a Solution

The total solids of a solution may be determined according NMKL 110 2$^{nd}$ Edition, 2005 (Total solids (Water)—Gravimetric determination in milk and milk products). NMKL is an abbreviation for "Nordisk Metodikkomite for Nmringsmidler".

The water content of the solution can be calculated as 100% minus the relative amount of total solids (% w/w).

Example 1.10: Determination of pH

All pH values are measured using a pH glass electrode and are normalised to 20 degrees C.

The pH glass electrode (having temperature compensation) is rinsed carefully before and calibrated before use.

When the sample is in liquid form, then pH is measured directly in the liquid solution at 20 degrees C.

When the sample is a powder, 10 gram of a powder is dissolved in 90 ml of demineralised water at room temperature while stirring vigorously. The pH of the solution is then measured at 20 degrees C.

Example 1.11: Determination of the Water Content of a Powder

The water content of a food product is determined according to ISO 5537:2004 (Dried milk—Determination of moisture content (Reference method)). NMKL is an abbreviation for "Nordisk Metodikkomite for Nmringsmidler".

Example 1.12: Determination of the Amounts of Calcium, Magnesium, Sodium, Potassium, Phosphorus (ICP-MS Method)

The total amounts of calcium, magnesium, sodium, potassium, and phosphorus are determined using a procedure in which the samples are first decomposed using microwave digestion, and then the total amount of mineral(s) is determined using an ICP apparatus.

Apparatus:
The microwave is from Anton Paar and the ICP is an Optima 2000DV from PerkinElmer Inc.

Materials:
1 M HNO$_3$
Yttrium in 2% HNO$_3$
Suitable standards for calcium, magnesium, sodium, potassium, and phosphorus in 5% HNO$_3$ Pre-Treatment:
Weigh out 0.2 gram of powder sample or 1 g of liquid samples and transfer the powder to a microwave digestion tube. Add 5 mL 1M HNO$_3$. Digest the samples in the microwave in accordance with microwave instructions. Place the digested tubes in a fume cupboard, remove the lid and let volatile fumes evaporate.

Measurement Procedure:
Transfer pre-treated sample to DigiTUBE using a known amount of Milli-Q water. Add a solution of yttrium in 2% HNO$_3$ to the digestion tube (about 0.25 mL per 50 mL diluted sample) and dilute to known volume using Milli-Q water. Analyse the samples on the ICP using the procedure described by the manufacturer.

A blind sample is prepared by diluting a mixture of 10 mL 1M HNO$_3$ and 0.5 mL solution of yttrium in 2% HNO$_3$ to a final volume of 100 mL using Milli-Q water.

At least 3 standard samples are prepared having concentrations which bracket the expected sample concentrations.

The detection limit for liquid samples is 0.005 g/100 g sample for Ca, Na, K and Phosphor and 0.0005 g/100 g sample for Mg. The detection limit for powder samples is 0.025 g/100 g sample for Ca, Na, K and Pho and 0.0005 g/100 g sample for Mg.

When at or below detection limits of Pho the value of the detection limit is used in examples to demonstrate the maximum amount of Pho present as a worst-case scenario.

Example 1.13: Determination of the Total Amount of Lactose

The total amount of lactose is determined according to ISO 5765-2:2002 (IDF 79-2: 2002) "Dried milk, dried ice-mixes and processed cheese—Determination of lactose content—Part 2: Enzymatic method utilizing the galactose moiety of the lactose".

Example 1.14: Determination of the Total Amount of Carbohydrate

The amount of carbohydrate is determined by use of Sigma Aldrich Total Carbohydrate Assay Kit (Cat MAK104-1KT) in which carbohydrates are hydrolysed and converted to furfural and hydroxyfurfurals which are converted to a chromagen that is monitored spectrophotometrically at 490 nm.

Example 1.15: Determination of the Total Amount of Lipids

The amount of lipid is determined according to ISO 1211:2010 (Determination of Fat Content—Röse-Gottlieb Gravimetric Method).

Example 1.16: Determination the Number of Colony-Forming Units

The determination of the number of colony-forming units per gram sample is performed according to ISO 4833-1: 2013(E): Microbiology of food and animal feeding stuffs— horizontal method for the enumeration of microorganisms— Colony-count technique at 30° C.

Example 2: Preparation of the Instant Beverage Powder and Beverage Comprising a pH Neutral WPI and an Antifoaming Agent This example explains how the instant beverage powder of the invention is prepared. The instant beverage powder was prepared by weighing 22.5 grams of whey protein isolate powder having a neutral pH and 0.15 grams of an antifoam powder in a beaker on a scale. The two powdered ingredients were mixed until homogenous.

The instant beverage powder thus prepared comprises a total amount of protein of 88.4% w/w relative to the weight of the powder, 100% w/w of the protein is whey protein and an antifoaming agent in an amount of 0.0396% w/w relative to the weight of the instant beverage powder.

To prepare the beverage (sample 2) 300 ml of water was weighed out in a 400 ml protein shaker. The recipe is listed in table 1 below with the nutritionals. The powder mixture of whey protein isolate and antifoam was transferred on top of the water and shaken for 15 seconds.

The obtained beverage (sample 2) comprises 6.68 grams protein, 0.01 grams of carbohydrates and 0.01 g fat and 0.003 g antifoaming agent pr. 100 ml water. The pH of the beverage is 7.0

TABLE 1

Composition of the beverage (sample 2) comprising the instant beverage powder.

| Ingredients | Grams per Serving |
| --- | --- |
| Neutral whey protein isolate, see table 2 | 22.500 |
| Silicone Antifoam P19146, Cambridge Commodities (UK) composition | 0.150 |
| Water | 300 |

| Nutritionals | Per 100 ml |
| --- | --- |
| Energy | 27 Kcal |
| Protein | 6.68 g |
| Fat | 0.01 g |
| Carbohydrates | 0.01 g |

TABLE 2

Content of PH neutral Whey Protein isolate for preparing the instant beverage powder:

| | % w/w |
| --- | --- |
| Protein as is (N*6.38) | 89.3 |
| Lactose | 0.1 |
| Fat | 0.1 |
| Ash | 3.8 |
| Moisture | 5.5 |
| Sodium | 0.48 |
| Magnesium (Mg) | 0.01 |
| Phosphorous (P) | 0.21 |
| Chloride (Cl) | 0.06 |
| Potassium (K) | 1.15 |
| Calcium (Ca) | 0.07 |

100% w/w of the protein is whey protein.

For the preparation of sample 2, the whey protein isolate disclosed in table 2 was combined with an antifoam composed of Sodium Tripolyphosphate as the carrier, different sources of emulsifiers, with Polydimethylsiloxane and Silicon Dioxide as antifoaming agents. The complete composition of the used antifoam is described in table 3 below.

TABLE 3 content of the Silicone Antifoam P19146, from Cambridge Commodities (UK) composition.

| Ingredients | Function | % composition | CAS No | Source |
| --- | --- | --- | --- | --- |
| Sodium Tripolyphosphate | Carrier | <85 | 7758-29-4 | Synthetic |
| Water | Diluent | <15 | 7732-18-5 | — |
| Polydimethylsiloxane | Anti-foaming | <5 | 63148-62-9 | Synthetic |
| Glyceryl Monostearate | Emulsifier | <1 | 123-94-4 | Palm Oil |
| Polyoxyethylene 20 Sorbitan Monostearate | Emulsifier | <1 | 9005-67-8 | Corn |
| Silicon Dioxide | Anti-foaming agent | <1 | 7631-86-9 | Synthetic |
| Carboxymethyl cellulose | Rheology modifier | <1 | 9004-32-4 | Cotton |
| Potassium Sorbate | Preservative | <1 | 26434-61-5 | Synthetic |
| Citric acid | Acid | <1 | 77-92-9 | Corn, sweet potato or tapioca (*) |

TABLE 3-continued content of the Silicone Antifoam P19146, from Cambridge Commodities (UK) composition.

| Ingredients | Function | % composition | CAS No | Source |
|---|---|---|---|---|
| Hydrogen Chloride | Acidity Regulator | <1 | 7647-01-0 | Synthetic |
| 9-Octadecenoic Acid | Emulsifier | Trace | 112-80-1 | 9-Octadecenoic Acid |

Example 3: Preparation of a Neutral Lecithinated Beverage Powder/Shake, Sample 3

This example explains how the reference to prior art was prepared. This was used when investigating the surprising effects of the invention.

The instant powder was prepared by weighing 23.0 grams of Soy lecithinated pH neutral whey protein isolate powder in a beaker on a scale. The two powdered ingredients were mixed until homogenous.

A lecithinated instant beverage powder is prepared by a process, wherein a WPI having a neutral pH is spray coated with lecithin onto the powder's surface.

The lecithinated instant beverage powder comprises a total amount of protein of 87.0% w/w relative to the weight of the powder, and soy lecithin in an amount of 1. % w/w relative to the weight of the powder.

To prepare a beverage 300 ml water was weighed out in a 400 ml protein shaker. The full recipe is listed in the table 4 below with the nutritionals. The powder mixture of whey protein isolate was transferred on top of the water and shaken for 15 sec with 0.437 grams of soy lecitin.

The obtained beverage comprises 6.68 grams protein, 0.01 grams of carbohydrates and 0.15 fat pr. 100 ml water. The pH of the beverage is 7.95.

TABLE 4

Composition of the beverage comprising the lecithinated beverage powder.

| Ingredients | Grams per Serving |
|---|---|
| Soy lecithinated neutral whey protein isolate | 23.000 |
| Water | 300 |
| Nutritionals | per 100 ml |
| Energy | 27 Kcal |
| Protein | 6.68 g |
| Fat | 0.15 g |
| Carbohydrates | 0.01 g |

TABLE 5

Content of PH neutral soy lecithinated whey protein isolate comprises

| | % w/w |
|---|---|
| Protein as is (N*6.38) | 88.0 |
| Lactose | 0.1 |
| Fat | 1.1 |
| Ash | 3.8 |
| Moisture | 6.0 |
| Sodium | 0.48 |
| Magnesium (Mg) | 0.01 |
| Phosphorous (P) | 0.21 |

TABLE 5-continued

Content of PH neutral soy lecithinated whey protein isolate comprises

| | % w/w |
|---|---|
| Chloride (Cl) | 0.07 |
| Potassium (K) | 1.15 |
| Calcium (Ca) | 0.08 |

Example 4: Preparation of Instant Acidic Beverage Powder with Antifoaming Agent, Sample 4

This example explains how the reference to prior art was prepared. This was used when investigating the surprising effects of the invention. The sample was prepared by weighing 22.9 grams of acidic whey protein isolate powder and 0.15 grams of antifoam powder in a beaker on a scale. The two powdered ingredients were mixed until homogenous.

The acidic beverage powder thus prepared comprises a total amount of protein of 87.0% w/w relative to the weight of the powder, and antifoaming agent in an amount of 0.0391% w/w relative to the weight of the powder.

To prepare the beverage 300 ml of water was weighed out in a 400 ml protein shaker. The recipe is listed in table 6 below with the nutritionals. The powder mixture of whey protein isolate and antifoam was transferred on top of the water and shaken for 15 seconds.

The obtained beverage comprises 6.68 grams protein, 0.01 grams of carbohydrates and 0.01 g fat and 0.003 g antifoaming agent pr. 100 ml water. The pH of the beverage is 3.5

TABLE 6

Composition of the beverage comprising the instant beverage powder.

| Ingredients | Grams per Serving |
|---|---|
| Acidic Whey protein isolate | 22.500 |
| Silicone Antifoam P19146, Cambridge Commodities (UK) | 0.150 |
| Water | 300 |
| Nutritionals | Per 100 ml |
| Energy | 27 Kcal |
| Protein | 6.68 g |
| Fat | 0.01 g |
| Carbohydrates | 0.01 g |

TABLE 7

Content of pH acidic Whey Protein Isolate comprises

| | % w/w |
|---|---|
| Protein as is (N*6.38) | 89.0 |
| Lactose | 0.1 |
| Fat | 0.1 |
| Ash | 4.5 |
| Moisture | 6.0 |
| Sodium | 0.03 |
| Magnesium (Mg) | 0.01 |
| Phosphorous (P) | 1.43 |
| Chloride (Cl) | 0.07 |
| Potassium (K) | 0.03 |
| Calcium (Ca) | 0.03 |

Example 5: Effects of Antifoaming Agent

The purpose of this example was to investigate whether the addition of an antifoaming agent had an effect on the foam stability of a pH neutral whey protein isolate product.
Materials and Methods:

Two samples were prepared according to Example 2 and wherein sample 1 was without added antifoam and with the composition listed in table 8. Sample 2 was made according to example 2 with the same formulation composition and preparation.

TABLE 8

Composition of the sample 1, a beverage comprising the whey protein isolate beverage

| Ingredients | Grams per Serving |
|---|---|
| Neutral whey protein isolate | 22.500 |
| Water | 300 |
| Nutritionals | Per 100 ml |
| Energy | 27 Kcal |
| Protein | 6.68 g |
| Fat | 0.01 g |
| Carbohydrates | 0.01 g |

Then the samples were handled according to example 1.4, which was for the determination of foam.
Results:

When the foam was at 10% it was considered to be depleted. This was decided as there was a low layer of foam in all products, and the foam did not develop further.

In FIG. 1 it is illustrated how the neutral whey protein isolate without antifoam behaved, where it was stable for 300 seconds. When the antifoam was added to the neutral whey protein isolate the foam was broken down after 60 seconds.

Figure 2:
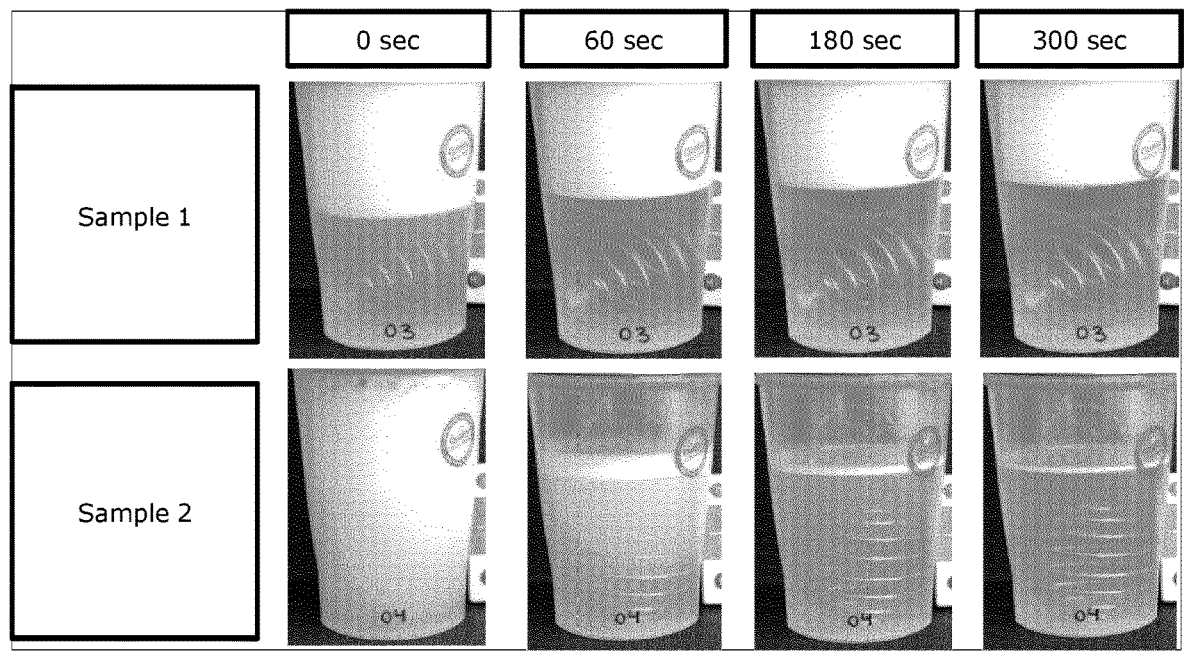
FIG. 2 shows the visual foam breakdown of pH neutral whey protein isolate with an antifoaming agent (sample 2) and a pH neutral whey protein isolate without an antifoaming agent (sample 1).

The visual development of the invention with and without antifoam has been illustrated in FIG. 2. The foam starts breaking down immediately after mixing in the invention, which can be observed by the larger bubbles in the foam. Furthermore, the foam in sample 1, which did not comprise antifoam did not have any larger bubbles after the 300 seconds. This indicates that the foam was stable and would continue to be so for a longer period.
Conclusion:

The addition of antifoam illustrated how the neutral whey protein isolate (WPI) needed the added antifoam. The foam in sample 1, which sample did not comprise an antifoaming agent was stable for 300 seconds, which would not be perceived as acceptable by the end consumer. When the antifoam was added to the neutral WPI see sample 2, the foam broke down within 60 seconds from the preparation of the beverage and it was appropriate and appealing to be consumed immediately after mixing, as there was visual foam breakdown initially.

Example 6: Comparison Between the Turbidity of the Invention and Prior Art Products The purpose of this example was to investigate whether there was a difference in turbidity when comparing the invention described in example 2 with prior art which have been described in example 3 and 4. The purpose was furthermore to investigate the difference in turbidity over time and after 30 minutes. Finally, it was to document the pH difference of the products.
Materials and Methods:

Example 6 was performed according to Example 1.2 where the turbidity was measured at 60, 120, 180, 240, 360, 420, 480, 540, and 600 seconds after the mixture was prepared according to examples 2, 3 and 4. The samples were stored at room temperature at 20-25° C. between each measurement. Furthermore, the three samples were evaluated after 30 minutes, to eliminate errors from bubble disturbance in the vials. After the evaluation the pH was measured according to example 1.10.

Figure 3:
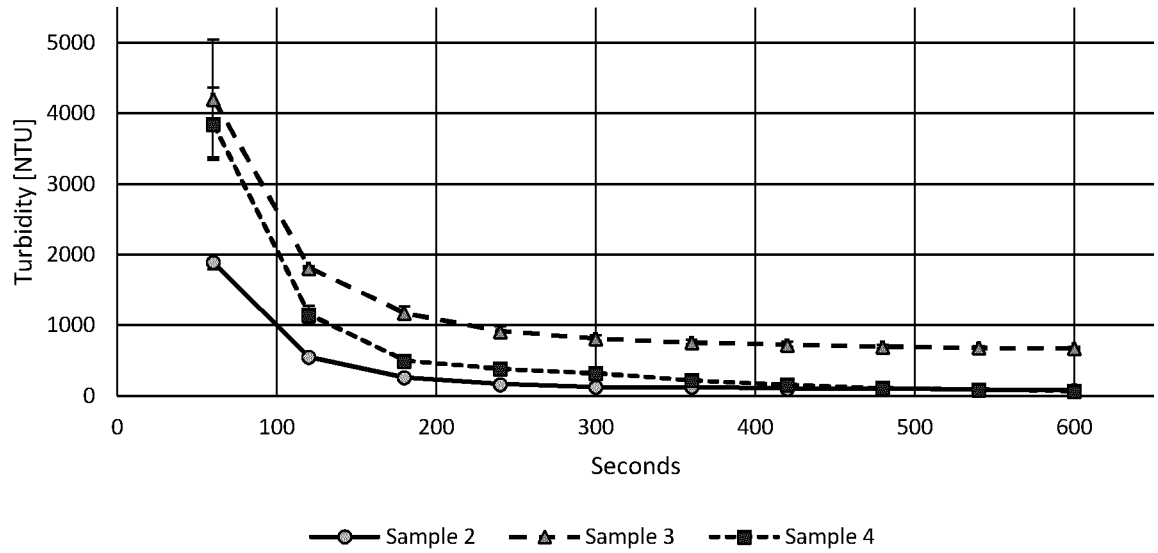
FIG. 3 shows the turbidity over time of a pH neutral whey protein isolate with antifoaming agent (sample 2), acidic whey protein isolate with antifoaming agent (sample 4) and of a soy lecithinated whey protein isolate (sample 3).

The three beverage samples comprise:
Sample 2: Was a pH neutral whey protein isolate with antifoaming agent and was prepared according to example 2.
Sample 3: Was a neutral soy lecithinated whey protein isolate and was prepared according to example 3.
Sample 4: Was an acidic whey protein isolate with antifoam and was prepared according to example 4.
Results:

FIG. 3 shows how all the samples were more turbid from the beginning, which is when there was smaller bubbles in the liquid and the protein starts to hydrate. The turbidity decreased in all samples over time.

We demonstrated in FIG. 3 that the turbidity of the neutral whey protein isolate with added antifoam (sample 2) was below 200 NTU. After 600 seconds the turbidity had decreased to below 80 NTU. Compared to this the neutral soy lecithinated whey protein isolate (sample 3) from example 4 was above 600 NTU.

The turbidity of the acidic whey protein isolate with antifoam (sample 4) from example 4 was similar to the neutral whey protein isolate with antifoam after 600 seconds. However, the beverage was twice as turbid compared to the neutral whey protein isolate with antifoam (sample 2) until after 300 seconds. A consumer would therefore more likely experience the beverage becoming clear, as it is believed that most consumers drink the beverage within that period.

Figure 4:
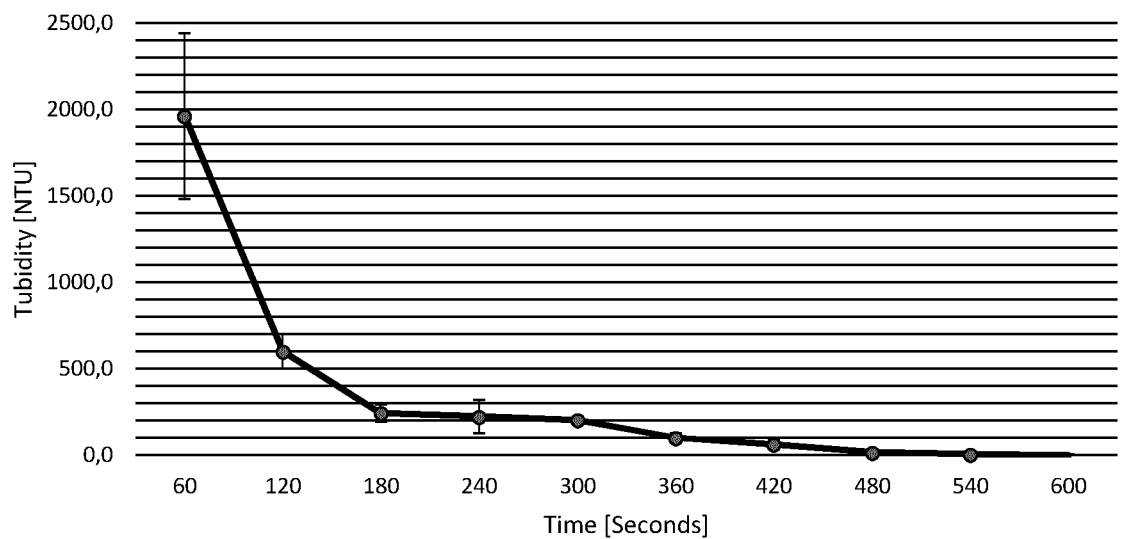
FIG. 4 shows the turbidity difference over time of neutral whey protein isolate with antifoaming agent (sample 2) and acidic whey protein isolate with antifoam (sample 4).

It was surprising to observe the difference between the soy lecithinated whey protein isolate (sample 3) and the pH neutral WPI with added antifoam (sample 2). Sample 2 with added antifoam was much more clear, and comparable to the turbidity of water for the naked eye, where the neutral became clearer faster than the acidic. The difference in turbidity over time is illustrated in FIG. 4. Here sample 2 was 1961 NTUs less at 60 seconds than sample 4. This difference did decrease over time, and the samples were comparable after 540 seconds, where the difference was only 2.7 NTUs.

Figure 5:
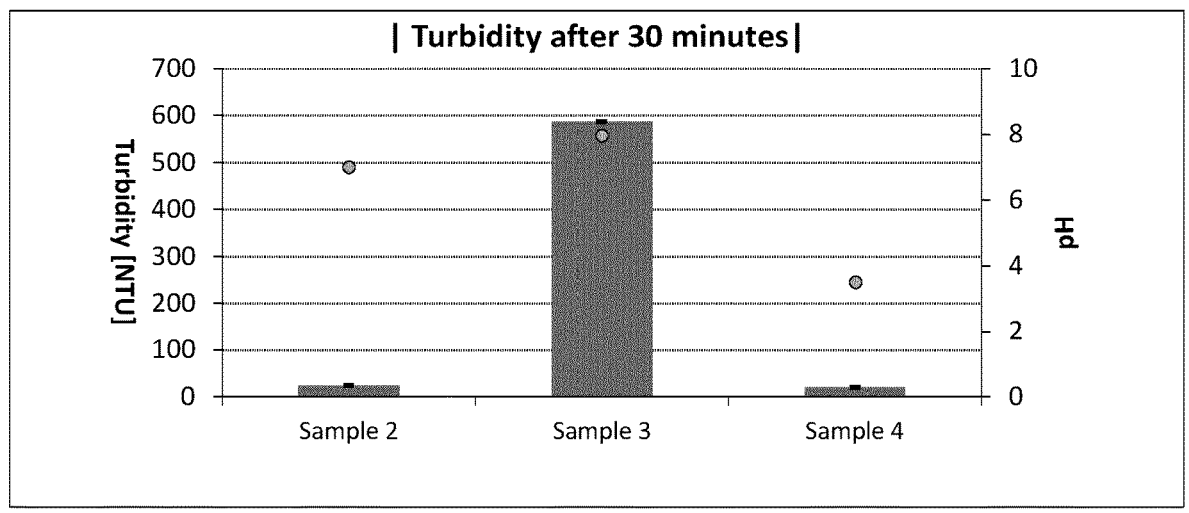
FIG. 5 shows the turbidity and pH at a steady state after 1800 seconds of a pH neutral whey protein isolate with antifoaming agent (sample 2), acidic whey protein isolate with antifoaming agent (sample 4) and of a soy lecithinated whey protein isolate (sample 3).

The difference in turbidity after 30 minutes of the three different samples is illustrated in FIG. 5. This evaluation was to ensure that steady state had occurred, and there would be no traces of condense and bubbles.

The difference in turbidity of the soy lecithinated whey protein isolate (sample 3) compared to the whey protein isolate with added antifoam (sample 2) was 567 NTU, where the soy lecithinated obtained a turbidity of 587 NTU, while the turbidity of sample 2 was only 20 NTU.

The pH of the neutral whey protein isolate with antifoam was pH 7, where the Neutral soy lecithinated whey protein isolate was pH 7.95. The pH of the acidic whey protein isolate w. antifoam was pH 3.5 (sample 4).

Conclusion:

The pH neutral whey protein isolate with added antifoam (samples 2) became as clear as water for the naked eye. While the soy lecithinated whey protein isolate (sample 3), remained turbid. Furthermore, the turbidity of the neutral whey protein isolate with added antifoam (sample 2) had a faster decrease in NTU compared to the acidic beverage, which also comprises an antifoaming agent (sample 4). A consumer would therefore more likely experience sample 2 as a transparent beverage.

Example 7: Comparison Between the Foam of the Invention and Prior Art Products

The purpose of this example was to investigate whether there was a difference in foam breakdown when comparing the invention described in example 2 with the prior art described in examples 3 and 4. The purpose was furthermore to investigate the difference in appearance over time.

Materials and Methods:

Samples 2, 3 and 4 were prepared according to Examples 2, 3, and 4, which were compared. The samples were stored at room temperature at 20-25° C. between each measurement. Then the samples were handled according to example 1.4, which was for the determination of foam.

Figure 6:
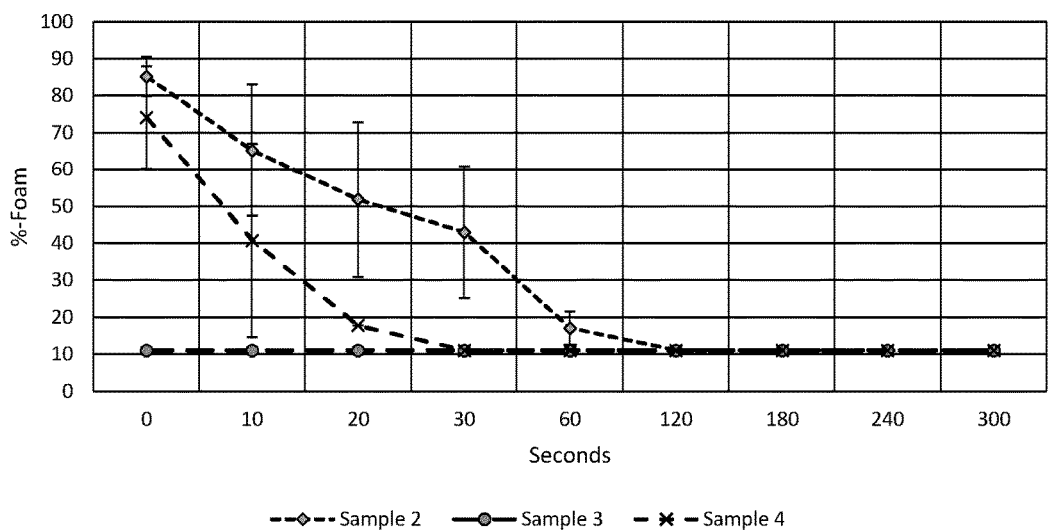
FIG. 6 illustrates the foam breakdown in percentage of a pH neutral whey protein isolate with antifoaming agent (sample 2), acidic whey protein isolate with antifoaming agent (sample 4) and a soy lecithinated whey protein isolate (sample 3).

Results:

The foam breakdown of the three samples is illustrated in FIG. 6. We found that there was no foam in the neutral soy lecithinated whey protein isolate (sample 3). In the neutral whey protein isolate w. antifoam (sample 2), the foam was broken down after only 60 seconds for. While the foam was broken down after 30 seconds in the acidic whey protein isolate w. antifoam (sample 4), the results thus indicate that the foam was more unstable in sample 4.

Figure 7:
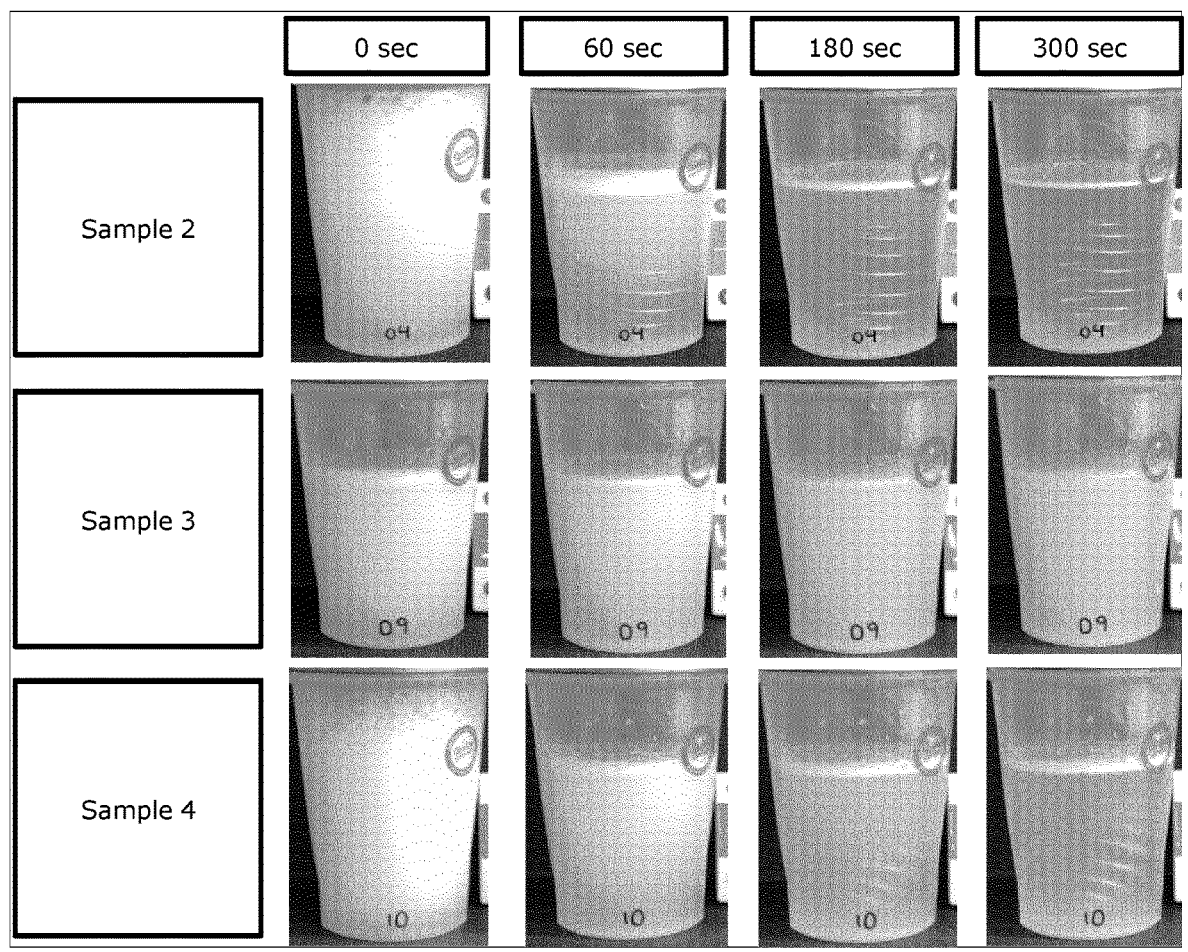
FIG. 7 shows the visual foam breakdown and transparency of a pH neutral whey protein isolate with antifoaming agent (sample 2), acidic whey protein isolate with antifoaming agent (sample 4) and a soy lecithinated whey protein isolate (sample 3).
Figure 8:
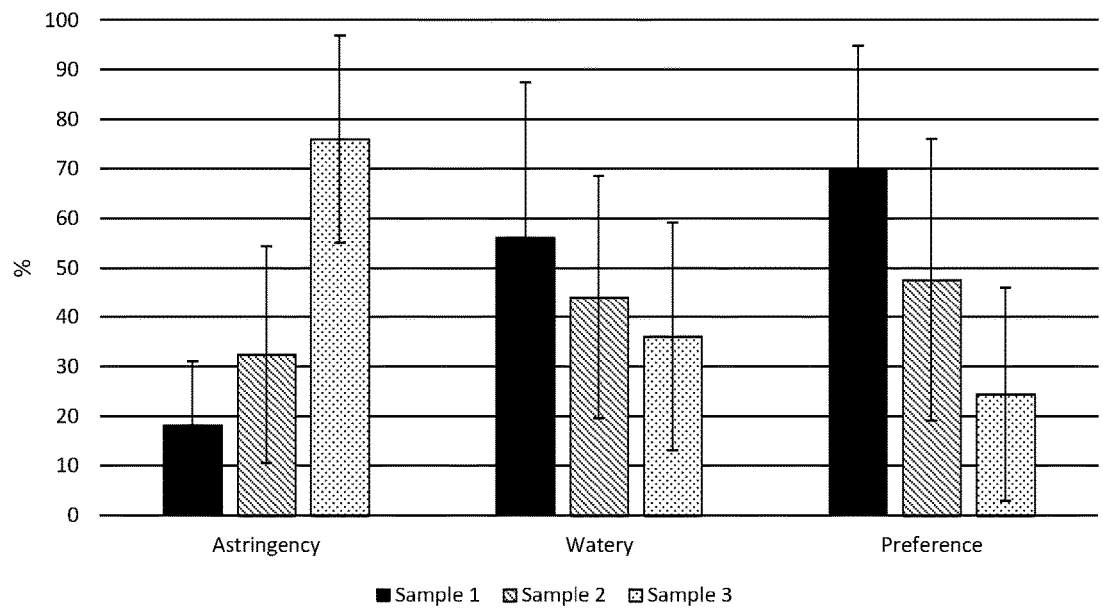
FIG. 8 demonstrates the organoleptic profile for the attributes of astringency and watery perception including preference of a pH neutral whey protein isolate with antifoaming agent (sample 2), acidic whey protein isolate with antifoaming agent (sample 4) and of a soy lecithinated whey protein isolate (sample 3).

The appearance of the acidic (sample 4) and neutral whey protein isolate w. antifoam (sample 2) differed, where the metal ball in the shaker could be observed in the neutral beverage after only 60 seconds and fully visible after 300 seconds. The acidic beverage (sample 4) did never achieve a fully visible metal ball within the 300 seconds, and it could be observed even after 180 seconds. From the turbidity measurements the turbidity of sample 2 was only 125 NTUs after 300 seconds. These observations are illustrated on the photographs on FIG. 7. These observations also correlate with the turbidity measurements from example 5.

The appearance of the neutral soy lecithinated whey protein isolate (sample 3) differed from both (samples 2 and 4), as the metal ball did not become visible within the 300 seconds. This was also in correlation to the results from example 5.

Conclusion:

The foam of the neutral whey protein isolate with added antifoam (sample 2) had a slower foam breakdown, than the acidic and the soy lecithinated (samples 3 and 4 respectively). However, the foam was also dissolved after 60 second in sample 2.

It was surprising to see the visual transparency of the neutral whey protein isolate with added antifoam (sample 2) compared to the acidic (sample 4) and soy lecithinated (sample 3), which samples were turbid after 300 seconds.

We thus surprisingly found that it is possible to produce a beverage using an instant powder comprising a pH neutral WPI and an antifoaming agent, which have an appealing clear appearance and no visible foam already after 60 seconds.

Example 8: Comparison Between the Sensory of the Invention and Prior Art Products The purpose of this example was to investigate whether there was a difference in foam breakdown when comparing the invention described in example 2 with prior art which have been described in examples 3 and 4.

Materials and Methods:

The samples were prepared according to Examples 2, 3, and 4 which were compared. Then the samples were handled according to example 1.7, which was for the sensory evaluation. The sensory evaluation was performed by a blinded panel of 21 individuals.

Results:

The neutral whey protein isolate with added antifoam (sample 2) was perceived to be 58% less astringent compared to the acidic (sample 4) and 14% less astringent compared to the soy lecithinated (sample 3). This decrease in astringency was very surprising, and the neutral whey protein isolate with added antifoam would therefore be more thirst quenching compared to the other beverages.

Moreover, the neutral whey protein isolate with added antifoam (sample 2) was perceived 20% more watery than the acidic (sample 4) and 12% more watery than the soy lecithinated (sample 3). This could be correlated to the low viscosity of the three beverages and the pH of the two neutral beverages. Moreover, it is believed to be a benefit, as sample 2 would be more appealing after a workout session, since it would be less heavy to consume. The increase in watery perception from sample 2 to 3 could be the higher fat content in sample 3 from the soy lecithin. Furthermore, the difference from sample 2 to 4 could be from the astringency, which would not be present drinking water.

From the two attributes given, the panel was asked which samples they preferred. Here the neutral whey protein isolate with added antifoam (sample 2) was 46% more preferred than the acidic (sample 4) and 23% more preferred than the soy lecithinated beverage (sample 3).

Conclusion:

The neutral whey protein isolate with added antifoam was perceived more watery and less astringent compared to the acidic and soy lecithinated beverages. This led to a much higher preference for the neutral whey protein isolate with added antifoam (sample 2). The difference in astringency was very surprising between sample 2 and 3, and the neutral whey protein isolate with added antifoam would therefore be more thirst quenching compared to the other beverages, which could be the reason for the higher preference.

We have thus surprisingly found that it is possible to produce a beverage by shaking an instant beverage powder comprising a WPI having a neutral pH and an antifomining agent with water. The beverage has an appealing appearance as it is transparent, and it has no foam already 60 seconds after its preparation. The beverage has a very attractive taste and a low astringency.

Example 9: Comparison Between the Turbidity, Foam and pH of Two Different Antifoams The purpose of this example was to investigate the difference in foam breakdown and visual difference, when comparing sample 2 with two other used antifoaming agent, which is synthetic amorphous silica (silicon dioxide) with canola oil or soybean oil. Furthermore, the purpose was to investigate the difference in turbidity after 30 minutes. Finally, it was to document the pH difference of the products.

Materials and Methods:

The two beverage samples comprise:

Sample 2: Was a neutral whey protein isolate with Polydimethylsiloxane and Silicon Dioxide antifoaming agent and was prepared according to example 2, and it had the same composition as described in example 2.

Sample 5: Was a neutral whey protein isolate with synthetic amorphous silica (silicon dioxide) antifoaming agent and soybean oil and was prepared by weighing 22.5 grams of whey protein isolate powder having a neutral pH and 0.15 grams of an antifoam powder, comprising of 5% w/w synthetic amorphous silica (silicon dioxide) and 20% w/w soybean oil, in a beaker on a scale. The two powdered ingredients were mixed until homogenous.

The instant beverage powder thus prepared comprises a total amount of protein of 88.4% w/w relative to the weight of the powder, and antifoaming agent in an amount of 0.166% w/w relative to the weight of the instant beverage powder.

To prepare the beverage 300 ml of water was weighed out in a 400 ml protein shaker. The recipe is listed in table 9 below with the nutritionals. The powder mixture of whey protein isolate and antifoam was transferred on top of the water and shaken for 15 seconds.

The obtained beverage comprises 6.68 grams protein, 0.01 grams of carbohydrates and 0.01 g fat and 0.0125 g active antifoaming agent pr. 100 ml water. The pH of the beverage is 6.8

TABLE 9

Composition of the sample 5, a beverage comprising the whey protein isolate beverage powder with amorphous silica (silicon dioxide) and soybean oil antifoaming agent

| Ingredients | Grams per Serving |
| --- | --- |
| Neutral whey protein isolate | 22.500 |
| Antifoaming composition comprising and amorphous silica (silicon dioxide) and soybean oil as antifoaming agent on a maltodextrin carrier with emulsifiers | 0.150 |
| Water | 300 |
| Nutritionals | Per 100 ml |
| Energy | 27 Kcal |
| Protein | 6.68 g |
| Fat | 0.01 g |
| Carbohydrates | 0.01 g |

Sample 6: Was a neutral whey protein isolate with synthetic amorphous silica (silicon dioxide) and canola oil antifoaming agent and was prepared by weighing 22.5 grams of whey protein isolate powder having a neutral pH and 0.15 grams of an antifoam powder, comprising of 3% w/w synthetic amorphous silica (silicon dioxide) and 25% w/w canola oil, in a beaker on a scale. The two powdered ingredients were mixed until homogenous.

The instant beverage powder thus prepared comprises a total amount of protein of 88.6% w/w relative to the weight of the powder, and antifoaming active (synthetic amorphous silica (silicon dioxide) and canola oil) in an amount of 0.109% w/w relative to the weight of the instant beverage powder.

To prepare the beverage 300 ml of water was weighed out in a 400 ml protein shaker. The recipe is listed in table 10 below with the nutritionals. The powder mixture of whey protein isolate and antifoam was transferred on top of the water and shaken for 15 sec.

The obtained beverage comprises 6.68 grams protein, 0.01 grams of carbohydrates and 0.01 g fat and 0.0084 g antifoaming active per 100 ml water. The pH of the beverage is 6.91

TABLE 10

Composition of the sample 6, a beverage comprising the whey protein isolate beverage powder with amorphous silica (silicon dioxide) and canola oil antifoaming agent

| Ingredients | Grams per Serving |
| --- | --- |
| Neutral whey protein isolate | 22.500 |
| Antifoaming composition comprising amorphous silica (silicon dioxide) and canola oil antifoaming agent on a maltodextrin carrier with emulsifiers | 0.090 |
| Water | 300 |

TABLE 10-continued

Composition of the sample 6, a beverage comprising the whey protein isolate beverage powder with amorphous silica (silicon dioxide) and canola oil antifoaming agent

| Nutritionals | Per 100 ml |
|---|---|
| Energy | 27 Kcal |
| Protein | 6.68 g |
| Fat | 0.01 g |
| Carbohydrates | 0.01 g |

Samples 2, 5 and 6 were prepared according to Example 1.2 where the turbidity was measured after 30 minutes. After the evaluation the pH was measured according to example 1.10. Furthermore, the foam breakdown of the samples was evaluated according to example 1.4, which was for the determination of foam.

Figure 9:
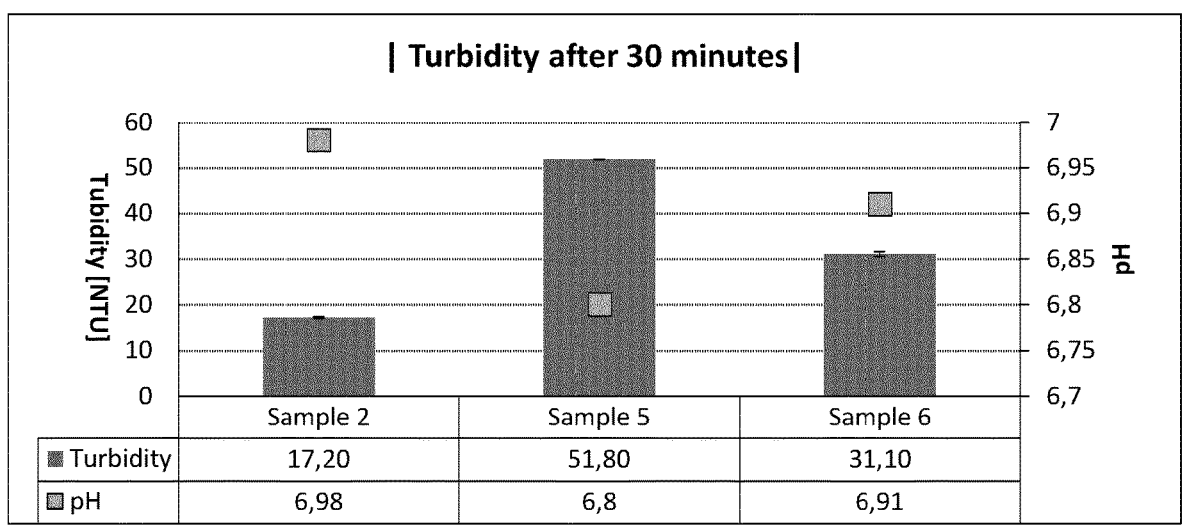
FIG. 9 shows the turbidity and pH after 1800 seconds of neutral whey protein isolate with silicon dioxide and polydimethyl siloxane (PDMS) (sample 2), silicon dioxide and soybean oil (sample 5) and silicon dioxide and canola oil (sample 6) as the antifoaming agents.

Results:

The difference in turbidity after 30 minutes of the two different samples is illustrated in FIG. 9. The difference in turbidity of the silicon dioxide antifoaming agent (sample 2) compared to the synthetic amorphous silica (silicon dioxide) and soybean oil antifoaming agent (sample 5) was 34.6 NTUs. The difference in turbidity of the silicon dioxide antifoaming agent (sample 2) compared to the synthetic amorphous silica (silicon dioxide) and canola oil antifoaming agent (sample 6) was 13.9 NTUs. Sample 2 had a turbidity of 17.20 NTUs, sample 5 had a turbidity of 51.80 NTUs and sample 6 had a turbidity of 31.10 NTUs.

The pH of sample 2 with the silicon dioxide antifoaming agent was pH 6.98, where sample 5 with the synthetic amorphous silica (silicon dioxide) and soybean oil antifoaming agent had a pH of 6.80. The pH of sample 6 with the synthetic amorphous silica (silicon dioxide) and canola oil antifoaming agent, had a pH of 6.91

Figure 10:
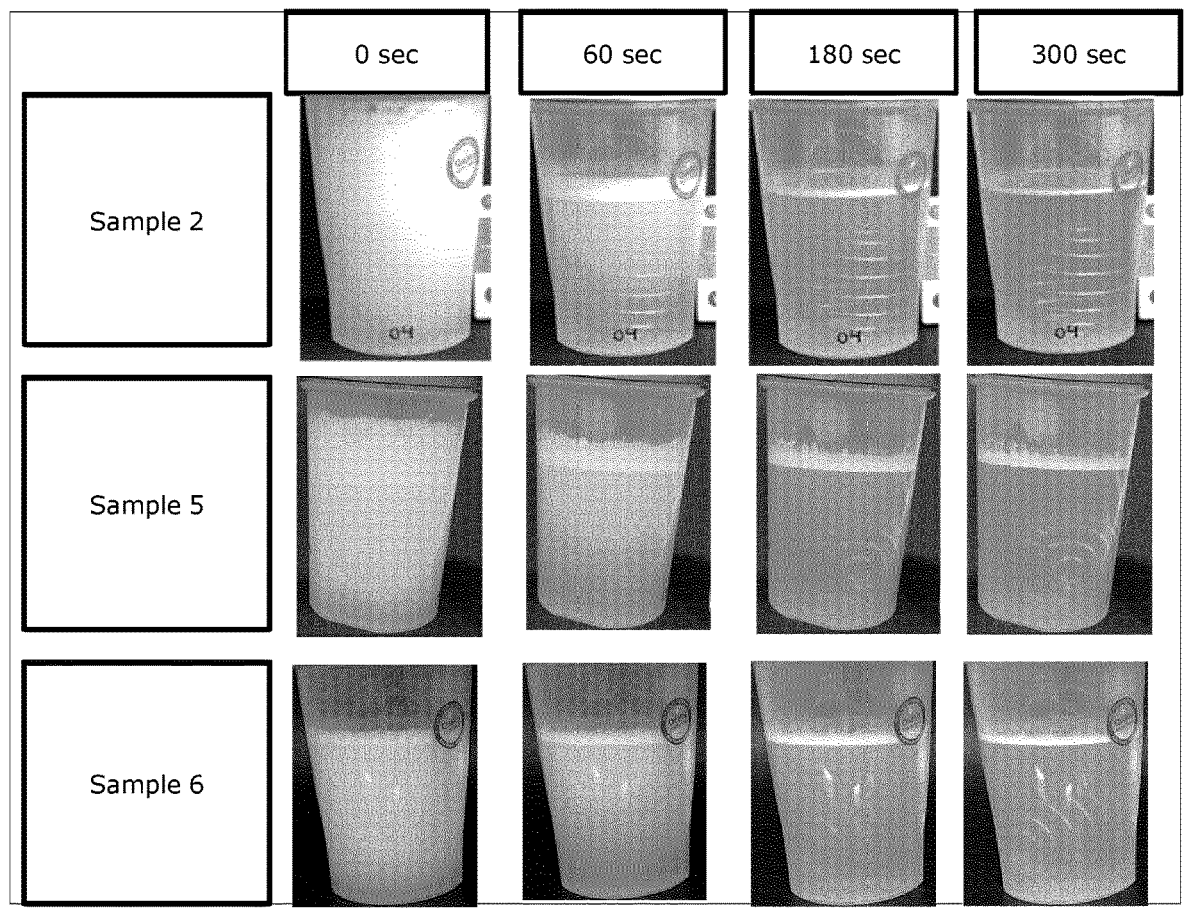
FIG. 10 shows the visual foam breakdown of a neutral whey protein isolate with silicon dioxide and PDMS (sample 2), silicon dioxide and soybean oil (sample 5) and silicon dioxide and canola oil (sample 6) as the antifoaming agents.

The appearance of the samples 2, 5 and 6 is illustrated in FIG. 10. The metal ball in the shaker could be observed in sample 2 after 60 seconds and fully visible after 300 seconds. Sample 5 and 6 also achieved a fully visible metal ball after the 300 seconds, and it could be observed even after 180 seconds.

Figure 11:
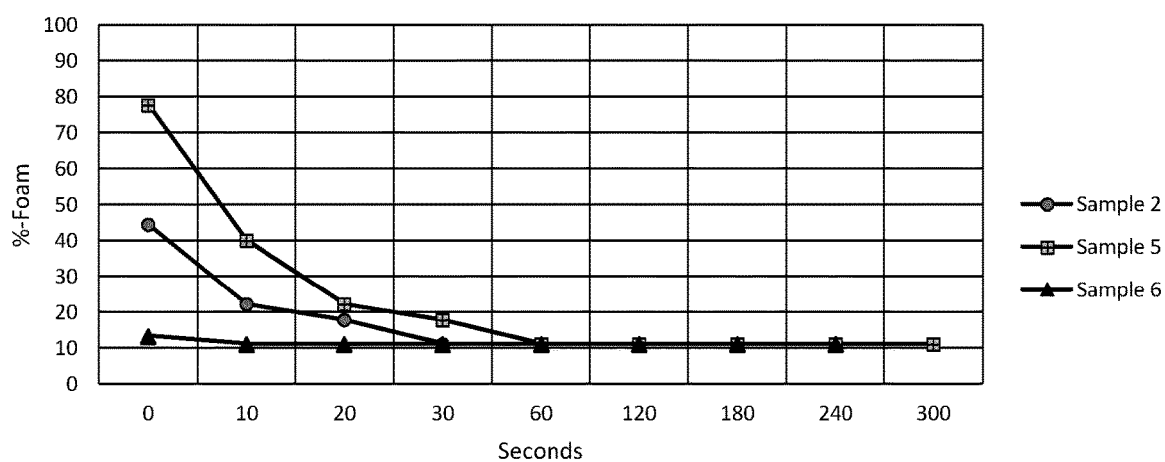
FIG. 11 illustrates the foam breakdown in percentage of neutral whey protein isolate with silicon dioxide and PDMS (sample 2), silicon dioxide and soybean oil (sample 5) and silicon dioxide and canola oil (sample 6) as the antifoaming agents.

The foam breakdown of the three samples is illustrated in FIG. 11. We found that the foam was broken down after 60 seconds in all three samples 2, 5 and 6.

Conclusion:

These results show that it is possible to use both silicon dioxide- and synthetic amorphous silica (silicon dioxide) with either soybean or canola oil antifoaming agent for the neutral whey protein isolate with antifoaming agent.

Example 10: The Impact of pH Between 4-9

The purpose of this example was to investigate pH's impact on the foam stability and turbidity of a pH neutral whey protein isolate product.

Materials and Methods:

The samples were prepared according to Example 2, where additional powdered citric acid monohydrate (acid) or Potassium carbonate (alkaline) was applied to regulate the pH. The dosage of the acid and alkaline was regulated to achieve the pH 4.08, 5.14, 6.27, 7.16, 8.21, and 9.16. In the below table 10 the acid and alkaline are listed with the respective dosages used to obtain the desired pH.

The seven beverage samples comprise:

Sample 2: Was a neutral whey protein isolate with Polydimethylsiloxane and Silicon Dioxide antifoaming agent and was prepared according to example 2, and it had the same composition as described in example 2. It had a pH of 7.0.

Sample 7: Was a neutral whey protein isolate with Polydimethylsiloxane, Silicon Dioxide antifoaming agent, and with added citric acid monohydrate to regulate the pH to pH 4.08. The sample was prepared according to example 2, and it had the same composition as described in example 2.

Sample 8: Was a neutral whey protein isolate with Polydimethylsiloxane, Silicon Dioxide antifoaming agent, and with added citric acid monohydrate to regulate the pH to pH 5.14. The sample was prepared according to example 2, and it had the same composition as described in example 2.

Sample 9: Was a neutral whey protein isolate with Polydimethylsiloxane, Silicon Dioxide antifoaming agent, and with added citric acid monohydrate to regulate the pH to pH 6.27. The sample was prepared according to example 2, and it had the same composition as described in example 2.

Sample 10: Was a neutral whey protein isolate with Polydimethylsiloxane, Silicon Dioxide antifoaming agent, and with added potassium carbonate to regulate the pH to pH 7.16. The sample was prepared according to example 2, and it had the same composition as described in example 2.

Sample 11: Was a neutral whey protein isolate with Polydimethylsiloxane, Silicon Dioxide antifoaming agent, and with added potassium carbonate to regulate the pH to pH 8.21. The sample was prepared according to example 2, and it had the same composition as described in example 2.

Sample 12: Was a neutral whey protein isolate with Polydimethylsiloxane, Silicon Dioxide antifoaming agent, and with added potassium carbonate to regulate the pH to pH 9.16. The sample was prepared according to example 2, and it had the same composition as described in example 2.

The dosage of citric acid monohydrate and potassium carbonate was found by titrating the powder in to sample 2 to the target pH values. The three powdered ingredients were mixed until homogenous.

In the below table 10 the three different concentrations of citric acid monohydrate and potassium carbonate are listed with respective dosages used.

TABLE 10

Composition of samples 2, 7, 8, 9, 10, 11, and 12, a beverage comprising the whey protein isolate beverage powder with Polydimethylsiloxane, Silicon Dioxide antifoaming agent.

| Ingredients | Grams per Serving |
|---|---|
| Acid, Citric Acid monohydrate, pH 4.08 | 2.75 |
| Acid, Citric Acid monohydrate, pH 5.14 | 0.88 |
| Acid, Citric Acid monohydrate, pH 6.27 | 0.23 |
| Alkaline, Potassium carbonate, pH 7.16 | 0.06 |
| Alkaline, Potassium carbonate, pH 8.21 | 0.41 |
| Alkaline, Potassium carbonate, pH 9.16 | 0.71 |

To prepare the beverage 300 ml of water was weighed out in a 400 ml protein shaker. The powder mixture of whey protein isolate, antifoam and acid or alkaline was transferred on top of the water and shaken for 15 seconds.

Sample 2, 7, 8, 9, 10, 11, and 12, were prepared according to Example 2. The turbidity was measured after 30 minutes, according to example 1.2. After the evaluation the pH was measured according to example 1.10. Furthermore, the foam breakdown of the samples was evaluated according to example 1.4.

Figure 12:
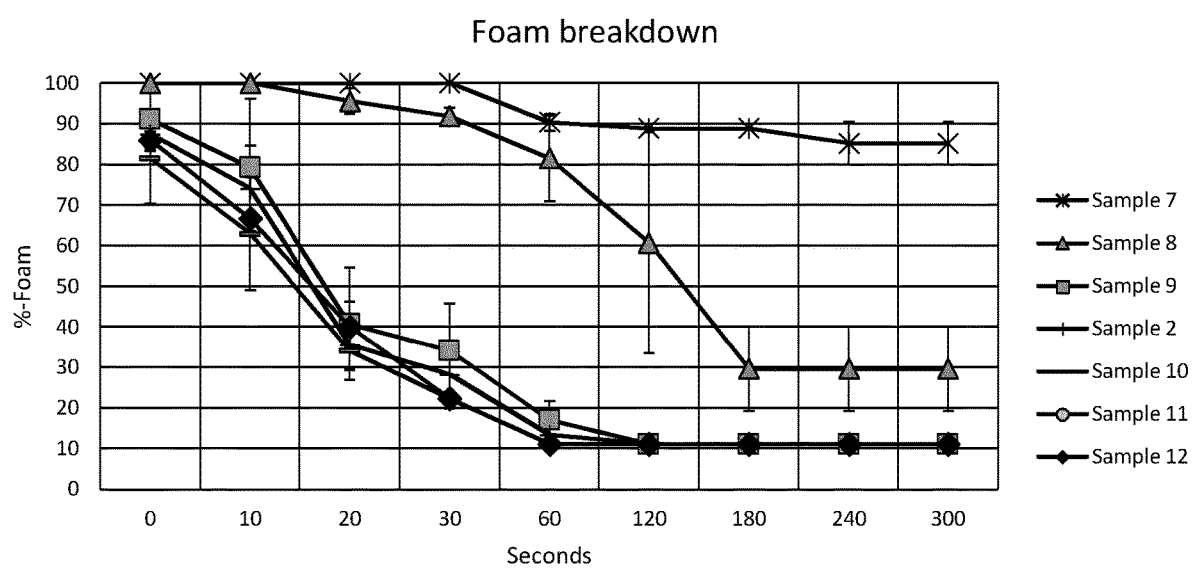
FIG. 12 illustrates the foam breakdown in percentage of whey protein isolate with difference in pH, ranging between pH 4.08 and pH 9.16.

Results:

FIG. 12 illustrates how the foam of the neutral whey protein isolate was more stable at pH values below 6 than at a higher pH. Sample 7 at pH 4.08 had stable foam for 300 seconds with 15% foam breakdown, whereas sample 8 with pH 5.14 had 70% foam left after 180 seconds, and the foam remained stable after that. In sample 9, which had a pH of 6.27, the foam was broken down with 10% foam left after 120 seconds.

All samples with potassium carbonate added for higher pH (sample 10 (pH 7), sample 11 (pH), sample 12 (pH 9)), achieved the same foam knockdown properties as sample 2, which had a pH of 7.

Figure 13:
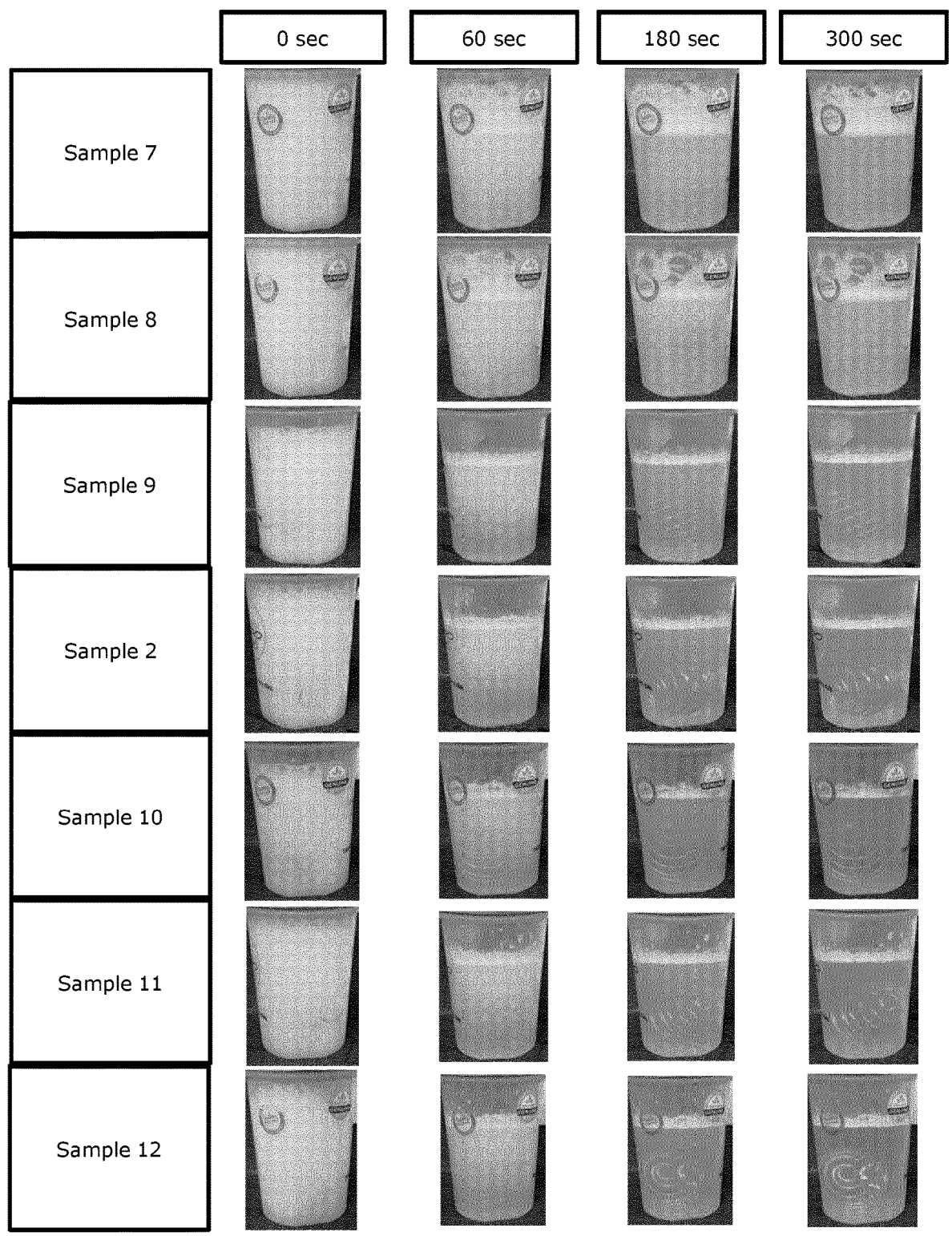
FIG. 13 shows the visual foam breakdown of whey protein isolate with difference in pH, ranging between pH 4.08 and pH 9.16.

The visual development of the invention at different pH is illustrated in FIG. 13. The appearance of the samples of pH 5.14 (sample 8) and pH 4.08 (sample 7) compared to samples with pH 6.27 (sample 9) and above (sample 2, sample 10, sample 11, and sample 12) differed, where the metal ball in the shaker could not be observed in samples with pH 5.14 after 300 seconds. Samples having a pH>6.27 did achieve a fully visible metal ball within the 300 seconds, and the ball could be observed already after 180 seconds.

Figure 14:
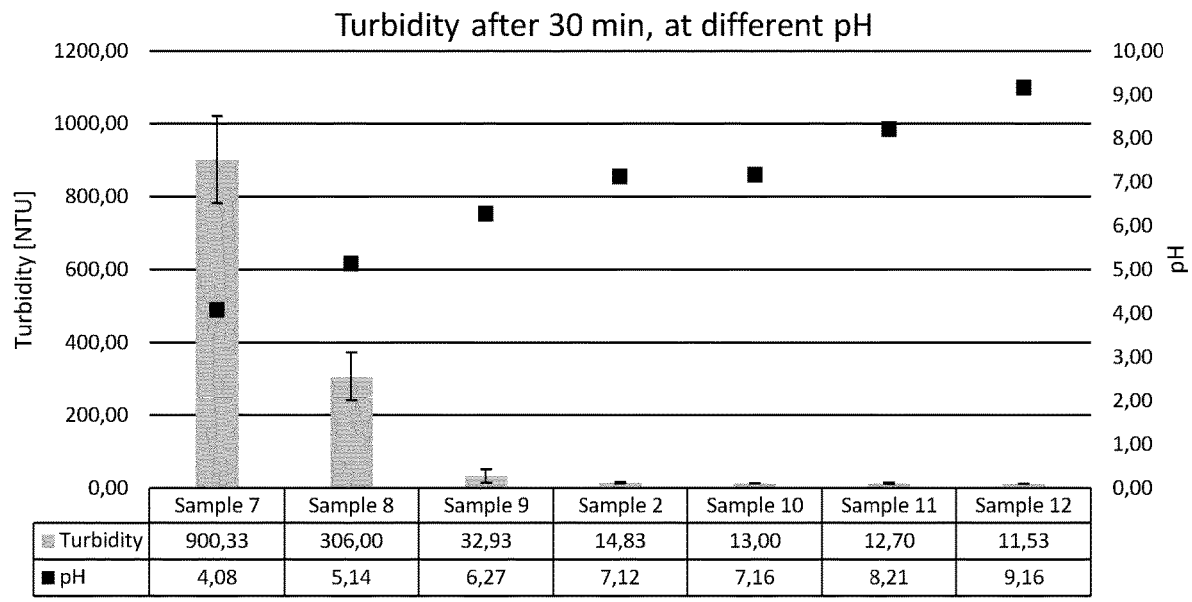
FIG. 14 shows the turbidity and pH after 1800 seconds of whey protein isolate with difference in pH, ranging between pH 4.08 and pH 9.16.

The difference in turbidity after 30 minutes of the three different samples is illustrated in FIG. 14. This evaluation was to ensure that steady state had occurred, and there would be no traces of condense and bubbles.

The turbidity of samples having a pH below 6 were unclear, the turbidity was thus 306 NTU at pH 5.14 and the turbidity was even higher at a lower pH of 4.08, which samples had a turbidity of 900 NTU.

Samples having a pH above 6 appeared more clear and had a turbidity of only 32.39 NTU at pH 6.21, it was found that the turbidity declined with an increasing pH value. The turbidity was thus only 11.53 NTU at pH 9.16.

The turbidity results correlate with the visual appearance after 300 seconds as illustrated in FIG. 13.

Conclusion:

It was thus found that not only the turbidity, but also the foam stability is surprisingly affected by the pH value. Samples having lower pH values of for example pH 5.14 still display an unwanted stable foam within 300 seconds. The turbidity also increases with decreasing pH values, and decreases with increasing pH values. It was thus found that products which are both clear end have a fast foam breakdown are obtained when pH of the samples is above pH 6 and when the samples comprises an antifoaming agent.

Example 11: Effects of Different Lecithin Concentration During Spray Drying

The purpose of this example was to investigate the effect of different lecithin concentrations on the turbidity of a pH neutral whey protein isolate product.

Materials and Methods:

Four samples has been spray dried with soy lecithin to investigate different lecithin concentration. The dosage of the soy lecithin samples was regulated to achieve w/w % of 0.20, 0.61, 0.66 and 1.21. The actual composition of the powders are described in samples 13, 14, 15, and 16.

The seven beverage samples comprise:

Sample 2: Was a neutral whey protein isolate with Polydimethylsiloxane and Silicon Dioxide antifoaming agent and was prepared according to example 2, and it had the same composition as described in example 2. Sample 2 had a pH of 7.0.

Sample 13: Was a soy lecithinated neutral whey protein isolate with 0.20 w/w % added lecithin, that was mixed together with powdered silicone antifoam.

The soy lecithinated instant beverage powder comprises a total amount of protein of 89.7% w/w relative to the weight of the powder, and soy lecithin in an amount of 0.20% w/w relative to the weight of the powder.

To prepare a beverage 300 ml water was weighed out in a 400 ml protein shaker. The full recipe is listed in the table 10 below with the nutritionals. The powder mixture of soy lecithinated whey protein isolate and antifoaming agent was transferred on top of the water and shaken for 15 sec.

The obtained beverages comprises 6.68 grams protein, 0.01 grams of carbohydrates and 0.03 gram fat pr. 100 ml water. The pH of the beverage is 7.02.

TABLE 10

Composition of the beverage comprising the lecithinated beverage powder. Sample 13.

| Ingredients | Grams per Serving |
| --- | --- |
| Soy lecithinated neutral whey protein isolate | 22.320 |
| Silicone Antifoam P19146, Cambridge Commodities (UK) composition | 0.150 |
| Water | 300 |

| Nutritionals | Per 100 ml |
| --- | --- |
| Energy | 27 Kcal |
| Protein | 6.68 g |
| Fat | 0.03 g |
| Carbohydrates | 0.01 g |

TABLE 11

Table 5. Content of PH neutral soy lecithinated whey protein isolate with 0.2 w/w % added soy lecithin comprises

| | % w/w |
| --- | --- |
| Protein as is (N*6.38) | 89.7 |
| Lactose | 0.09 |
| Fat | 0.36 |
| Ash | 4.2 |
| Moisture | 4.05 |
| Sodium | 0.51 |
| Magnesium (Mg) | 0.01 |
| Phosphorous (P) | 0.2 |
| Chloride (Cl) | 0.07 |
| Potassium (K) | 1.22 |
| Calcium (Ca) | 0.05 |

Sample 14: Was a soy lecithinated neutral whey protein isolate with 0.61 w/w % added lecithin, that was mixed together with powdered silicone antifoam.

The soy lecithinated instant beverage powder comprises a total amount of protein of 89.61% w/w relative to the weight of the powder, and soy lecithin in an amount of 0.61% w/w relative to the weight of the powder.

To prepare a beverage 300 ml water was weighed out in a 400 ml protein shaker. The full recipe is listed in table 12 below with the nutritionals. The powder mixture of soy lecithinated whey protein isolate and antifoaming agent was transferred on top of the water and shaken for 15 sec.

The obtained beverages comprises 6.68 grams protein, 0.01 grams of carbohydrates and 0.06 gram fat pr. 100 ml water. The pH of the beverage is 7.04.

TABLE 12

Composition of the beverage comprising the lecithinated beverage powder. Sample 14

| Ingredients | Grams per Serving |
| --- | --- |
| Soy lecithinated neutral whey protein isolate | 22.350 |
| Silicone Antifoam P19146, Cambridge Commodities (UK) | 0.150 |
| Water | 300 |
| Nutritionals | Per 100 ml |
| Energy | 27 Kcal |
| Protein | 6.68 g |
| Fat | 0.06 g |
| Carbohydrates | 0.01 g |

TABLE 13

Content of PH neutral soy lecithinated whey protein isolate with 0.61 w/w % added soy lecithin comprises

|  | % w/w |
| --- | --- |
| Protein as is (N*6.38) | 89.61 |
| Lactose | 0.09 |
| Fat | 0.77 |
| Ash | 4.07 |
| Moisture | 3.77 |
| Sodium | 0.52 |
| Magnesium (Mg) | 0.01 |
| Phosphorous (P) | 0.2 |
| Chloride (Cl) | 0.07 |
| Potassium (K) | 1.25 |
| Calcium (Ca) | 0.06 |

Sample 15: Was a soy lecithinated neutral whey protein isolate with 0.66 w/w % added lecithin, that was mixed together with powdered silicone antifoam.

The soy lecithinated instant beverage powder comprises a total amount of protein of 89.01% w/w relative to the weight of the powder, and soy lecithin in an amount of 0.66% w/w relative to the weight of the powder.

To prepare a beverage 300 ml water was weighed out in a 400 ml protein shaker. The full recipe is listed in table 14 below with the nutritionals. The powder mixture of soy lecithinated whey protein isolate and antifoaming agent was transferred on top of the water and shaken for 15 sec.

The obtained beverages comprises 6.68 grams protein, 0.01 grams of carbohydrates and 0.06 grams of fat pr. 100 ml water. The pH of the beverage is 7.07.

TABLE 14

Composition of the beverage comprising the lecithinated beverage powder. Sample 15.

| Ingredients | Grams per Serving |
| --- | --- |
| Soy lecithinated neutral whey protein isolate | 22.500 |
| Silicone Antifoam P19146, Cambridge Commodities (UK) composition | 0.150 |
| Water | 300 |
| Nutritionals | Per 100 ml |
| Energy | 27 Kcal |
| Protein | 6.68 g |
| Fat | 0.06 g |
| Carbohydrates | 0.01 g |

TABLE 15

Content of PH neutral soy lecithinated whey protein isolate with 0.66 w/w % added soy lecithin comprises

|  | % w/w |
| --- | --- |
| Protein as is (N*6.38) | 89.01 |
| Lactose | 0.09 |
| Fat | 0.82 |
| Ash | 4.21 |
| Moisture | 3.79 |
| Sodium | 0.51 |
| Magnesium (Mg) | 0.01 |
| Phosphorous (P) | 0.2 |
| Chloride (Cl) | 0.07 |
| Potassium (K) | 1.25 |
| Calcium (Ca) | 0.06 |

Sample 16: Was a soy lecithinated neutral whey protein isolate with 1.21 w/w % added lecithin, that was mixed together with powdered silicone antifoam.

The soy lecithinated instant beverage powder comprises a total amount of protein of 89.61% w/w relative to the weight of the powder, and soy lecithin in an amount of 1.21% w/w relative to the weight of the powder.

To prepare a beverage 300 ml water was weighed out in a 400 ml protein shaker. The full recipe is listed in the table 16 below with the nutritionals. The powder mixture of soy lecithinated whey protein isolate and antifoaming agent was transferred on top of the water and shaken for 15 sec.

The obtained beverages comprises 6.68 grams protein, 0.01 grams of carbohydrates and 0.103 gram fat pr. 100 ml water. The pH of the beverage is 7.05.

TABLE 16

Composition of the beverage comprising the lecithinated beverage powder. Sample 6.

| Ingredients | Grams per Serving |
| --- | --- |
| Soy lecithinated neutral whey protein isolate | 22.590 |
| Silicone Antifoam P19146, Cambridge Commodities (UK) composition | 0.150 |
| Water | 300 |
| Nutritionals | Per 100 ml |
| Energy | 27 Kcal |
| Protein | 6.68 g |
| Fat | 0.10 g |
| Carbohydrates | 0.01 g |

TABLE 17

Content of PH neutral soy lecithinated whey protein isolate with 1.21% w/w added soy lecithin comprises

|  | % w/w |
| --- | --- |
| Protein as is (N*6.38) | 88.69 |
| Lactose | 0.09 |
| Fat | 1.37 |

TABLE 17-continued

Content of PH neutral soy lecithinated whey protein isolate with 1.21% w/w added soy lecithin comprises

| | % w/w |
|---|---|
| Ash | 3.92 |
| Moisture | 3.94 |
| Sodium | 0.47 |
| Magnesium (Mg) | 0.01 |
| Phosphorous (P) | 0.2 |
| Chloride (Cl) | 0.07 |
| Potassium (K) | 1.15 |
| Calcium (Ca) | 0.05 |

Sample 2, 13, 14, 15, and 16 were analyzed according to Example 1.2 where the turbidity was measured after 30 minutes and during the 600 seconds after shaken. After the evaluation the pH was measured according to example 1.10. The visual development was analyzed, by determination of transparency by imaging according to Example 1.5 (results are shown in FIG. 16).

Figure 16:
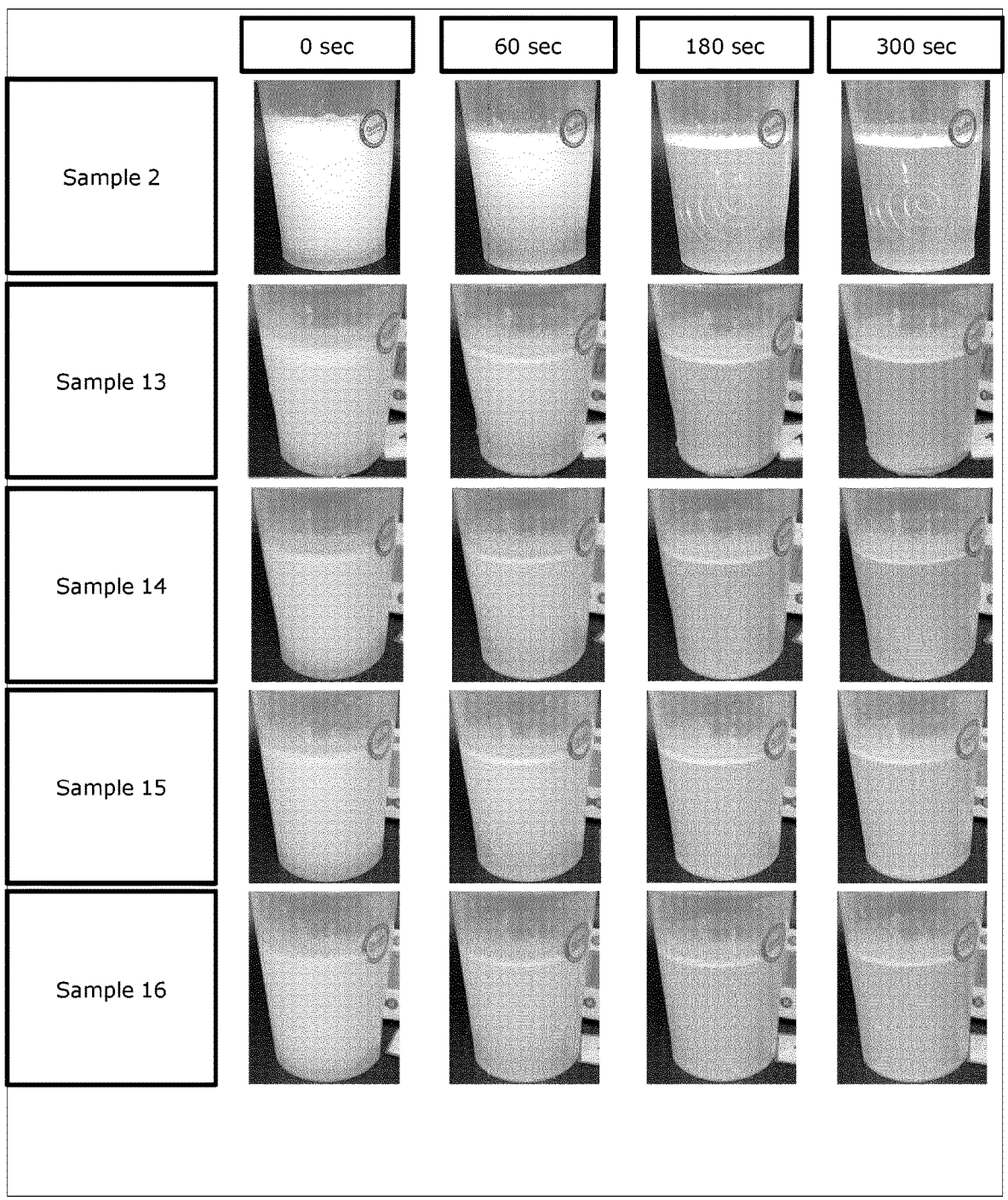
FIG. 16 shows the visual foam breakdown and clarity of pH neutral whey protein isolate and soy lecithinated neutral whey protein isolate with different lecithin % w/w ranging between 0.00% w/w and 1.21% w/w.
Figure 17:
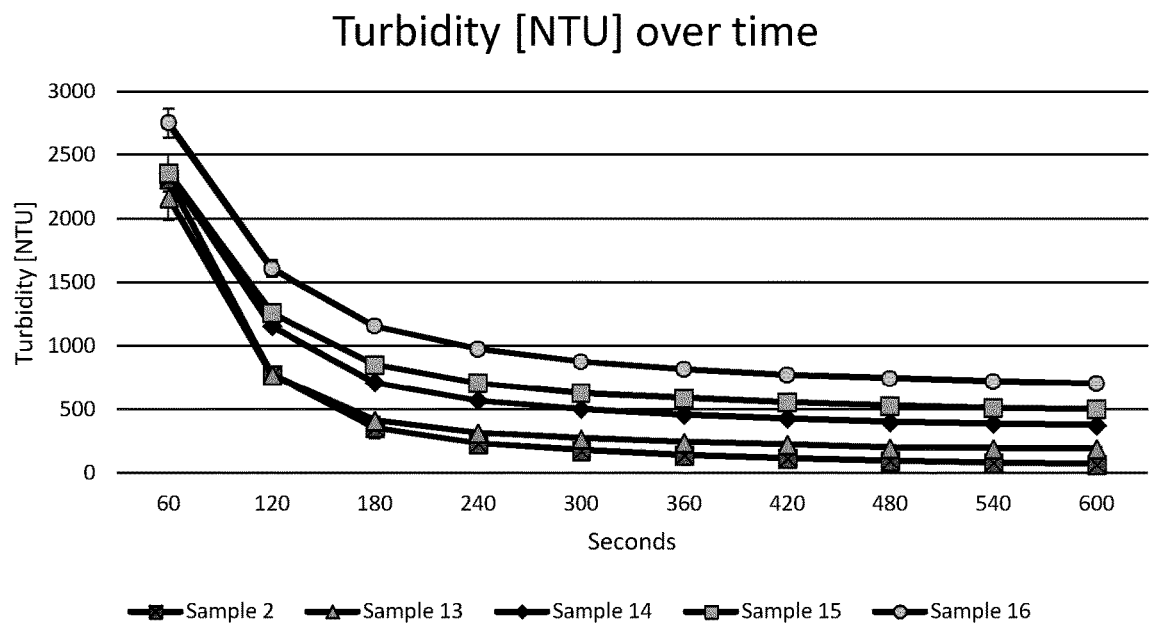
FIG. 17 shows the turbidity over time of soy lecithinated pH neutral whey protein isolate with different lecithin w/w % ranging between 0.00% w/w and 1.21% w/w.

Results:

The visual development of the invention with different soy lecithin concentrations is illustrated in FIG. 16. The visual appearance of the samples with added soy lecithin (sample 13, sample 14, sample 15, sample 16) and without lecithin (sample 2) differed. It was found that the metal ball in the shaker could not be observed in samples with lecithin after 300 seconds, while in sample 2 (which does not comprise soy lecithin) achieved a fully visible metal ball within 300 seconds, and it could already be observed after 180 seconds. This correlates well with the measured turbidity over time from FIG. 17.

Figure 15:
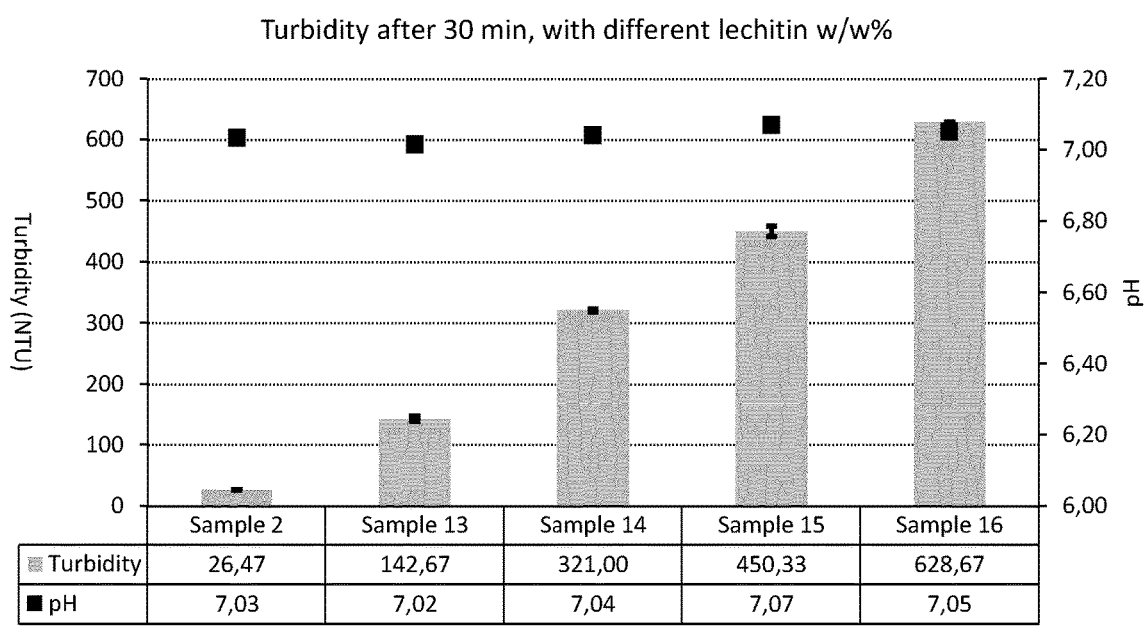
FIG. 15 illustrates the turbidity and pH after 1800 seconds of soy lecithinated neutral whey protein isolate with difference in lecithin % w/w ranging between 0% w/w and 1.21% w/w.

The difference in turbidity after 30 minutes of the five different samples is illustrated in FIG. 15. This evaluation was to ensure that steady state had occurred, and there would be no traces of condense and bubbles.

We found that the turbidity of the samples with added lecithin were unclear, as it had a turbidity of 142.67 NTU after 30 minutes (FIG. 15) and increasing with increasing soy lecithin concentration. The Turbidity results correlate with the visual appearance after 300 seconds from FIG. 16.

Conclusion:

It was thus found that the turbidity is affected by the addition of soy lecithin. The turbidity thus increases when the product has been spray dried with soy lecithin. Therefore, in order to obtain a clear beverage it is important that the instant beverage powder comprises a very low amount of lecithin or preferably no lecithin at all, if lecithin is present then the beverage powder should preferably comprise at most 0.2% w/w lecithin relative to the weight of the instant beverage powder.

Example 12: Effects of Different Protein Concentrations

The purpose of this example was to investigate the effect of different protein concentrations on the foam stability and turbidity of a pH neutral whey protein isolate product at a constant antifoaming concentration.

Materials and Methods:

The samples were prepared according to Example 2, where additional neutral whey protein isolate was added to increase the protein concentration. The dosage of the neutral whey protein isolate was regulated to achieve 10, 12 and 15% w/w protein relative to the weight of the beverage.

The four beverage samples comprise:

Sample 6: Was a neutral whey protein isolate with synthetic amorphous silica (silicon dioxide) and canola oil antifoaming agent and was prepared according to example 2, and it had the same composition as described in example 9.

Sample 17: Was a neutral whey protein isolate that was mixed together with synthetic amorphous silica (silicon dioxide) and canola oil antifoaming agent.

The instant beverage powder thus prepared comprises a total amount of protein of 88.76% w/w relative to the weight of the powder, and antifoaming agent in an amount of 0.0742% w/w relative to the weight of the instant beverage powder.

To prepare a beverage 300 ml water was weighed out in a 400 ml protein shaker. The full recipe is listed in the table 18 below with the nutritionals. The powder mixture of neutral whey protein isolate and antifoaming agent was transferred on top of the water and shaken for 15 sec.

The obtained beverages comprises 10.06 grams protein, 0.01 grams of carbohydrates and 0.01 gram fat pr. 100 ml water. The pH of the beverage is 6.89.

TABLE 18

Composition of the beverage comprising whey protein isolate beverage powder. Sample 17.

| Ingredients Grams | per Serving |
|---|---|
| Neutral whey protein isolate | 33.900 |
| Antifoaming composition comprising amorphous silica (silicon dioxide) and canola oil antifoaming agent on a maltodextrin carrier. | 0.090 |
| Water | 300 |
| Nutritionals | Per 100 ml |
| Energy | 40 Kcal |
| Protein | 10.06 g |
| Fat | 0.01 g |
| Carbohydrates | 0.01 g |

Sample 18: Was a neutral whey protein isolate that was mixed together with synthetic amorphous silica (silicon dioxide) and canola oil antifoaming agent.

The instant beverage powder thus prepared comprises a total amount of protein of 88.80% w/w relative to the weight of the powder, and antifoaming agent in an amount of 0.062% w/w relative to the weight of the instant beverage powder.

To prepare a beverage 300 ml water was weighed out in a 400 ml protein shaker. The full recipe is listed in the table 19 below with the nutritionals. The powder mixture of neutral whey protein isolate and antifoaming agent was transferred on top of the water and shaken for 15 sec.

The obtained beverages comprises 12.02 grams protein, 0.01 grams of carbohydrates and 0.01 gram fat pr. 100 ml water. The pH of the beverage is 6.84.

TABLE 19

Composition of the beverage comprising whey protein isolate beverage powder. Sample 18.

| Ingredients Grams | per Serving |
|---|---|
| Neutral whey protein isolate | 40.500 |
| Antifoaming composition comprising amorphous silica (silicon dioxide) and canola oil antifoaming agent on a maltodextrin carrier | 0.090 |
| Water | 300 |

TABLE 19-continued

Composition of the beverage comprising whey protein isolate beverage powder. Sample 18.

| Nutritionals | Per 100 ml |
|---|---|
| Energy | 48 Kcal |
| Protein | 12.02 g |
| Fat | 0.01 g |
| Carbohydrates | 0.01 g |

Sample 19: Was a neutral whey protein isolate that was mixed together with synthetic amorphous silica (silicon dioxide) and canola oil antifoaming agent.

The instant beverage powder thus prepared comprises a total amount of protein of 88.84% w/w relative to the weight of the powder, and antifoaming agent in an amount of 0.0496% w/w relative to the weight of the instant beverage powder.

To prepare a beverage 300 ml water was weighed out in a 400 ml protein shaker. The full recipe is listed in the table 20 below with the nutritionals. The powder mixture of neutral whey protein isolate and antifoaming agent was transferred on top of the water and shaken for 15 sec.

The obtained beverages comprises 15.04 grams protein, 0.01 grams of carbohydrates and 0.02 gram fat pr. 100 ml water. The pH of the beverage is 6.85.

TABLE 20

Composition of the beverage comprising whey protein isolate beverage powder. Sample 19.

| Ingredients Grams | per Serving |
|---|---|
| Neutral whey protein isolate | 50.700 |
| Antifoaming composition comprising amorphous silica (silicon dioxide) and canola oil antifoaming agent on a maltodextrin carrier | 0.090 |
| Water | 300 |

| Nutritionals | Per 100 ml |
|---|---|
| Energy | 60 Kcal |
| Protein | 15.04 g |
| Fat | 0.02 g |
| Carbohydrates | 0.02 g |

Samples 6, 17, 18, and 19 were analyzed according to Example 1.2 and the turbidity was measured after 30 minutes and during the 600 seconds after shaken. After the evaluation the pH was measured according to example 1.10. Finally, the samples foam breakdown was evaluated according to example 1.4, which was for the determination of foam.

Figure 18:
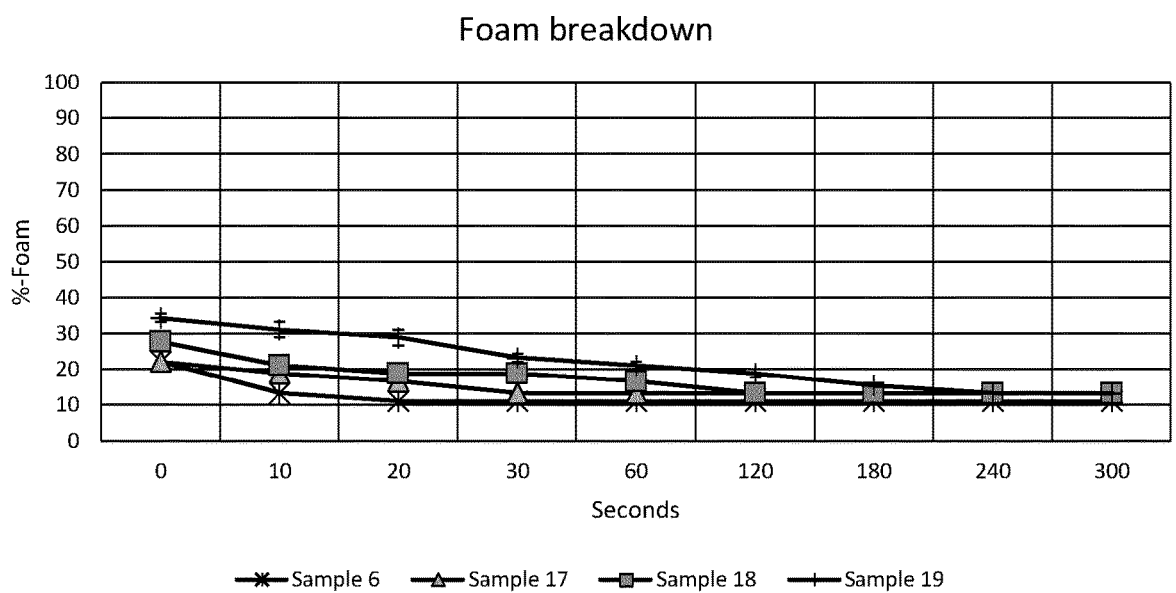
FIG. 18 shows the foam breakdown in percentage of pH neutral whey protein isolate at different protein concentrations ranging between 6.67% w/w and 15% w/w.

Results:

The foam breakdown of the four samples is illustrated in FIG. 18. We found that the foam was broken down after 30 seconds for both sample 6 and sample 17. Whereas sample 18 had a complete foam knockdown after 120 seconds, and for sample 19 the foam was broken down after 240 seconds. The antifoaming parameter was kept stable during the analysis to evaluate the clarity appearance at different protein concentrations.

Figure 19:
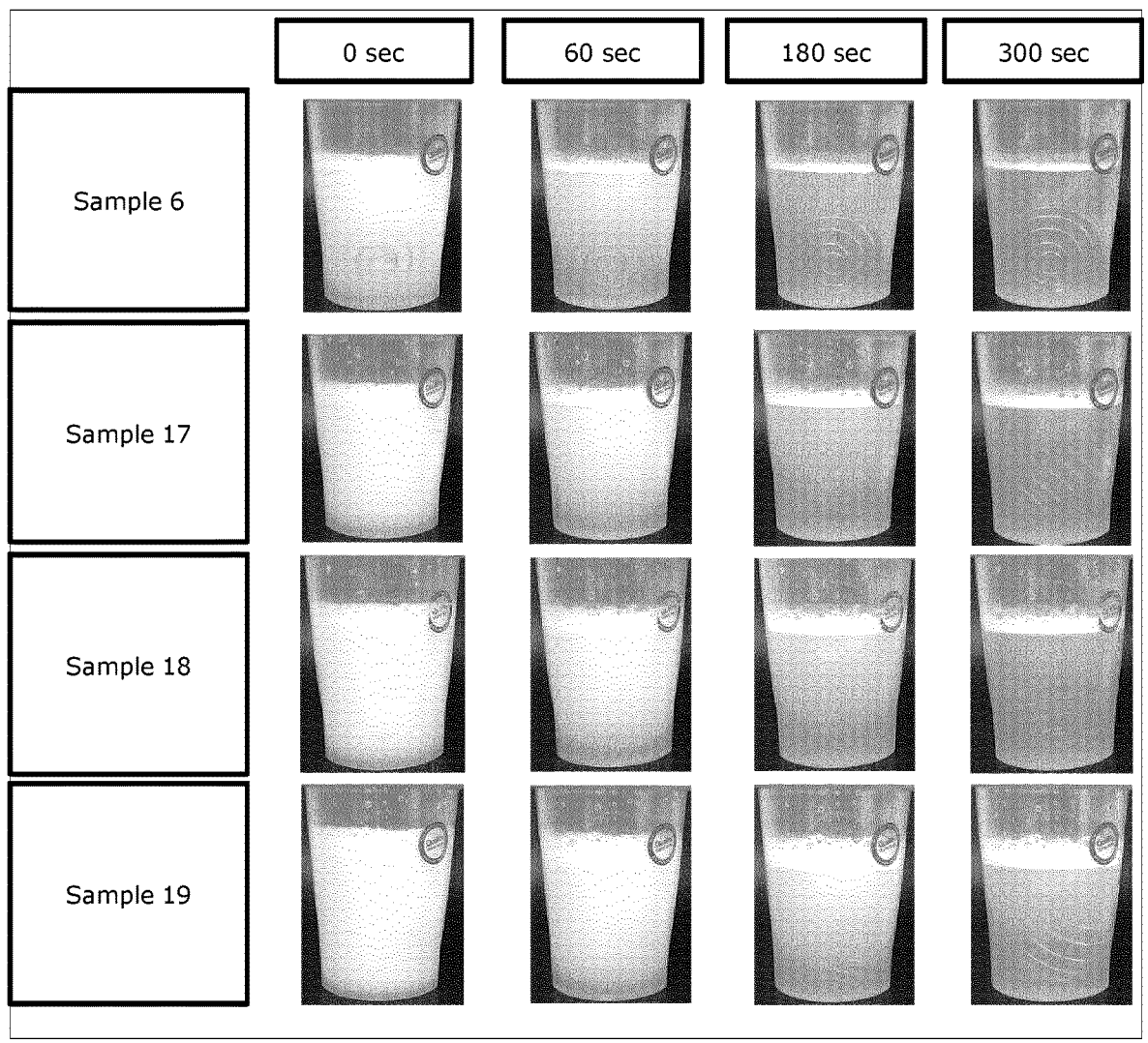
FIG. 19 shows the visual foam breakdown of pH neutral whey protein isolate at different protein concentrations ranging between 6.67% w/w and 15% w/w.

The visual foam breakdown and clarity development of the invention with different protein concentrations is illustrated in FIG. 19. We found that at the lowest protein concentration of 6.67% w/w protein the metal ball in the shaker was visible already after 60 seconds, while at protein concentrations above 10% w/w the metal ball was visible after 180 seconds. All samples achieved a fully visible metal ball within 300 seconds.

Figure 20:
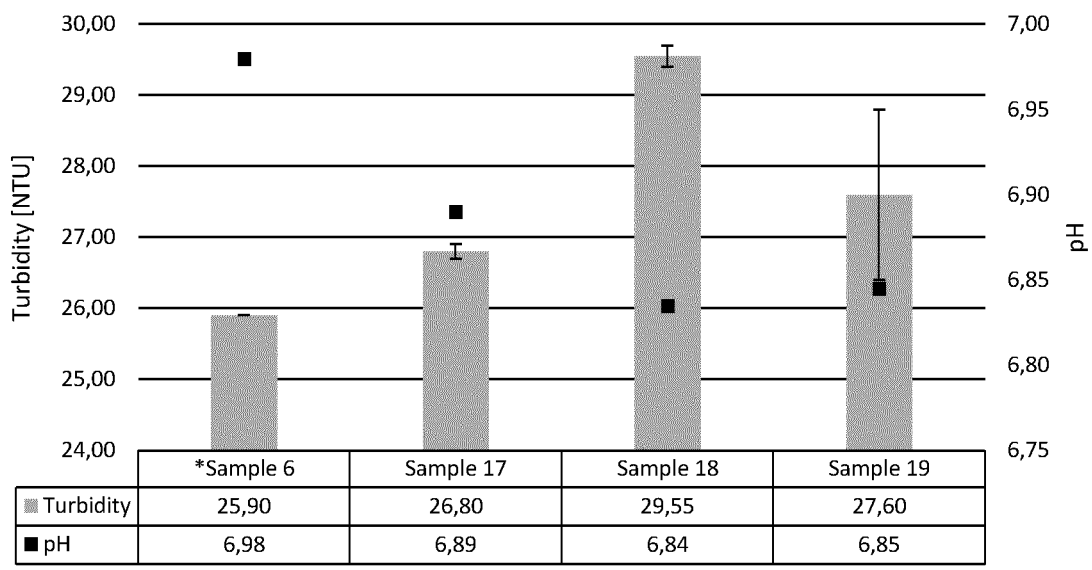
FIG. 20 shows the turbidity and pH after 1800 seconds of pH neutral whey protein isolate at different protein concentrations ranging between 6.67% w/w and 15% w/w.

The difference in turbidity after 30 minutes of the four different samples is illustrated in FIG. 20. This evaluation was to ensure that steady state had occurred, and that there would be no traces of condense and bubbles.

The turbidity of samples with increasing protein concentration showed an increase in turbidity. The sample with 6.67% w/w had an average turbidity of 25.90 NTUs, while the increase in protein concentration resulted in an average turbidity of 26.80 NTUs for sample 17, 29.55 NTUs for sample 18, and 27.60 NTUs for sample 19 with a higher standard deviation of 1.20 NTUs. These results indicates that the turbidity increases slightly with increasing protein concentration, but the results for all the analyzed protein concentrations are still within an acceptable turbidity.

Figure 21:
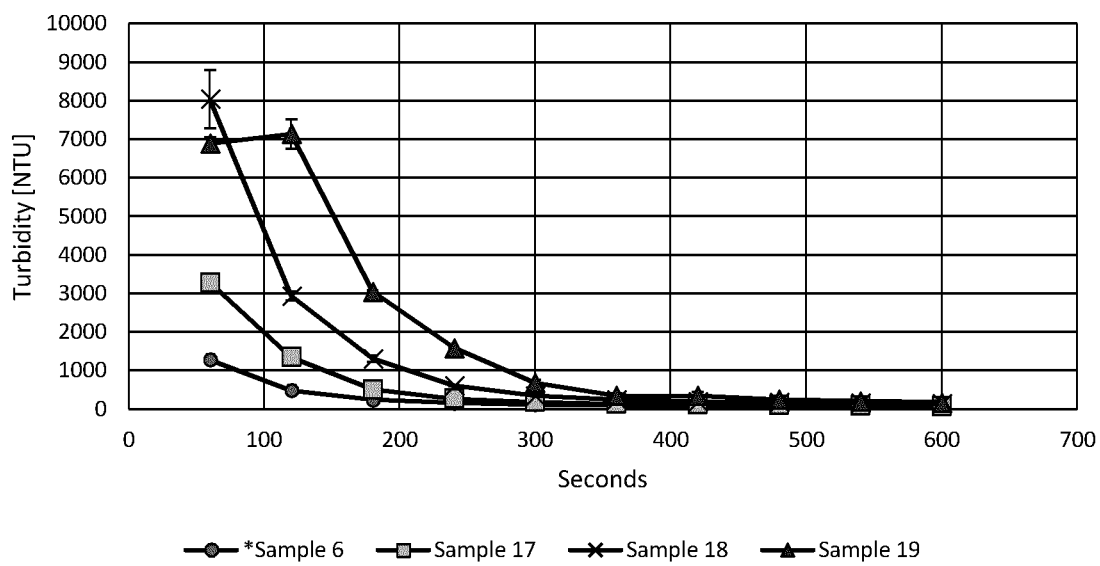
FIG. 21 shows the turbidity over 600 seconds of pH neutral whey protein isolate at different protein concentrations ranging between 6.67% w/w and 15% w/w.

The turbidity development over time is illustrated in FIG. 21, where it is illustrated that increasing protein concentrations have an impact on the clearing up of the product. This correlates well with the visual development in FIG. 19. Protein concentrations of 12% w/w and above have an average turbidity below 500 NTUs after 300 seconds, whereas the 15% w/w have an average turbidity of 678.5 NTUs after 300 seconds, which gets below the 500 NTU's after 360 seconds.

Conclusion:

This example thus illustrates that pH neutral instant beverages having a high protein content can be produced, which beverages are clear and wherein the foam is also effectively knocked down. The instant beverage powder is therefore very attractive for the production of high protein instant beverage powders.

Example 13 Effects of pH Between 5.5 and 6.22

The purpose of this example was to investigate pH's effect on the turbidity of a pH neutral whey protein isolate product in the range of pH 5.5 and 6.22.

Materials and Methods:

The samples were prepared according to Example 2, where additional powdered citric acid monohydrate (acid) or Potassium carbonate (alkaline) was applied to regulate the pH value. The dosage of the acid and alkaline was regulated to achieve the following pH 5.50, 5.61, 5.71, 5.83, 5.89, 6.10 and 6.21. In table 21 below the acid is listed with respective dosages used to obtain the desired pH values.

The seven beverage samples comprise:

Sample 20: Was a neutral whey protein isolate with Polydimethylsiloxane, Silicon Dioxide antifoaming agent, and with added citric acid monohydrate to regulate the pH to pH 5.50. The sample was prepared according to example 2, and it had the same composition as described in example 2.

Sample 21: Was a neutral whey protein isolate with Polydimethylsiloxane, Silicon Dioxide antifoaming agent, and with added citric acid monohydrate to regulate the pH to pH 5.61. The sample was prepared according to example 2, and it had the same composition as described in example 2.

Sample 22: Was a neutral whey protein isolate with Polydimethylsiloxane, Silicon Dioxide antifoaming agent, and with added citric acid monohydrate to regulate the pH to pH 5.71. The sample was prepared according to example 2, and it had the same composition as described in example 2.

Sample 23: Was a neutral whey protein isolate with Polydimethylsiloxane, Silicon Dioxide antifoaming agent, and with added citric acid monohydrate to regulate the pH to pH 5.83. The sample was prepared according to example 2, and it had the same composition as described in example 2.

Sample 24: Was a neutral whey protein isolate with Polydimethylsiloxane, Silicon Dioxide antifoaming agent, and with added citric acid monohydrate to regulate the pH to pH 5.89. The sample was prepared according to example 2, and it had the same composition as described in example 2.

Sample 25: Was a neutral whey protein isolate with Polydimethylsiloxane, Silicon Dioxide antifoaming agent, and with added citric acid monohydrate to regulate the pH to pH 6.10. The sample was prepared according to example 2, and it had the same composition as described in example 2.

Sample 26: Was a neutral whey protein isolate with Polydimethylsiloxane, Silicon Dioxide antifoaming agent, and with added citric acid monohydrate to regulate the pH to pH 6.22. The sample was prepared according to example 2, and it had the same composition as described in example 2.

The dosage of citric acid monohydrate was found by titrating the powder in to sample 2 to the target pH values. The three powdered ingredients were mixed until homogenous.

In table 21 below the three different concentrations of citric acid monohydrate is listed with respective dosages used.

TABLE 21

Composition of sample 20, 21, 22, 23, 24, 25, and 26, a beverage comprising the whey protein isolate beverage powder with Polydimethylsiloxane, Silicon Dioxide antifoaming agent

| Ingredients | Grams per Serving |
| --- | --- |
| Acid, Citric Acid monohydrate, pH 5.50 | 0.558 |
| Acid, Citric Acid monohydrate, pH 5.61 | 0.498 |
| Acid, Citric Acid monohydrate, pH 5.71 | 0.444 |
| Acid, Citric Acid monohydrate, pH 5.83 | 0.393 |
| Acid, Citric Acid monohydrate, pH 5.89 | 0.345 |
| Acid, Citric Acid monohydrate, pH 6.10 | 0.300 |
| Acid, Citric Acid monohydrate, pH 6.22 | 0.263 |

To prepare the beverage 300 ml of water was weighed out in a 400 ml protein shaker. The powder mixture of whey protein isolate, antifoam and acid was transferred on top of the water and shaken for 15 seconds.

Sample 20, 21, 22, 23, 24, 25, and 26 were analyzed according to Example 1.2 where the turbidity was measured after 30 minutes. After the evaluation the pH was measured according to example 1.10.

Figure 22:
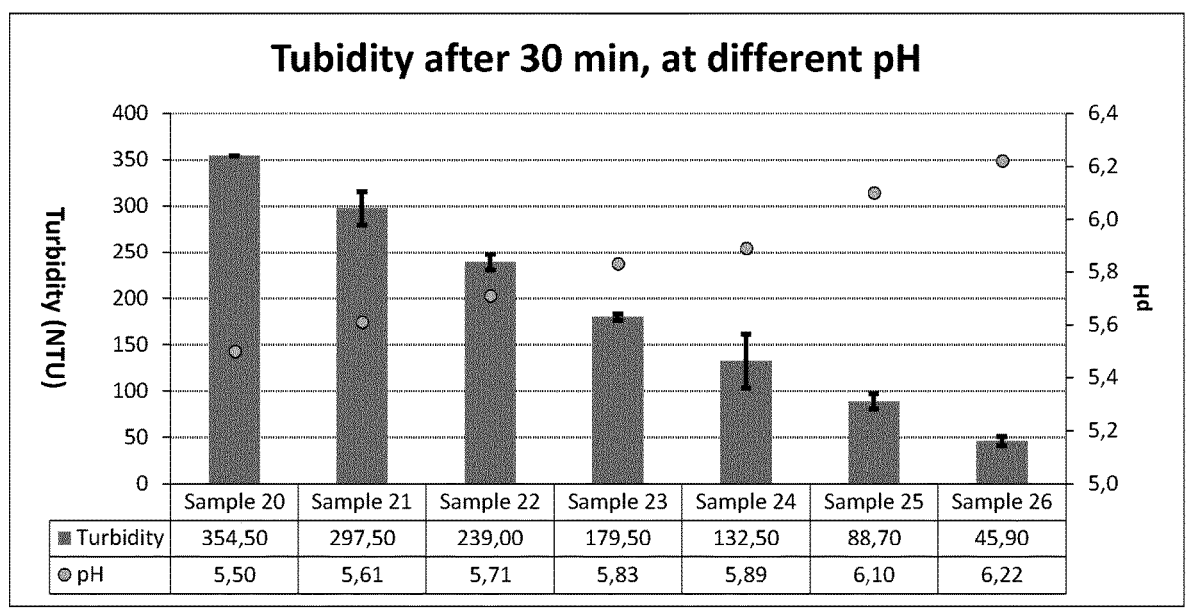
FIG. 22 shows the turbidity and pH after 1800 seconds of whey protein isolates having different pH, ranging between pH 5.50 and pH 6.22.

Results:

The difference in turbidity after 30 minutes of the seven different samples is illustrated in FIG. 22. This evaluation was to ensure that steady state had occurred, and there would be no traces of condense and bubbles.

The average turbidity of samples with pH 5.89 after 30 minutes was considered unclear, as it was 132.5 NTU and we found that the turbidity increased with decreasing pH value. Sample 25 having a pH of 6.10 was clear and the turbidity was 88.70 NTU, and even lower at pH 6.22 where the turbidity was 45.90.

Conclusion:

It was thus found that the turbidity is surprisingly highly affected by the pH value. The turbidity increases with decreasing pH values. The results thus confirm the finding of Example 10 that clear products can be obtained at pH values above pH 6.

Embodiments

The invention will be described in further detail in the numbered embodiments.

The present invention provides:

1. An instant beverage powder suitable for preparing a transparent beverage when dissolved in water, which powder comprises:
   a total amount of protein of 60 to 97% w/w relative to the weight of the instant beverage powder, preferably 65 to 96% w/w, more preferably 70-95% w/w, even more preferably 80-95% w/w relative to the weight of the powder, wherein at least 85% w/w of the protein is whey protein, preferably at least 87% w/w of the protein is whey protein, more preferably at least 90% w/w of the protein is whey protein, even more preferably at least 95% w/w of the protein is whey protein,
   an antifoaming agent in an amount in the range of 0.01 to 5.0% w/w relative to the weight of the instant beverage powder, preferably in the range of 0.015 to 3.0% w/w, more preferably in the range of 0.02 to 2.0% w/w relative to the weight of the instant beverage powder,
   at most 0.4% w/w lecithin relative to the weight of the instant beverage powder,
   wherein said powder has a pH in the range of pH 5.0 to 9.0, preferably 5.5 to 8.5, more preferably 6.0-8.0, even more preferably 6.5 to 7.5 at room temperature, when 7.5 gram of the instant beverage powder is dissolved in 100 milliliter water.

2. The instant beverage powder according to embodiment 1, wherein the antifoaming agent is provided by an antifoaming composition comprising the antifoaming agent and a solid carrier, and optionally one or more emulsifiers.

3. The instant beverage powder according to embodiment 2, wherein the antifoaming composition comprises:
   the antifoaming agent in an amount of 1-20% w/w relative to the weight of the antifoaming composition, even more preferably in an amount of 2.0-6.0% w/w relative to the weight of the antifoaming composition,
   the carrier in an amount of 70-95% w/w relative to the weight of the antifoaming composition, even more preferably in an amount of 75-90% w/w relative to the weight of the antifoaming composition,
   optionally, the emulsifier in an amount of 0.5-10% w/w relative to the weight of the antifoaming composition, even more preferably in an amount of 1.0-5.0% w/w relative to the weight of the antifoaming composition.

4. The instant beverage powder according to any of embodiments 2 or 3, wherein the carrier of the antifoaming composition comprises sodium tripolyphosphate and/or maltodextrin.

5. The instant beverage powder according to any of embodiments 2-4, wherein the antifoaming composition comprises an emulsifier.

6. The instant beverage powder according to any of embodiments 2-5, wherein the emulsifier of the antifoaming composition comprises one or more of glycerol monostearate, polyoxyethylene 20 Sorbitan Monostearate and 9-octadecemoic acid.

7. The instant beverage powder according to any of the preceding embodiments, wherein the antifoaming agent comprises one or more of water-based anti-foaming agents, silicon-based anti-foaming agents, polyethylene-glycol and polypropylene glycol copolymers antifoaming agents, oils and/or fatty acid based anti-foaming agents.

8. The instant beverage powder according to any of the preceding embodiments, wherein the antifoaming agent comprises or even consists of a silicon-based antifoaming agent, preferably silicon dioxide ($SiO_2$), synthetic amorphous silica and/or a polysiloxane, wherein the polysiloxane is a polydimethylsiloxane, $[Si(CH_3)_2O-]_{n=4-20}$.

9. The instant beverage powder according to any of the preceding embodiments, wherein the antifoaming agent comprises or even consists of silicon dioxide ($SiO_2$), synthetic amorphous silica, polysiloxane, wherein the polysiloxane is a polydimethylsiloxane, $[Si(CH_3)_2O-]_{n=4-20}$, an oil, wherein the oil is preferably canola oil and/or soybean oil, and/or a fatty acid, preferably stearic acid.

10. The instant beverage powder according to any of the preceding embodiments, wherein the protein is provided by one or more protein sources having a pH in the range of pH 5.0 to 9.0, preferably 5.5 to 8.5, more preferably 6.0-8.0, even more preferably 6.5 to 7.5 at room temperature, when 7.5 gram of the whey protein is dissolved in 100 milliliter of water.

11. The instant beverage powder according to any of the preceding embodiments, wherein the whey protein is provided by a whey protein source comprising one or more of a whey protein concentrate (WPC), a whey protein isolate (WPI), a serum protein concentrate (SPC), a serum protein isolate (SPI), sweet whey, cheese whey, and/or acid whey and/or hydrolysates thereof.

12. The instant beverage powder according to any of the preceding embodiments, wherein the whey protein is preferably provided by whey protein isolate or serum protein isolate.

13. The instant beverage powder according to any of the preceding embodiments, wherein the whey protein comprises one or more of beta-lactoglobulin, alpha-lactalbumin, caseinomacropeptide, or combinations thereof.

14. The instant beverage powder according to any of the preceding embodiments, wherein the protein is provided by one or more protein sources that comprise 0.02 to 5.0% w/w carbohydrate relative to the weight of the instant beverage powder, preferably 0.05 to 3.0% w/w carbohydrate relative to the weight of the instant beverage powder, even more preferably 0.05 to 2.0% w/w carbohydrate relative to the weight of the instant beverage powder, even more preferably 0.075 to 2.0% w/w carbohydrate relative to the weight of the instant beverage powder.

15. The instant beverage powder according to any of the preceding embodiments, wherein the protein is provided by one or more protein sources that comprise 0.001 to 4.0% w/w fat relative to the weight of the powder, preferably 0.01 to 2.0% w/w fat relative to the weight of the powder, more preferably 0.005 to 1.0% w/w fat relative to the weight of the powder, even more preferably 0.005 to 0.5% w/w fat relative to the weight of the powder, most preferably 0.001 to 0.05% w/w fat relative to the weight of the powder.

16. The instant beverage powder according to any of the preceding embodiments, wherein the protein is provided by one or more protein sources that comprise at most 4.0% w/w fat relative to the weight of the powder, that comprises at most 3.0% w/w fat relative to the weight of the powder, preferably at most 2.0% w/w fat relative to the weight of the powder, more preferably at most 1.0% w/w fat relative to the weight of the powder, even more preferably at most 0.5% w/w fat relative to the weight of the powder, most preferably at most 0.05% w/w fat relative to the total weight of the powder.

17. The instant beverage powder according to any of the preceding embodiments, wherein the protein has a degree of protein denaturation of at most 20%, more preferably at most 10% and most preferably at most 5%.

18. The instant beverage powder according to any of the preceding embodiments, wherein the powder has a turbidity of at most 500 NTU after 300 seconds when 7.5 gram of the instant beverage powder is dissolved in 100 milliliter water having a temperature of 25 degrees C., preferably at most 400 NTU after 300 seconds, more preferably at most 380 NTU after 300 seconds, even more preferably at most 350 NTU after 300 seconds, and in other preferred embodiments the powder has a turbidity of at most 300 NTU after 300 seconds when 7.5 gram of the instant beverage powder is dissolved in 100 milliliter water having a temperature of 25 degrees C., or more preferably the powder has a turbidity of at most 250 NTU after 300 seconds when 7.5 gram of the instant beverage powder is dissolved in 100 milliliter water having a temperature of 25 degrees C.

19. The instant beverage powder according to any of the preceding embodiments, wherein the powder has a mineral content of 1.0 to 5.0% w/w relative to the weight of the instant beverage powder, preferably of 1.2 to 4.5% w/w, more preferably of 1.4 to 3.0% w/w.

20. The instant beverage powder according to any of the preceding embodiments, wherein the sum of sodium, magnesium, phosphorous, chloride, potassium and calcium of the powder is in the range of 1.0 to 3.0% w/w relative to the weight of the instant beverage powder, preferably in the range of 1.2 to 2.9% w/w relative to the weight of the powder, more preferably of 1.4 to 2.8% w/w relative to the weight of the powder, even more preferably in the range of 1.5 to 2.75% w/w relative to the weight of the powder.

21. The instant beverage powder according to any of the preceding embodiments, wherein the sum of magnesium and calcium of the powder is in the range of 0.01 to 0.60% w/w relative to the weight of the powder, preferably in the range of 0.02 to 0.50% w/w relative to the weight of the powder, more preferably in the range of 0.03 to 0.45% w/w relative to the weight of the powder.

22. The instant beverage powder according to any of the preceding embodiments, wherein the protein is provided by one or more protein sources having a mineral content of 1.0 to 5.0% w/w relative to the weight of the protein, preferably of 1.2 to 4.5% w/w relative to the weight of the protein, more preferably of 1.4 to 3.0% w/w relative to the weight of the protein.

23. The instant beverage powder according to any of the preceding embodiments, wherein the protein is provided by one or more protein sources having a sum of sodium, magnesium, phosphorous, chloride, potassium and calcium in the range of 1.0 to 3.0% w/w relative to the weight of the protein, preferably in the range of 1.2 to 2.9% w/w relative to the weight of the protein, more preferably of 1.4 to 2.8% w/w relative to the weight of the protein, even more preferably in the range of 1.5 to 2.75% w/w relative to the weight of the protein.

24. The instant beverage powder according to any of the preceding embodiments, wherein the protein is provided by one or more protein sources having a sum of magnesium and calcium in the range of 0.01 to 0.60% w/w relative to the weight of the protein, preferably of 0.02 to 0.50% w/w relative to the weight of the protein, more preferably of 0.03 to 0.45% w/w relative to the weight of the protein.

25. The instant beverage powder according to any of the preceding embodiments, wherein the powder furthermore comprises one or more sweeteners, such as carbohydrate sweeteners, polyols and/or high intensity sweeteners.

26. The instant beverage powder according to embodiment 25, wherein the powder comprises at least one high intensity sweetener, preferably one or more of aspartame, cyclamate, sucralose, acesulfame salt, neotame, saccharin, *stevia* extract, a steviol glycoside such as e.g. rebaudioside A, or a combination thereof.

27. The instant beverage powder according to embodiment 26, wherein the powder comprises a total amount of high intensity sweeteners in the range of 0.01-4.0% w/w relative to the total weight of the powder, preferably a total amount of high intensity sweeteners in the range of 0.05-3.0% w/w relative to the total weight of the powder, more preferably a total amount of high intensity sweeteners in the range of 0.08-2.0% w/w relative to the total weight of the powder.

28. The instant beverage powder according to any of embodiments 11 and/or 12, wherein the high intensity sweetener is sucralose.

29. The instant beverage powder according to any of the preceding embodiments, wherein the powder furthermore comprises a total amount of carbohydrates in the range of 0.005-20% w/w relative to the total weight of the powder, preferably in the range of 0.05-15% w/w relative to the total weight of the powder.

30. The instant beverage powder according to any of the preceding embodiments, wherein the powder furthermore comprises one or more natural and/or artificial flavouring agents.

31. The instant beverage powder according to any of the preceding embodiments, wherein the powder furthermore comprises a total amount of flavouring agent in the range of 0.1 to 3.0% w/w relative to the total weight of the powder, preferably in the range of 0.4-3.0% w/w relative to the total weight of the powder.

32. The instant beverage powder according to embodiment 31, wherein the flavouring agent is selected from the group consisting of vanilla, chocolate, cacao, coconut, strawberry, melon, raspberry, blueberry, blackberry, banana, pineapple, coffee, lemon, lime, orange, cola and/or tea.

33. The instant beverage powder according to any of the preceding embodiments, wherein the powder furthermore comprises one or more natural and/or artificial colouring agents.

34. The instant beverage powder according to any of the preceding embodiments, wherein the powder furthermore comprises at most 4.0% w/w fat relative to the total weight of the powder, the instant beverage powder furthermore comprises at most 3.0% w/w fat relative to the total weight of the powder preferably at most 2.0 w/w fat relative to the total weight of the powder, more preferably at most 1.0% w/w fat relative to the total weight of the powder, even more preferably at most 0.5% w/w fat relative to the total weight of the powder, most preferably at most 0.05% w/w fat relative to the total weight of the powder.

35. The instant beverage powder according to any of the preceding embodiments, wherein the powder comprises at most 5 w/w % fiber relative to the total weight of the powder, preferably at most 3.0 w/w fiber relative to the total weight of the powder, more preferably at most 1.0% w/w fiber relative to the total weight of the powder, even more preferably at most 0.5% w/w fiber relative to the total weight of the powder.

36. The instant beverage powder according to any of the preceding embodiments wherein the powder has a water content in an amount of at most 6% w/w, such as at most 5% w/w, preferably at most 4% w/w, more preferably at most 3% w/w, and even more preferably at most 2% w/w.

37. The instant beverage powder according to any of the preceding embodiments, wherein the powder has an energy content in the range of about 100-500 kcal/100 grams of powder, preferably the powder has an energy content in the range of about 200-400 kcal/100 grams of powder.

38. The instant beverage powder according to any of the preceding embodiments comprises at most 0.3% w/w lecithin relative to the weight of the powder, preferably at most 0.2% w/w lecithin relative to the weight of the powder, more preferably at most 0.1% w/w lecithin relative to the weight of the powder, even more preferably at most 0.05% w/w lecithin relative to the weight of the powder.

39. The instant beverage powder according to any of the preceding embodiments, for use as a food ingredient.

40. Method of producing an instant beverage powder according to any of embodiments 1-38, wherein the method comprises the following steps:
 a) providing:
  one or more protein sources,
  an antifoaming agent, and
  optionally, at least one additional ingredient,
 b) mixing the one or more protein sources, the antifoaming agent, and an optional ingredient in amounts sufficient to obtain an instant beverage powder comprising:
  a total amount of protein of 60 to 97% w/w relative to the weight of the powder, preferably 65 to 96% w/w, more preferably 70-95% w/w, even more preferably 80-95% w/w relative to the weight of the powder, wherein at least 85% w/w of the protein is whey protein, preferably at least 87% w/w of the protein is whey protein, more preferably at least 90% w/w of the protein is whey protein, even more preferably at least 95% w/w of the protein is whey protein,
  the antifoaming agent in an amount in the range of 0.01 to 5.0% w/w relative to the weight of the instant beverage powder, preferably in the range of 0.015 to 3.0% w/w relative to the weight of the instant beverage powder, more preferably in the range of 0.02 to 2.0% w/w relative to the weight of the instant beverage powder,
at most 0.4% w/w lecithin relative to the weight of the instant beverage powder, and
d) optionally, packaging the instant beverage powder.

41. The method according to embodiment 38, wherein the one or more protein sources, the antifoaming agent and the optional further ingredients are selected to provide an instant beverage powder having a pH in the range of pH 5.0 to 9.0, preferably 5.5 to 8.5, more preferably 6.0-8.0, even more preferably 6.5 to 7.5 at room temperature, when 7.5 gram of the instant beverage powder is dissolved in 100 milliliter water.

43. A method according to embodiments 40 or 41, wherein the one or more protein sources have a pH in the range of pH of 5.0 to 9.0, preferably 5.5 to 8.5, more preferably 6.0-8.0, even more preferably 6.5 to 7.5 at room temperature, when 7.5 gram of the protein source is dissolved in 100 milliliter water.

44. A transparent beverage product comprising:
a transparent liquid and
the instant beverage powder according to any of the embodiments 1-38,
having a pH in the range of pH of 5.0 to 9.0, preferably 5.5 to 8.5, more preferably 6.0-8.0, even more preferably 6.5 to 7.5 at room temperature, and a turbidity of at most 350 NTU, preferably a turbidity of at most 200 NTU, even more preferably a turbidity of at most 100 NTU.

44. The beverage according to embodiment 43, wherein the beverage comprises at most 30 g said instant beverage powder per 100 gram of said liquid, preferably at most 20 g of said instant beverage powder per 100 grams of said liquid, most preferably at most 10 g of said instant beverage powder per 100 grams of said liquid.

45. The beverage product according to embodiments 43 or 44 having a viscosity in the range of 3-100 centipoise (cP), measured at 22 degrees Celsius at a shear rate of 50/s, preferably a viscosity in the range 5-50 centipoise (cP), measured at 22 degrees Celsius at a shear rate of 50/s.

46. The beverage product according to any of embodiments 43-45, said liquid is selected from a transparent liquid selected from the list of water, milk products, vegetable juice, beverages and combinations thereof.

47. The beverage product according to embodiment 46, wherein the liquid is water.

48. The beverage product according to any of embodiments 43-47 is a ready-to-drink beverage.

49. A method for preparing a transparent beverage product according to any of the embodiments 43-48, said method comprising
i. combining an instant beverage powder according to any of embodiments 1-39 with a transparent liquid,
ii. Optionally adding at least one additional ingredient and
iii. Mixing the powder and liquid obtained to form a transparent beverage.

50. A method according to embodiment 49, which comprises combining at most 30 grams of said instant beverage powder per 100 grams of said liquid, preferably at most 20 grams of said instant beverage powder per 100 grams of said liquid, most preferably at most 7.5 grams of said instant beverage per 100 grams of said liquid.

51. A method according to embodiment 49 and/or 50 wherein the liquid is selected from the group consisting of water, milk products, fruit juice, vegetable juice, beverages and combinations thereof.

52. A method according to embodiments 49-51, wherein the liquid is water.

53. A kit comprising the instant beverage powder according to any of embodiments 1-39, said kit comprising
i. a tool for measuring said instant beverage powder, and
ii. a container having a lid for opening and closing the container,
wherein said container is for mixing said instant beverage powder with a liquid to form a beverage product, and said container is adapted for drinking the beverage product directly from the container.

54. Using the powder according to any of embodiments 1-39 for producing a transparent pH neutral beverage.

The invention claimed is:
1. An instant beverage powder suitable for preparing a transparent beverage when dissolved in water,
which powder comprises:
a total amount of protein of 60 to 97% w/w relative to the weight of the instant beverage powder, wherein at least 85% w/w of the protein is whey protein,
an antifoaming agent in an amount in the range of 0.01 to 5.0% w/w relative to the weight of the instant beverage powder,
at most 0.2% w/w lecithin relative to the weight of the instant beverage powder, wherein said powder has a pH in the range of pH 6.0 to 9.0, at room temperature, when 7.5 gram of the instant beverage powder is dissolved in 100 milliliter water.

2. The instant beverage powder of claim 1, wherein the protein is provided by one or more protein sources having a pH in the range of pH 6.0 to 9.0, at room temperature, when 7.5 gram of the whey protein is dissolved in 100 milliliter of water.

3. The instant beverage powder of claim 1, wherein the powder has a turbidity of at most 500 NTU after 300 seconds when 7.5 gram of the instant beverage powder is dissolved in 100 milliliter water having a temperature of 25 degrees C.

4. The instant beverage powder of claim 1, wherein the powder has a mineral content of 1.0 to 5.0% w/w relative to the weight of the instant beverage powder.

5. The instant beverage powder of claim 1, wherein the powder furthermore comprises a total amount of carbohydrates in the range of 0.005-20% w/w relative to the total weight of the powder.

6. The instant beverage powder of claim 1, wherein the powder furthermore comprises at most 4.0% w/w fat relative to the total weight of the powder.

7. The instant beverage powder of claim 1, wherein the antifoaming agent is provided by an antifoaming composition comprising the antifoaming agent and a solid carrier, and optionally one or more emulsifiers.

8. The instant beverage powder of claim 1, wherein the antifoaming agent comprises silicon dioxide ($SiO_2$).

9. The instant beverage powder of claim 1, wherein the antifoaming agent comprises silicon dioxide ($SiO_2$) and polydimethylsiloxane ($CH_3[Si(CH_3)_2O]_nSi(CH_3)_3$ n=4-20) and/or a combination of silicon dioxide ($SiO_2$) and an oil.

10. The instant beverage powder of claim 7, wherein the antifoaming agent is provided by an antifoaming composition, the antifoaming composition comprises:
the antifoaming agent in an amount of 1-40% w/w relative to the weight of the antifoaming composition, the carrier in an amount of 60-90% w/w relative to the weight of the antifoaming composition, optionally, the emulsifier in an amount of 0-20% w/w relative to the weight of the antifoaming composition.

11. The instant beverage powder of claim 7, wherein the carrier of the antifoaming composition comprises a water soluble carbohydrate selected from maltodextrin and/or corn starch or sodium tripolyphosphate.

12. The instant beverage powder of claim 7, wherein the antifoaming composition comprises an emulsifier.

13. The instant beverage powder of claim 7, wherein the emulsifier of the antifoaming composition comprises one or more of an oleic acid, a stearic acid and/or a lactic acid.

14. The instant beverage powder of claim 1, wherein the whey protein is provided by a whey protein source comprising one or more of a whey protein concentrate (WPC), a whey protein isolate (WPI), a serum protein concentrate (SPC), a serum protein isolate (SPI), sweet whey, cheese whey, and/or acid whey and/or hydrolysates thereof.

15. The instant beverage powder of claim 1, wherein the whey protein is provided by whey protein isolate or serum protein isolate.

16. The instant beverage powder of claim 1, for use as a food ingredient.

17. A method of producing an instant beverage powder, wherein the method comprises the following steps:
a) providing:
one or more protein sources,
an antifoaming agent, and
optionally, at least one additional ingredient,
b) mixing the one or more protein sources, the antifoaming agent, and an optional ingredient in amounts sufficient to obtain an instant beverage powder comprising:
a total amount of protein of 60 to 97% w/w relative to the weight of the powder, wherein at least 85% w/w of the protein is whey protein,
the antifoaming agent in an amount in the range of 0.01 to 5.0% w/w relative to the weight of the instant beverage powder,
at most 0.2% w/w lecithin relative to the weight of the instant beverage powder, and
c) optionally, packaging the instant beverage powder, wherein the one or more protein sources, the antifoaming agent and the optional further ingredients are selected to provide an instant beverage powder having a pH in the range of pH 6.0 to 9.0, at room temperature, when 7.5 gram of the instant beverage powder is dissolved in 100 milliliter of water.

18. A transparent beverage product comprising:
a transparent liquid and
the instant beverage powder according to claim 1,
having a pH in the range of pH of 6.0 to 9.0 at room temperature, and a turbidity of at most 350 NTU.

19. The beverage of claim 18, wherein the beverage comprises at most 30 g said instant beverage powder per 100 gram of said liquid.

20. The beverage of claim 18, wherein the beverage has a total protein content of 2.0-30% w/w relative to the weight of the beverage.

21. A method for preparing a transparent beverage product, said method comprising
i. combining an instant beverage powder of claim 1 with a transparent liquid,
ii. optionally adding at least one additional ingredient, and
iii. mixing the powder and liquid obtained to form a transparent beverage, wherein the transparent beverage has a pH in the range of pH 6.0 to 9.0, at room temperature.

22. A method of claim 21, which comprises combining at most 30 grams of said instant beverage powder per 100 grams of said liquid.

23. A kit comprising the instant beverage powder of claim 1, said kit comprising
i. a tool for measuring said instant beverage powder, and
ii. a container having a lid for opening and closing the container,
wherein said container is for mixing said instant beverage powder with a liquid to form a beverage product, and said container is adapted for drinking the beverage product directly from the container, wherein the beverage product has a pH in the range of pH 6.0 to 9.0, at room temperature.

* * * * *